(12) United States Patent
Lyu

(10) Patent No.: US 10,996,441 B2
(45) Date of Patent: May 4, 2021

(54) OPTICAL IMAGING LENS ASSEMBLY

(71) Applicant: Zhejiang Sunny Optical Co., Ltd, Ningbo (CN)

(72) Inventor: Saifeng Lyu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 203 days.

(21) Appl. No.: 16/229,927

(22) Filed: Dec. 21, 2018

(65) Prior Publication Data

US 2019/0146189 A1 May 16, 2019

Related U.S. Application Data

(63) Continuation of application No. PCT/CN2018/080107, filed on Mar. 23, 2018.

(30) Foreign Application Priority Data

Sep. 15, 2017 (CN) .......................... 201710834755.5
Sep. 15, 2017 (CN) .......................... 201721185090.1

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............................... G02B 13/0045; G02B 9/64
USPC ................................................. 359/708, 755
See application file for complete search history.

(56) References Cited

U.S. PATENT DOCUMENTS

| | | | | |
|---|---|---|---|---|
| 2,771,817 A * | 11/1956 | Aklin | ..................... | G02B 13/00 |
| | | | | 359/755 |
| 9,063,318 B2 * | 6/2015 | Ishizaka | ................... | G02B 9/64 |
| 9,128,270 B2 * | 9/2015 | Nishihata | ................ | G02B 9/64 |
| 9,507,125 B2 * | 11/2016 | Hashimoto | .............. | G02B 9/64 |
| 9,606,328 B2 * | 3/2017 | Chen | ........................ | G02B 9/64 |
| 9,632,287 B2 * | 4/2017 | Chae | .................. | G02B 13/0045 |
| 9,952,406 B2 * | 4/2018 | Jung | .................. | G02B 13/0045 |
| 10,162,157 B2 * | 12/2018 | Chang | ................ | G02B 27/0025 |
| 10,215,961 B2 * | 2/2019 | Gong | ..................... | G02B 13/18 |

(Continued)

FOREIGN PATENT DOCUMENTS

| | | |
|---|---|---|
| CN | 106324811 | 1/2017 |
| CN | 106842512 | 6/2017 |

(Continued)

*Primary Examiner* — Zachary W Wilkes
(74) *Attorney, Agent, or Firm* — Hauptman Ham, LLP

(57) ABSTRACT

The present disclosure discloses an optical imaging lens assembly. The optical imaging lens assembly includes: a first lens, a second lens, a third lens, a fourth lens, a fifth lens, a sixth lens and a seventh lens in sequence from an object side to an image side along an optical axis. The first lens, the second lens, and the sixth lens each have a positive refractive power. The third lens and the seventh lens each have a negative refractive power. The fourth lens and the fifth lens each have a refractive power. Object-side surfaces of the first lens and the second lens are both convex surfaces. An image-side surface of the third lens is a concave surface. A total effective focal length f of the optical imaging lens assembly and a radius of curvature R13 of an object-side surface of the seventh lens satisfy: |f/R13|≥2.5.

14 Claims, 35 Drawing Sheets

(56) References Cited

U.S. PATENT DOCUMENTS 10,429,618 B2 * 10/2019 Chang .................... G02B 13/18
2017/0199350 A1 7/2017 Teraoka
2017/0254989 A1 9/2017 Tsai et al.

FOREIGN PATENT DOCUMENTS

CN 107102425 8/2017
CN 107621681 1/2018

* cited by examiner

OPTICAL IMAGING LENS ASSEMBLY

CROSS-REFERENCE TO RELATED APPLICATIONS

This is a continuation of International Application PCT/CN2018/080107, with an international filing date of Mar. 23, 2018, which claims the priorities and rights to Chinese Patent Application No. 201710834755.5, filed with the China National Intellectual Property Administration (CNIPA) on Sep. 15, 2017, and Chinese Patent Application No. 201721185090.1, filed with the CNIPA on Sep. 15, 2017, the disclosures of which are hereby incorporated by reference in their entirety.

TECHNICAL FIELD

The present disclosure relates to an optical imaging lens assembly, and more specifically to an optical imaging lens assembly including seven lenses.

BACKGROUND

As portable electronic products update rapidly, higher requirements are put forward on the matching imaging lens assemblies. The trend of miniaturization of the portable electronic products requires ultra-thin miniaturization of the imaging lens assemblies. At the same time, with the application and popularization of portable electronic products such as mobile phones or tablet computers, the matching imaging lens assemblies need to nave a good imaging quality not only under conditions such as daylight or sufficient lighting, but also under insufficient lighting conditions such as cloudy days or at dusk. Thus, corresponding requirements on the high pixel, high resolution, brightness of the image plane and clear aperture of the imaging lens assemblies is raised.

SUMMARY

The present disclosure provides an optical imaging lens assembly, such as a large aperture imaging lens assembly, that may be applicable to portable electronic products and may at least solve or partially solve at least one of the above disadvantages in the existing technology.

According to an aspect, the present disclosure provides an optical imaging lens assembly. The optical imaging lens assembly includes: a first lens, a second lens, a third lens, a fourth lens, a fifth lens, a sixth lens and a seventh lens in sequence from an object side to an image side along an optical axis. The first lens, the second lens, and the sixth lens may each have a positive refractive power. The third lens and the seventh lens may each have a negative refractive power. The fourth lens and the fifth lens may each have a refractive power. An object-side surface of the first lens and an object-side surface of the second lens may both be convex surfaces. An image-side surface of the third lens may be a concave surface. A total effective focal length f of the optical imaging lens assembly and a radius of curvature R13 of an object-side surface of the seventh lens may satisfy: $|f/R13| \geq 2.5$.

In an embodiment, the total effective focal length f of the optical imaging lens assembly and an entrance pupil diameter EPD of the optical imaging lens assembly may satisfy: $f/EPD \leq 1.95$.

In an embodiment, an axial distance TTL from the object-side surface of the first lens to an image plane of the optical imaging lens assembly and half of a diagonal length ImgH of an effective pixel area on the image plane of the optical imaging lens assembly may satisfy: $TTL/ImgH \leq 1.6$.

In an embodiment, the total effective focal length f of the optical imaging lens assembly and an effective focal length f6 of the sixth lens may satisfy: $f/f6 > 0.6$.

In an embodiment, an effective focal length f7 of the seventh lens and the total effective focal length f of the optical imaging lens assembly may satisfy: $-2 < f/f7 < 0$.

In an embodiment, an effective focal length f1 of the first lens, an effective focal length f2 of the second lens and an effective focal length f3 of the third lens may satisfy: $-1.5 < f3/(f1+f2) < 0$.

In an embodiment, an effective focal length f1 of the first lens and the total effective focal length f of the optical imaging lens assembly may satisfy: $0 < f/f1 \leq 1.2$.

In an embodiment, the total effective focal length f of the optical imaging lens assembly and a combined focal length f45 of the fourth lens and the fifth lens may satisfy: $|f/f45| \leq 0.5$.

In an embodiment, a combined refractive power of the second lens and the third lens is a positive refractive power, and a combined focal length f23 of the second lens and the third lens and a sum of spacing distances $\Sigma AT$ of any two adjacent lenses of the first lens to the seventh lens on the optical axis may satisfy: $3.5 < f23/\Sigma AT < 14.5$.

In an embodiment, a sum of center thicknesses $\Sigma CT$ of the first lens to the seventh lens respectively on the optical axis and a sum of spacing distances $\Sigma AT$ of any two adjacent lenses of the first lens to the seventh lens on the optical axis may satisfy: $1 < \Sigma CT/\Sigma AT < 2.5$.

In an embodiment, a spacing distance T34 between the third lens and the fourth lens on the optical axis and a spacing distance T67 between the sixth lens and the seventh lens on the optical axis may satisfy: $0 < T34/T67 \leq 1.5$.

In an embodiment, a radius of curvature R5 of an object-side surface of the third lens and a radius of curvature R6 of the image-side surface of the third lens may satisfy: $|R5+R6|/|R5-R6| < 3$.

In an embodiment, a radius of curvature R6 of the image-side surface of the third lens and a radius of curvature R3 of the object-side surface of the second lens may satisfy: $1 < R6/R3 < 3$.

In an embodiment, an abbe number V4 of the fourth lens, an abbe number V5 of the fifth lens, and an abbe number V6 of the sixth lens may satisfy: $(V4+V5+V6)/4 \leq 45$.

According to another aspect, the present disclosure further provides an optical imaging lens assembly. The optical imaging lens assembly includes sequentially from an object side to an image side along an optical axis: a first lens having a refractive power, and an object-side surface of the first lens may be a convex surface; a second lens having a positive refractive power, and an object-side surface of the second lens may be a convex surface; a third lens having a negative refractive power, and an image-side surface of the third lens may be a concave surface; a fourth lens having a refractive power a fifth lens having a refractive power; a sixth lens having a positive refractive power; and a seventh lens having a negative refractive power. A total effective focal length f of the optical imaging lens assembly and a combined focal length f45 of the fourth lens and the fifth lens may satisfy: $|f/f45| \leq 0.5$.

In an embodiment, the first lens may have a positive refractive power.

According to another aspect, the present disclosure further provides an optical imaging lens assembly. The optical imaging lens assembly includes sequentially from an object side to an image side along an optical axis: a first lens, a second lens, a third lens, a fourth lens, a fifth lens, a sixth lens and a seventh lens. The first lens may have a positive refractive power, and an object-side surface of the first lens may be a convex surface. The second lens may have a positive refractive power, and an object-side surface of the second lens may be a convex surface. The third lens may have a negative refractive power, and an image-side surface of the third lens may be a concave surface. At least one of the fourth lens or the fifth lens may have a positive refractive power. The sixth lens may have a positive refractive power. The seventh lens may have a negative refractive power. A total effective focal length f of the optical imaging lens assembly and a radius of curvature R9 of an object-side surface of the fifth lens may satisfy: |f/R9|<1.5.

According to another aspect, the present disclosure further provides an optical imaging lens assembly. The optical imaging lens assembly includes sequentially from an object side to an image side along an optical axis: a first lens, a second lens, a third lens, a fourth lens, a fifth lens, a sixth lens and a seventh lens. The first lens may have a positive refractive power, and an object-side surface of the first lens may be a convex surface. The second lens may have a positive refractive power, and an object-side surface of the second lens may be a convex surface. The third lens may have a negative refractive power, and an image-side surface of the third lens may be a concave surface. The fourth lens has a positive refractive power or a negative refractive power. The fifth lens has a positive refractive power or a negative refractive power. The sixth lens may have a positive refractive power. The seventh lens may have a negative refractive power. A combined refractive power of the second lens and the third lens is a positive refractive power, and a combined focal length f23 of the second lens and the third lens and a sum of spacing distances ΣAT of any two adjacent lenses of the first lens to the seventh lens on the optical axis may satisfy: 3.5<f23/ΣAT<14.5.

In the present disclosure, a plurality of lenses (e.g., seven lenses) are used. By properly distributing the refractive powers and the surface types of the lenses, the center thicknesses of the lenses, and the spacing distances on the axis between the lenses, etc., the optical imaging lens assembly has the advantage of large aperture, enhances the illumination of the image plane, and improves the imaging effect under insufficient lighting conditions. At the same time, the optical imaging lens assembly with the above configuration may have at least one of the beneficial effects of ultra-thin, miniaturization, large aperture, low sensibility, good processing performance and high imaging quality.

BRIEF DESCRIPTION OF THE DRAWINGS

By describing non-limiting embodiments below in detail with reference to the accompanying drawings, other features, objectives and advantages of the present disclosure will be more apparent. In the accompanying drawings.

DETAILED DESCRIPTION OF EMBODIMENTS

Figure 1:
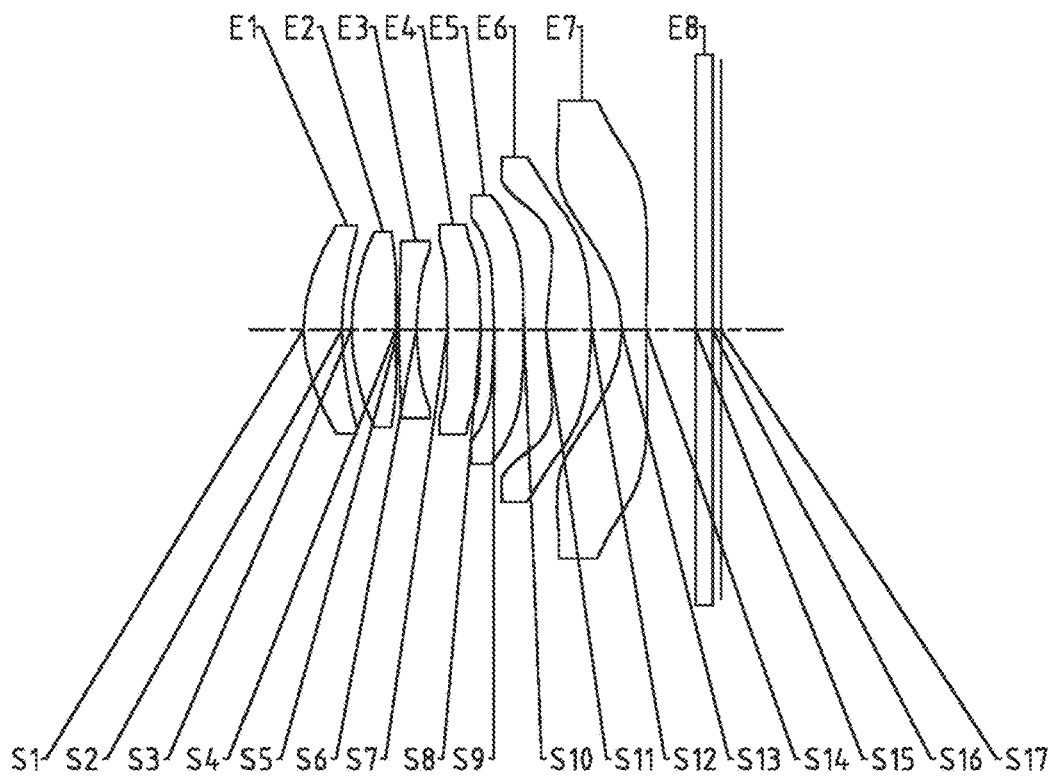
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary embodiments of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary embodiments of the present disclosure includes, for example, seven lenses having refractive powers (i.e., a first lens, a second lens, a third lens, a fourth lens, a fifth lens, a sixth lens and a seventh lens.) The seven lenses are sequentially arranged from the object side to the image side along the optical axis.

The first lens has a positive refractive power or a negative refractive power, and an object-side surface of the first lens may be a convex surface. The second lens may have a positive refractive power, and an object-side surface of the second lens may be a convex surface. The third lens may nave a negative refractive power, and an image-side surface of the third lens may be a concave surface. The fourth lens, the fifth lens, and the sixth lens each have a positive refractive power or a negative refractive power. The seventh lens has a negative refractive power.

In an exemplary embodiment, the first lens may have a positive refractive power, and an image-side surface of the first lens may be a concave surface.

In an exemplary embodiment, an image-side surface of the second lens may be a concave surface.

In an exemplary embodiment, the fourth lens may have a positive refractive power.

In an exemplary embodiment, an object-side surface of the fifth lens may be a concave surface.

In an exemplary embodiment, the sixth lens may have the entire refractive power and an object-side surface of the sixth lens may be a convex surface.

The total effective focal length f of the optical imaging lens assembly and an entrance pupil diameter EPD of the optical imaging lens assembly may satisfy: f/EPD≤1.95, and more specifically, f and EPD may further satisfy: 1.49≤f/EPD≤1.90. The smaller the F-number Fno of the optical imaging lens assembly (i.e., the total effective focal length f of the lens assembly/the entrance pupil diameter EPD of the lens assembly) is, the larger the clear aperture of the lens assembly is, and the more the amount of light entering is in the same unit time. The reduction of the F-number Fno may effectively enhance the brightness of the image plane, so that the lens assembly can better satisfy the shooting requirements under insufficient lighting conditions such as cloudy days or at dusk. The lens assembly is configured to satisfy the conditional expression f/EPD≤1.95, so as to make the lens assembly have a large aperture advantage during the process of increasing the amount of light entering, and enhance the illumination of the image plane, thereby improving the imaging effect of the lens assembly in a dark environment.

An abbe number V4 of the fourth lens, an abbe number V5 of the fifth lens, and an abbe number V6 of the sixth lens may satisfy: (V4+V5+V6)/4≤45, and more specifically, V4, V5 and V6 may further satisfy: 32.98≤(V4+V5+V6)/4≤33.15. By properly selecting the material of each lens, the purpose of correcting the chromatic aberration of the lens assembly is achieved.

The first lens may have a positive refractive power. An effective focal length f1 of the first lens and the total effective focal length f of the optical imaging lens assembly may satisfy: 0<f/f1≤1.2, and more specifically, f and f1 may further satisfy: 0.07≤f/f1≤1.07. In an optical imaging system having a large aperture, adjusting the refractive power of the first lens is advantageous for improving the deflection angle of the incident light and reducing aberrations such as a spherical aberration.

The effective focal length f1 of the first lens, an effective focal length f2 of the second lens and an effective focal length f3 of the third lens may satisfy: −1.5<f3/(f1+f2)<0, and more specifically, f1, f2 and f3 may further satisfy: −1.25≤f3/(f1+f2)≤−0.13. By properly distributing the refractive power of each lens, the advanced spherical aberration may be effectively reduced, the central field-of-view sensitivity may be reduced, and the chromatic aberration of the optical imaging system may be effectively corrected at the same time.

The total effective focal length f of the optical imaging lens assembly and a combined focal length f45 of the fourth lens and the fifth lens may satisfy: |f/f45|≤0.5, and more specifically, f and f45 may further satisfy: 0.07≤|f/f45|≤0.41. Satisfying the conditional expression |f/f45|≤0.5 is advantageous for mitigating the deflection angle of light, improving the advanced astigmatism, and reducing the system sensitivity.

The sixth lens may have a positive refractive power. The total effective focal length f of the optical imaging lens assembly and an effective focal length f6 of the sixth lens may satisfy: f/f6>0.6, and more specifically, f and f6 may further satisfy: 0.69≤f/f6≤1.48. By properly distributing the refractive power of the sixth lens, it is beneficial to improve the imaging quality of the lens assembly.

The seventh lens may have a negative refractive power. An effective focal length f7 of the seventh lens and the total effective focal length f of the optical imaging lens assembly may satisfy: −2<f/f7<0, and more specifically, f and f7 may further satisfy: −1.81≤f/f7≤−0.72. By properly distributing the refractive power of the seventh lens, it is beneficial to correct the astigmatism, improving the distortion, and matching the angle of chief ray of the chip.

A radius of curvature R6 of the image-side surface of the third lens and a radius of curvature R3 of the object-side surface of the second lens may satisfy: 1<R6/R3<3, and more specifically, R6 and R3 may further satisfy: 1.14≤R6/R3≤2.58. Properly controlling the ratio of the radius of curvature R6 of the image-side surface of the third lens to the radius of curvature R3 of the object-side surface of the second lens may effectively improve the spherical aberration. At the same time, it is also beneficial to determine the shapes of the object-side surface of the second lens and the image-side surface of the third lens to ensure the processability of the lens assembly.

A radius of curvature R5 of an object-side surface of the third lens and a radius of curvature R6 of the image-side surface of the third lens may satisfy: |R5+R6|/|R5−R6|<3, and more specifically, R5 and R6 may further satisfy: 0.08≤|R5+R6|/|R5−R6|≤2.64. By properly controlling the radii of curvature of the object-side surface and the image-side surface of the third lens, the third lens can not only effectively improve the advanced spherical aberration of the system, but also undertake the role of correcting the chromatic aberration.

The total effective focal length f of the optical imaging lens assembly and a radius of curvature R9 of the object-side surface of the fifth lens may satisfy: |f/R9|<1.5, and more specifically, f and R9 may further satisfy: 0.30≤|f/R9|≤1.03. By properly controlling the radius of curvature R9 of the object-side surface of the fifth lens, the trend of the light on the fifth lens may be effectively improved, which is beneficial to improve the relative illumination of the lens assembly.

The total effective focal length f of the optical imaging lens assembly and a radius of curvature R13 of an object-side surface of the seventh lens may satisfy: |f/R13|≤2.5, and more specifically, f and R13 may further satisfy: 2.55≤|f/R13|≤3.11. By properly controlling the radius of curvature R13 of the object-side surface of the seventh lens, the trend of the light on the seventh lens may be effectively improved, which is beneficial to improve the relative illumination of the lens assembly.

A spacing distance T34 between the third lens and the fourth lens on the optical axis and a spacing distance T67 between the sixth lens and the seventh lens on the optical axis may satisfy: 0<T34/T67≤1.5, and more specifically, T34 and T67 may further satisfy: 0.25≤T34/T67≤1.50. By properly adjusting the spacing distance between the lenses, it is beneficial to mitigate the deflection angle of the light. At the same time, it is also beneficial to improve the assembly processability of the lens assembly.

A sum of the center thicknesses ΣCT of the respective lenses having refractive powers on the optical axis and a sum of spacing distances ΣAT of any two adjacent lenses of the respective lenses having refractive powers on the optical axis may satisfy: 1<ΣCT/ΣAT<2.5, and more specifically, ΣCT and ΣAT may further satisfy: 1.36≤ΣCT/ΣAT≤2.39. By properly distributing the ratio of the center thickness to the spacing distance of each lens in the optical imaging system, it is advantageous for improving the processability of lens assembly forming and lens assembly assembling. In addition, a proper proportion distribution of the center thickness and the spacing distance of each lens is also advantageous for ensuring the miniaturization of the lens assembly.

In an optical imaging system including seven lenses having refractive powers, ΣCT=CT1+CT2+CT3+CT4+CT5+CT6+CT7. Here, CT1 is the center thickness of the first lens on the optical axis, CT2 is the center thickness of the second lens on the optical axis, CT3 is the center thickness of the third lens on the optical axis, CT4 is the center thickness of the fourth lens on the optical axis, CT5 is the center thickness of the fifth lens on the optical axis, CT6 is the center thickness of the sixth lens on the optical axis, and CT7 is the center thickness of the seventh lens on the optical axis. ΣAT=T12+T23+T34+T45+T56+T67. Here, T12 is the spacing distance between the first lens and the second lens on the optical axis, T23 is the spacing distance between the second lens and the third lens on the optical axis, T34 is the spacing distance between the third lens and the fourth lens on the optical axis, T45 is the spacing distance between the fourth lens and the fifth lens on the optical axis, T56 is the spacing distance between the fifth lens and the sixth lens on the optical axis, and T67 is the spacing distance between the sixth lens and the seventh lens on the optical axis.

A combined focal length f23 of the second lens and the third lens and the sum of spacing distances ΣAT of any two adjacent lenses of the respective lenses having refractive powers on the optical axis may satisfy: 3.5<f23/ΣAT<14.5, and more specifically, f23 and ΣAT may further satisfy: 3.82≤f23/ΣAT≤13.79. Satisfying the conditional expression 3.5<f23/ΣAT<14.5 may ensure the miniaturization of the lens assembly. In addition, by adjusting the spacing distances of the lenses on the axis, the deflection of light tends to be moderated, thereby reducing the generation of corresponding aberrations and reducing the system sensitivity.

A total track length TTL of the optical imaging lens assembly and half of a diagonal length ImgH of an effective pixel area on the image plane of the optical imaging lens assembly may satisfy: TTL/ImgH≤1.6, and more specifically, TTL and ImgH may further satisfy: 1.43≤TTL/ImgH≤1.52. By controlling the ratio of the total track length to the image height of the lens assembly, the overall size of the imaging lens assembly may be effectively compressed to achieve the ultra-thin characteristic and miniaturization of the optical imaging lens assembly, so that the optical imaging lens assembly can be suitably applied to a size-limited system such as a portable electronic product.

In an exemplary embodiment, the optical imaging lens assembly may also be provided with at least one diaphragm, to improve the imaging quality of the lens assembly. The diaphragm may be disposed at any position between the object side and the image side as needed.

Alternatively, the optical imaging lens assembly may further include an optical filter for correcting the color deviation and/or a cover glass for protecting the photosensitive element on the image plane.

The optical imaging lens assembly according to the above embodiments of the present disclosure may use a plurality of lenses, for example, seven lenses as described in the preceding text. By properly distributing the refractive power, surface type of each lens, the center thickness of each lens and the spacing distance on the axis between the lenses, etc., an optical imaging lens assembly having a large aperture and good imaging quality suitable for portable electronic products is proposed.

In the embodiments of the present disclosure, at least one of the surfaces of the each lens is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving the distortion aberration and improving the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the embodiments, the optical imaging lens assembly is not limited to include seven lenses. If desired, the optical imaging lens assembly may also include other numbers of lenses.

Specific embodiments of the optical imaging lens assembly that may be applied to the above embodiments are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 1 shows the surface type, the radius of curvature, the thickness, the material and the conic coefficient of each lens of the optical imaging lens assembly in Embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9289 | 0.4726 | 1.54 | 55.7 | −1.9035 |
| S2 | aspheric | 2.8148 | 0.1199 | | | −9.2159 |
| S3(STO) | aspheric | 2.2841 | 0.5512 | 1.55 | 56.1 | −8.1132 |
| S4 | aspheric | 14.4867 | 0.0305 | | | −22.6435 |
| S5 | aspheric | 8.3992 | 0.2209 | 1.67 | 20.4 | 0.0000 |
| S6 | aspheric | 3.1767 | 0.3797 | | | −0.8407 |
| S7 | aspheric | 43.8905 | 0.4147 | 1.55 | 56.1 | 0.0000 |
| S8 | aspheric | −11.2635 | 0.1647 | | | −7.6505 |
| S9 | aspheric | −8.7503 | 0.3632 | 1.67 | 20.4 | 0.0000 |
| S10 | aspheric | 21.4320 | 0.2680 | | | −8.1032 |
| S11 | aspheric | 2.2370 | 0.5665 | 1.55 | 56.1 | −20.4013 |
| S12 | aspheric | −5.3712 | 0.3751 | | | 0.0000 |
| S13 | aspheric | −1.4081 | 0.3000 | 1.54 | 55.7 | −0.7996 |
| S14 | aspheric | 39.9470 | 0.6103 | | | 0.0000 |
| S15 | spherical | infinite | 0.2100 | 1.52 | 64.2 | |
| S16 | spherical | infinite | 0.1000 | | | |
| S17 | spherical | infinite | | | | |

As may be obtained from Table 1, the radius of curvature R5 of the object-side surface S5 of the third lens E3 and the radius of curvature R6 of the image-side surface S6 of the third lens E3 satisfy: |R5+R6|/|R5−R6|=2.22. The radius of curvature R6 of the image-side surface S6 of the third lens E3 and the radius of curvature R3 of the object-side surface S3 of the second lens E2 satisfy: R6/R3=1.39. The spacing distance T34 between the third lens E3 and the fourth lens E4 on the optical axis and the spacing distance T67 between the sixth lens E6 and the seventh lens E7 on the optical axis satisfy: T34/T67=1.01. The sum of the center thicknesses ΣCT of the first lens E1 to the seventh lens E7 respectively on the optical axis and the sum of spacing distances ΣAT of any two adjacent lenses of the first lens E1 to the seventh lens E7 on the optical axis satisfy: ΣCT/ΣAT=2.16. The abbe number V4 of the fourth lens, the abbe number V5 of the fifth lens, and the abbe number V6 of the sixth lens satisfy: (V4+V5+V6)/4=33.15.

In the present embodiment, the aspheric lens may be used for each lens, and the surface type x of each aspheric surface is defined by the following formula:

$$x = \frac{ch^2}{1+\sqrt{1-(k+1)c^2h^2}} + \sum A_i h^i \tag{1}$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S14 in Embodiment 1.

TABLE 2

| surface number | A4 | A6 | A8 | A10 | A12 |
|---|---|---|---|---|---|
| S1 | 1.7749E−02 | −2.6940E−03 | −1.9584E−02 | 3.2116E−02 | −3.2410E−02 |
| S2 | 3.6391E−03 | −7.0184E−02 | 7.6346E−02 | −1.0627E−01 | 2.1212E−01 |
| S3 | 5.6938E−02 | −9.6603E−02 | 9.5734E−02 | −1.7536E−01 | 4.0484E−01 |
| S4 | −4.0895E−02 | −5.2498E−02 | −2.1895E−01 | 1.2216E+00 | −2.4184E+00 |
| S5 | −6.6623E−02 | −7.6874E−03 | −5.9985E−02 | 6.9433E−01 | −1.5205E+00 |
| S6 | −1.6513E−02 | −1.0080E−01 | 8.3575E−01 | −2.7989E+00 | 5.9221E+00 |
| S7 | −4.6449E−02 | −5.5553E−03 | −4.3871E−01 | 1.6680E+00 | −3.3224E+00 |
| S8 | 2.6751E−02 | −2.4337E−02 | −4.1840E−01 | 9.9294E−01 | −1.2553E+00 |
| S9 | −3.7179E−02 | 3.4474E−01 | −1.1544E+00 | 2.0515E+00 | −2.3530E+00 |
| S10 | −2.5608E−01 | 5.4270E−01 | −9.4663E−01 | 1.1540E+00 | −9.7467E−01 |
| S11 | −6.8813E−02 | 4.3271E−02 | −4.5366E−02 | 1.1769E−02 | 3.2127E−03 |
| S12 | −6.8434E−02 | 1.1014E−01 | −1.2686E−01 | 9.1266E−02 | −5.0465E−02 |
| S13 | 3.3172E−02 | 2.7923E−02 | −5.6950E−02 | 4.5697E−02 | −1.8195E−02 |
| S14 | 2.5510E−02 | −4.1925E−02 | 2.3043E−02 | −7.4193E−03 | 1.4323E−03 |

| surface number | A14 | A16 | A18 | A20 |
|---|---|---|---|---|
| S1 | 2.0402E−02 | −8.5512E−03 | 2.8767E−03 | −5.5298E−04 |
| S2 | −2.5649E−01 | 1.7166E−01 | −5.8628E−02 | 7.9050E−03 |
| S3 | −5.1862E−01 | 3.6356E−01 | −1.3252E−01 | 1.9592E−02 |
| S4 | 2.5493E+00 | −1.5097E+00 | 4.7318E−01 | −6.1082E−02 |
| S5 | 1.5099E+00 | −7.0806E−01 | 1.1543E−01 | 7.0124E−03 |
| S6 | −8.0264E+00 | 6.6640E+00 | −3.0562E+00 | 5.9068E−01 |

TABLE 2-continued

| | | | | |
|---|---|---|---|---|
| S7 | 3.9891E+00 | −2.9277E+00 | 1.2371E+00 | −2.3241E−01 |
| S8 | 9.3715E−01 | −3.9051E−01 | 8.3150E−02 | −7.1586E−03 |
| S9 | 1.6997E+00 | −7.2552E−01 | 1.6434E−01 | −1.5005E−02 |
| S10 | 5.4496E−01 | −1.8856E−01 | 3.6163E−02 | −2.9236E−03 |
| S11 | −6.5825E−03 | 3.6253E−03 | −8.1181E−04 | 6.3474E−05 |
| S12 | 1.9753E−02 | −4.7013E−03 | 5.9563E−04 | −3.0731E−05 |
| S13 | 4.0898E−03 | −5.3336E−04 | 3.7889E−05 | −1.1394E−06 |
| S14 | −1.6938E−04 | 1.2250E−05 | −4.9657E−07 | 8.1197E−09 |

Table 3 below shows the effective focal lengths f1-f7 of the lenses, the total effective focal length f of the optical imaging lens assembly, the total track length TTL of the optical imaging lens assembly (i.e., the distance from the center of the object-side surface S1 of the first lens E1 to the image plane S17 on the optical axis) and the half of the diagonal length ImgH of the effective pixel area on the image plane S17 of the optical imaging lens assembly in Embodiment 1.

TABLE 3

| | parameter | | | | |
|---|---|---|---|---|---|
| | f1 (mm) | f2 (mm) | f3 (mm) | f4 (mm) | f5 (mm) |
| numerical value | 9.63 | 4.89 | −7.81 | 16.46 | −9.29 |

| | parameter | | | | |
|---|---|---|---|---|---|
| | f6 (mm) | f7 (mm) | f (mm) | TTL (mm) | ImgH (mm) |
| numerical value | 2.97 | −2.53 | 4.28 | 5.15 | 3.60 |

As may be obtained from Table 3, the total effective focal length f of the optical imaging lens assembly and the effective focal length f1 of the first lens E1 satisfy: f/f1=0.44. The effective focal length f1 of the first lens E1, the effective focal length f2 of the second lens E2, and the effective focal length f3 of the third lens E3 satisfy: f3/(f1+f2)=−0.54. The total effective focal length f of the optical imaging lens assembly and the effective focal length f6 of the sixth lens E6 satisfy: f/f6=1.44. The total effective focal length f of the optical imaging lens assembly and the effective focal length f7 of the seventh lens E7 satisfy: f/f7=−1.69. The total track length TTL of the optical imaging lens assembly and the half of the diagonal length ImgH of the effective pixel area on the image plane S17 of the optical imaging lens assembly satisfy: TTL/ImgH=1.43. It can be seen from Table 1 and Table 3 that the total effective focal length f of the optical imaging lens assembly and the radius of curvature R9 of the object-side surface S9 of the fifth lens E5 satisfy: |f/R9|=0.49. The total effective focal length f of the optical imaging lens assembly and the radius of curvature R13 of the object-side surface S13 of the seventh lens E7 satisfy: |f/R13|=3.04.

In Embodiment 1, the total effective focal length f of the optical imaging lens assembly and the combined focal length f45 of the fourth lens E4 and the fifth lens E5 satisfy: |f/f45|=0.19. The combined refractive power f23 of the second lens E2 and the third lens E3 and the sum of spacing distances ΣAT of any two adjacent lenses of the first lens E1 to the seventh lens E7 on the optical axis satisfy: f23/ΣAT=7.97. The total effective focal length f of the optical imaging lens assembly and the entrance pupil diameter EPD of the optical imaging lens assembly satisfy: f/EPD=1.68.

Figure 2A:
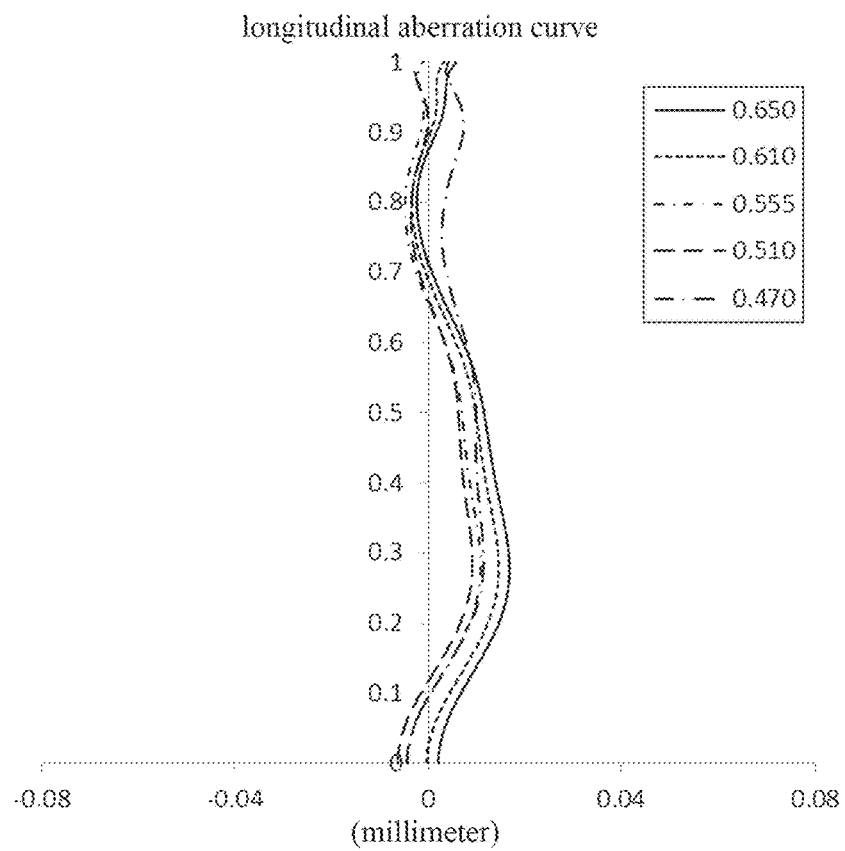
FIGS. 2A-2D respectively illustrate a longitudinal aberration curve, an astigmatic curve, a distortion curve and a lateral color curve of the optical imaging lens assembly according to Embodiment 1.
Figure 2B:
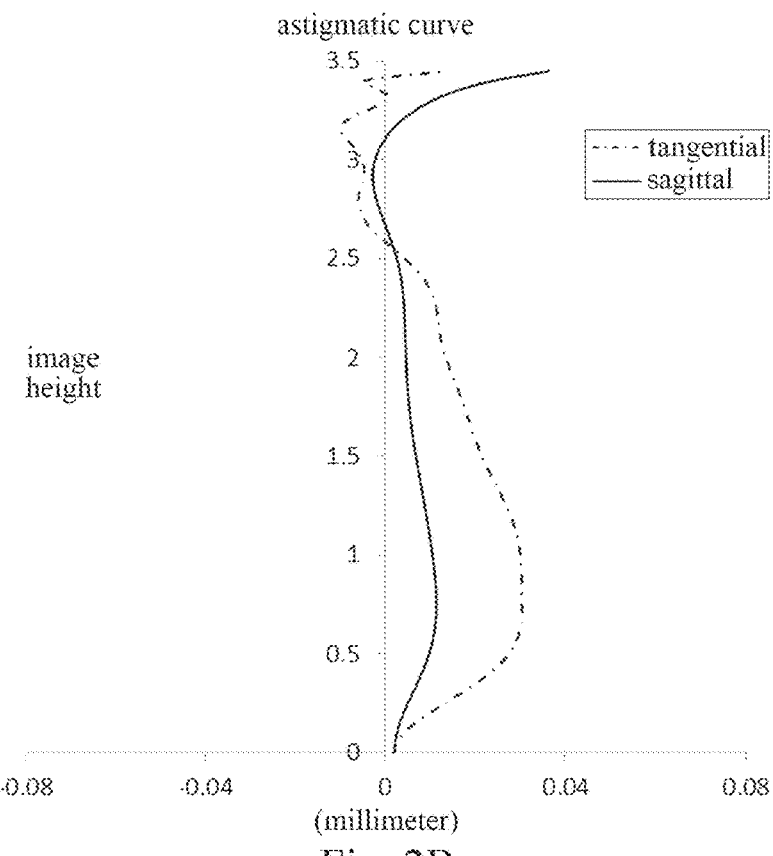
Figure 2C:
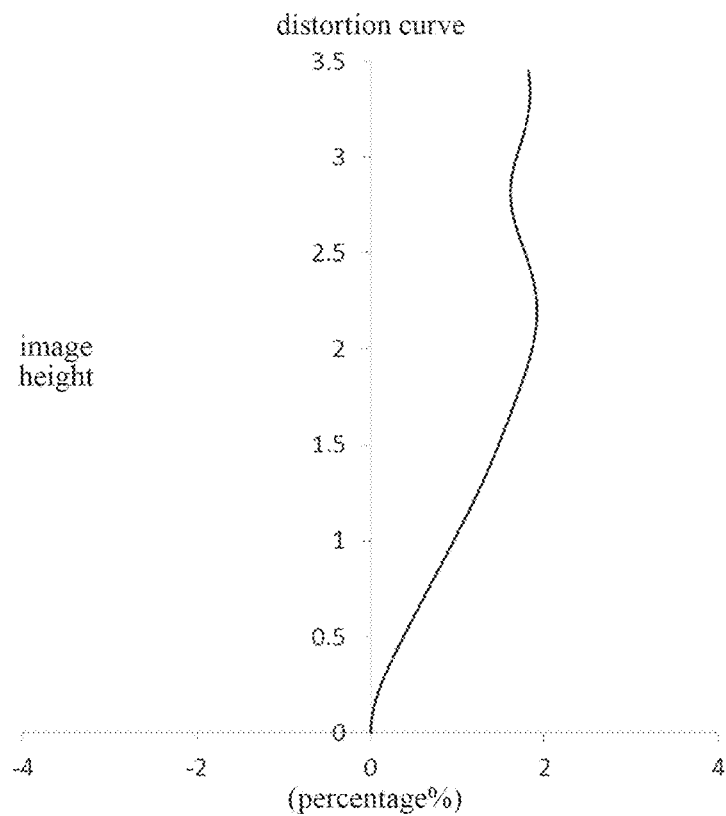
Figure 2D:
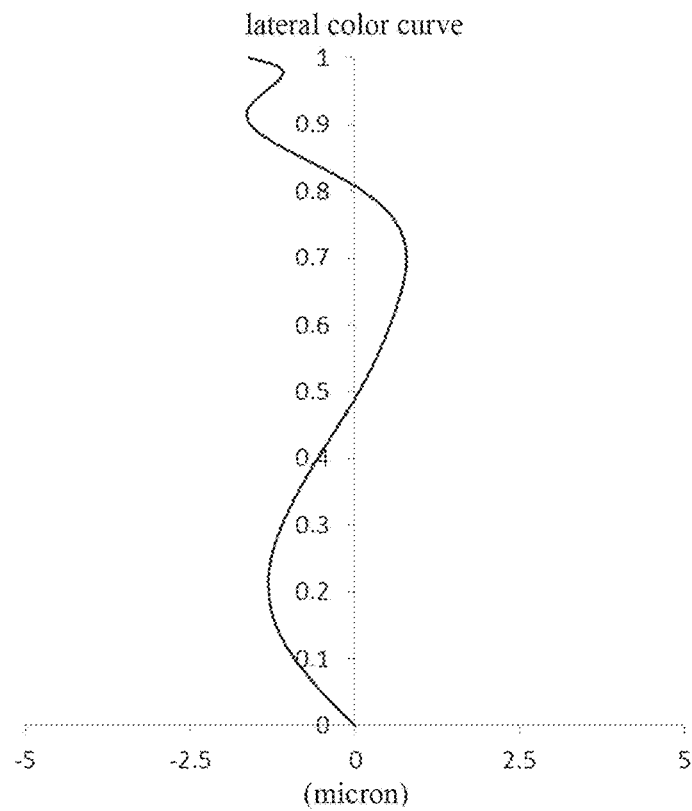

FIG. 2A shows the longitudinal aberration curve of the optical imaging lens assembly according to Embodiment 1, representing deviations of converged focal points of light of different wavelengths after passing through the lens assembly. FIG. 2B shows the astigmatic curve of the optical imaging lens assembly according to Embodiment 1, representing a curvature of the tangential image plane and a curvature of the sagittal image plane. FIG. 2C shows the distortion curve of the optical imaging lens assembly according to Embodiment 1, representing amounts of distortion at different viewing angles. FIG. 2D shows the lateral color curve of the optical imaging lens assembly according to Embodiment 1, representing deviations of different image heights on the image plane after light passes through the lens assembly. It can be seen from FIG. 2A to FIG. 2D that the optical imaging lens assembly given in Embodiment 1 can achieve a good imaging quality.

Embodiment 2

Figure 3:
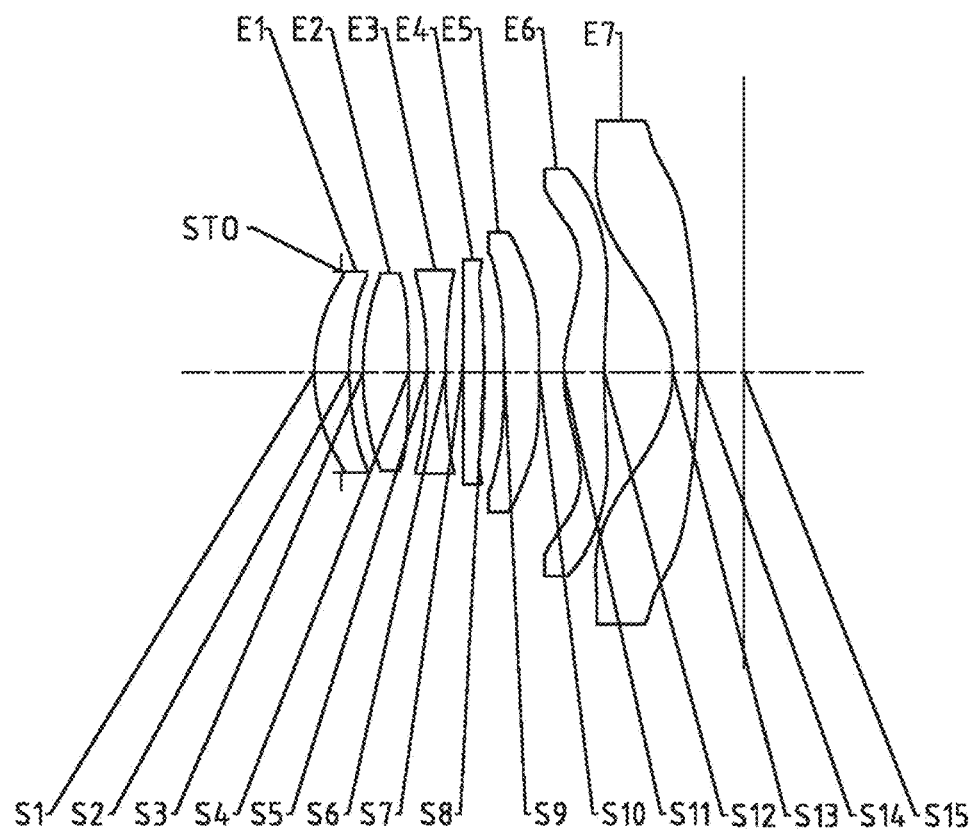
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In the present embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes a first lens E1, a second lens E2, a third lens E3, a fourth lens E4, a fifth lens E5, a sixth lens E6, a seventh lens E7 and an image plane S15 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a concave surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a convex surface, and the object-side surface S13 and the image-side surface S14 of the seventh lens E7 are both aspheric surfaces.

Light from an object passes through the surfaces S1 to S14 sequentially and is finally imaged on the image plane S15.

Alternatively, a diaphragm STO may also be disposed between the object side and the first lens E1 to further improve the imaging quality of the lens assembly.

Table 4 shows the surface type, the radius of curvature, the thickness, the material and the conic coefficient of each lens of the optical imaging lens assembly in Embodiment 2. The radius of curvature and the thickness are shown in millimeters (mm). Table 5 shows the high-order coefficients applicable to each aspheric surface in Embodiment 2. The surface type of each aspheric surface may be defined by the formula (1) given in the above Embodiment 1. Table 6 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S15 of the optical imaging lens assembly in Embodiment 2.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3227 | | | |
| S1 | aspheric | 1.9811 | 0.4168 | 1.54 | 55.7 | −1.7692 |
| S2 | aspheric | 3.0359 | 0.1673 | | | −3.5398 |
| S3 | aspheric | 2.9845 | 0.5498 | 1.55 | 56.1 | −13.0301 |
| S4 | aspheric | 129.5812 | 0.2232 | | | −22.6897 |
| S5 | aspheric | −9.0541 | 0.2200 | 1.67 | 20.4 | 31.5984 |
| S6 | aspheric | 7.7032 | 0.2060 | | | −5.3434 |
| S7 | aspheric | 18.3738 | 0.2555 | 1.55 | 56.1 | 0.0000 |
| S8 | aspheric | −8.9296 | 0.2346 | | | −8.0448 |
| S9 | aspheric | −8.4648 | 0.4192 | 1.67 | 20.4 | 18.9387 |
| S10 | aspheric | −361.2916 | 0.2964 | | | 50.0000 |
| S11 | aspheric | 1.8352 | 0.4855 | 1.55 | 56.1 | −10.9807 |
| S12 | aspheric | 9.9780 | 0.8266 | | | 0.0000 |
| S13 | aspheric | −1.3540 | 0.3000 | 1.54 | 55.7 | −0.8069 |
| S14 | aspheric | −8.7391 | 0.5499 | | | 0.0000 |
| S15 | spherical | infinite | | | | |

TABLE 5

| surface number | A4 | A6 | A8 | A10 | A12 |
|---|---|---|---|---|---|
| S1 | 1.6171E−02 | −1.6516E−02 | 9.7386E−02 | −3.0951E−01 | 5.8799E−01 |
| S2 | −2.4955E−02 | 4.1652E−04 | 1.1503E−01 | −4.0337E−01 | 8.6546E−01 |
| S3 | 1.4898E−02 | −2.9773E−02 | 8.3903E−02 | −2.0365E−01 | 4.3372E−01 |
| S4 | −6.8165E−02 | −1.1503E−02 | 1.4964E−01 | −4.9827E−01 | 9.6961E−01 |
| S5 | −7.3430E−02 | 1.1073E−01 | −1.7769E−01 | 3.2652E−01 | −6.0803E−01 |
| S6 | −1.0704E−02 | −6.9385E−02 | 5.3081E−01 | −1.4162E+00 | 2.1544E+00 |
| S7 | 7.7172E−02 | −4.2102E−01 | 8.2545E−01 | −9.5853E−01 | 6.6184E−01 |
| S8 | 1.5955E−01 | −4.3057E−01 | 3.5134E−01 | 2.3878E−01 | −8.8722E−01 |
| S9 | 8.5935E−02 | −1.1269E−01 | −1.8828E−01 | 6.8684E−01 | −9.9233E−01 |
| S10 | −1.1726E−01 | 1.1264E−01 | −2.0484E−01 | 2.6826E−01 | −2.2917E−01 |
| S11 | 5.6032E−02 | −1.1503E−01 | 9.0292E−02 | −5.8183E−02 | 2.7343E−02 |
| S12 | 1.2185E−02 | −2.0564E−02 | −1.8626E−02 | 2.4704E−02 | −1.1741E−02 |
| S13 | 6.6277E−02 | −7.3903E−02 | 7.0801E−02 | −3.3146E−02 | 9.1292E−03 |
| S14 | 2.8567E−02 | −5.1091E−02 | 4.1135E−02 | −1.7722E−02 | 4.5205E−03 |

| surface number | A14 | A16 | A18 | A20 |
|---|---|---|---|---|
| S1 | −6.8597E−01 | 4.8276E−01 | −1.8714E−01 | 3.0431E−02 |
| S2 | −1.1057E+00 | 8.4493E−01 | −3.5512E−01 | 6.2481E−02 |
| S3 | −5.6903E−01 | 4.4205E−01 | −1.8703E−01 | 3.2814E−02 |
| S4 | −1.1665E+00 | 8.4891E−01 | −3.4076E−01 | 5.7584E−02 |
| S5 | 7.2248E−01 | −4.6678E−01 | 1.4920E−01 | −1.7753E−02 |
| S6 | −2.0879E+00 | 1.2795E+00 | −4.4832E−01 | 6.7924E−02 |
| S7 | −2.1908E−01 | −3.4441E−03 | 2.3290E−02 | −5.0018E−03 |
| S8 | 9.9881E−01 | −5.7333E−01 | 1.6575E−01 | −1.9047E−02 |

TABLE 5-continued

| | | | | |
|---|---|---|---|---|
| S9 | 8.3275E−01 | −4.1140E−01 | 1.1059E−01 | −1.2531E−02 |
| S10 | 1.2649E−01 | −4.2417E−02 | 7.7567E−03 | −5.9233E−04 |
| S11 | −8.4822E−03 | 1.6174E−03 | −1.6978E−04 | 7.4572E−06 |
| S12 | 3.0077E−03 | −4.3968E−04 | 3.4530E−05 | −1.1311E−06 |
| S13 | −1.5567E−03 | 1.6198E−04 | −9.4365E−06 | 2.3612E−07 |
| S14 | −7.1307E−04 | 6.8443E−05 | −3.6543E−06 | 8.2911E−08 |

TABLE 6

| | parameter | | | | |
|---|---|---|---|---|---|
| | f1 (mm) | f2 (mm) | f3 (mm) | f4 (mm) | f5 (mm) |
| numerical value | 9.34 | 5.59 | −6.22 | 11.04 | −13.03 |
| | parameter | | | | |
| | f6 (mm) | f7 (mm) | f (mm) | TTL (mm) | ImgH (mm) |
| numerical value | 4.03 | −3.03 | 4.22 | 5.15 | 3.50 |

Figure 4A:
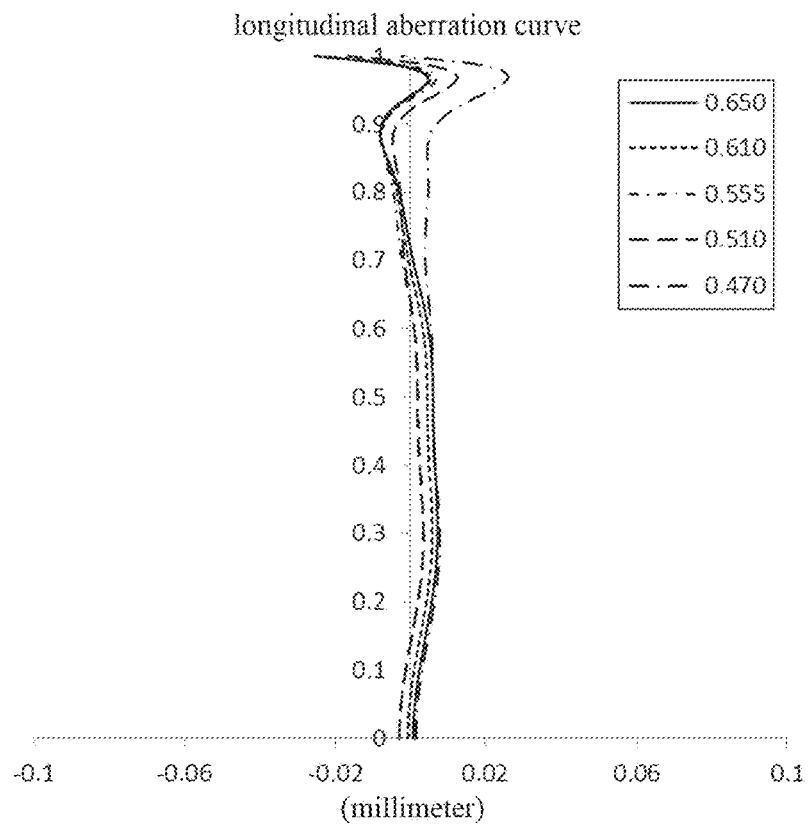
FIGS. 4A-4D respectively illustrate a longitudinal aberration curve, an astigmatic curve, a distortion curve and a lateral color curve of the optical imaging lens assembly according to Embodiment 2.
Figure 4B:
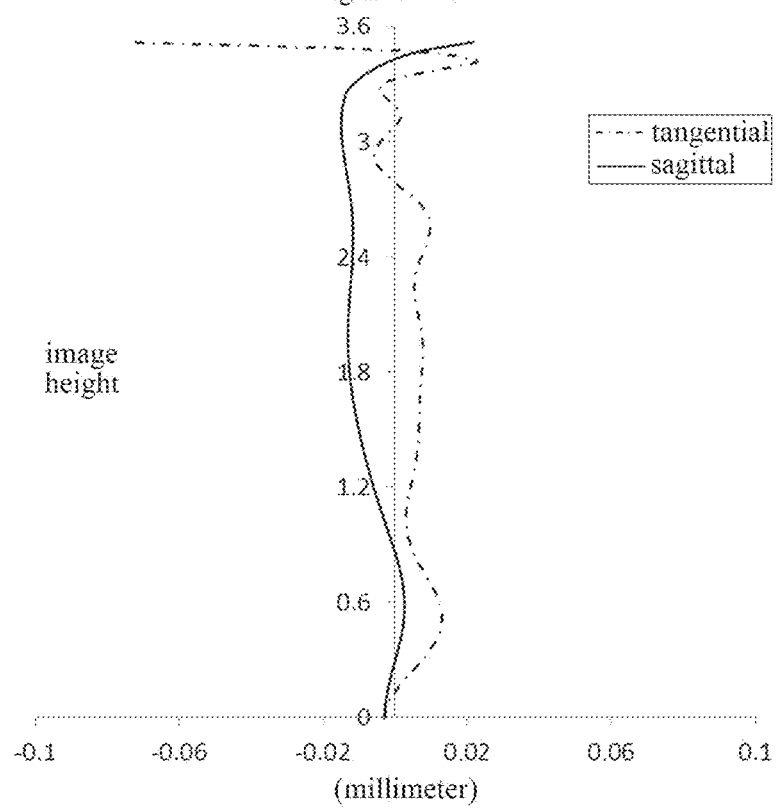
Figure 4C:
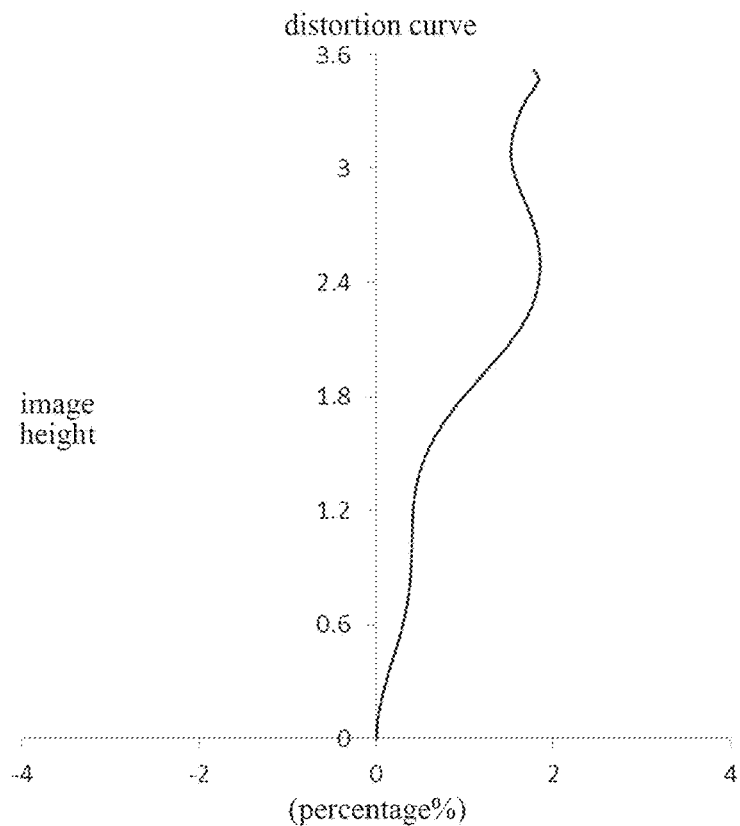
Figure 4D:
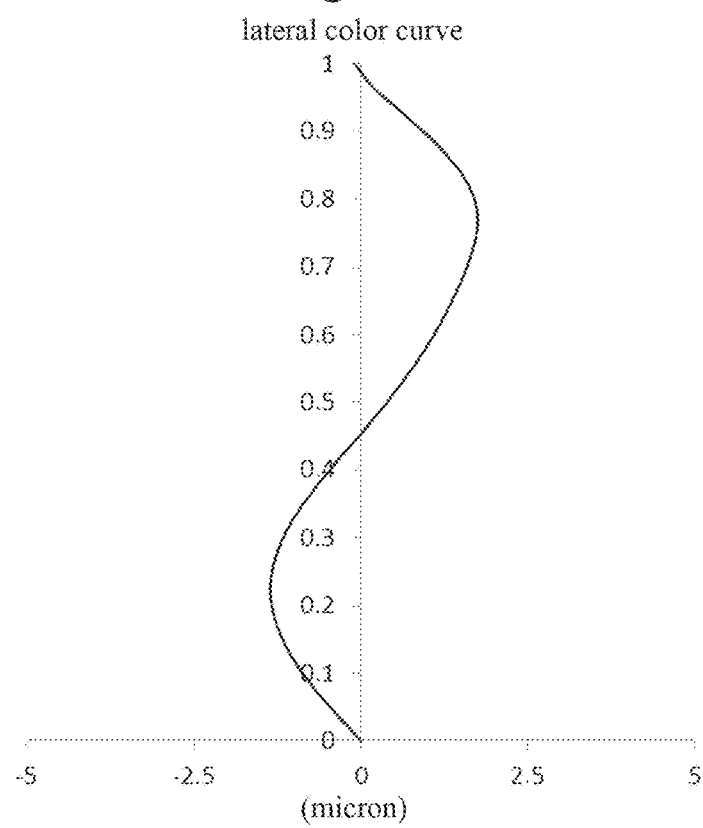

FIG. 4A shows the longitudinal aberration curve of the optical imaging lens assembly according to Embodiment 2, representing deviations of converged focal points of light of different wavelengths after passing through the lens assembly. FIG. 4B shows the astigmatic curve of the optical imaging lens assembly according to Embodiment 2, representing a curvature of the tangential image plane and a curvature of the sagittal image plane. FIG. 4C shows the distortion curve of the optical imaging lens assembly according to Embodiment 2, representing amounts of distortion at different viewing angles. FIG. 4D shows the lateral color curve of the optical imaging lens assembly according to Embodiment 2, representing deviations of different image heights on the image plane after light passes through the lens assembly. It can be seen from FIG. 4A to FIG. 4D that the optical imaging lens assembly given in Embodiment 2 can achieve a good imaging quality.

Embodiment 3

Figure 5:
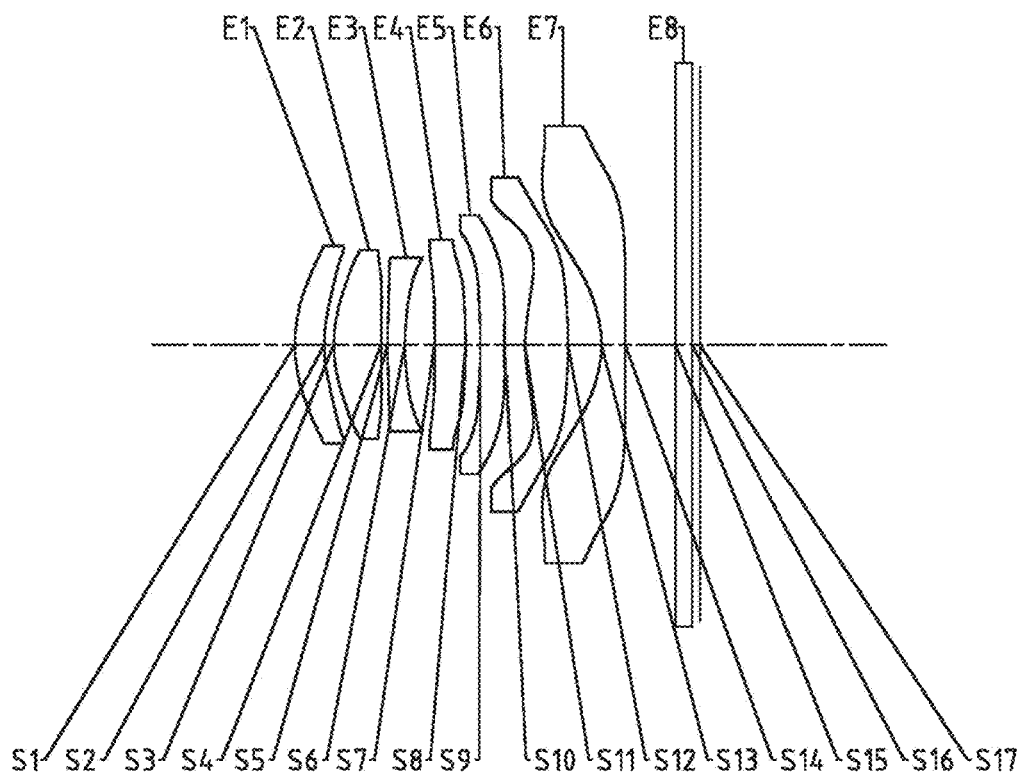
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 7 shows the surface type, the radius of curvature, the thickness, the material and the conic coefficient of each lens of the optical imaging lens assembly in Embodiment 3. The radius of curvature and the thickness are shown in millimeters (mm). Table 8 shows the high-order coefficients applicable to each aspheric surface in Embodiment 3. The surface type of each aspheric surface may be defined by the formula (1) given in the above Embodiment 1. Table 9 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 3.

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8938 | 0.3729 | 1.54 | 55.7 | −2.4815 |
| S2 | aspheric | 1.8737 | 0.1225 | | | −7.9537 |
| S3 (STO) | aspheric | 1.7385 | 0.6037 | 1.55 | 56.1 | −6.6805 |
| S4 | aspheric | 12.8238 | 0.0806 | | | −22.6441 |
| S5 | aspheric | 9.0451 | 0.2200 | 1.67 | 20.4 | 30.6158 |
| S6 | aspheric | 3.3908 | 0.3770 | | | 0.0011 |
| S7 | aspheric | 39.4347 | 0.3958 | 1.55 | 56.1 | 0.0000 |
| S8 | aspheric | −9.4964 | 0.1877 | | | −7.6507 |
| S9 | aspheric | −9.6554 | 0.3092 | 1.67 | 20.4 | 42.7934 |
| S10 | aspheric | 14.7571 | 0.2518 | | | 8.4499 |
| S11 | aspheric | 1.9955 | 0.5460 | 1.55 | 56.1 | −16.1638 |
| S12 | aspheric | −8.9168 | 0.4304 | | | 0.0000 |
| S13 | aspheric | −1.4667 | 0.3000 | 1.54 | 55.7 | −0.7884 |
| S14 | aspheric | −66.4438 | 0.6393 | | | 0.0000 |
| S15 | spherical | infinite | 0.2100 | 1.52 | 64.2 | |
| S16 | spherical | infinite | 0.1027 | | | |
| S17 | spherical | infinite | | | | |

TABLE 8

| surface number | A4 | A6 | A8 | A10 | A12 |
|---|---|---|---|---|---|
| S1 | 1.2073E−02 | −1.9351E−02 | 3.7343E−02 | −7.7892E−02 | 1.0588E−01 |
| S2 | 3.3235E−02 | −1.5417E−01 | 2.1092E−02 | −2.2566E−01 | 1.9521E−01 |
| S3 | 8.5667E−02 | −1.6785E−01 | 2.3040E−01 | −3.2084E−01 | 3.8027E−01 |
| S4 | −5.2823E−02 | 7.6796E−03 | −1.7010E−01 | 6.0811E−01 | −1.0815E+00 |
| S5 | −9.4588E−02 | 1.2556E−01 | −3.9701E−01 | 1.3197E+00 | −2.5585E+00 |
| S6 | −3.6807E−02 | 6.0165E−02 | 2.8487E−02 | −9.4307E−02 | 1.7023E−01 |
| S7 | −2.5178E−02 | −6.6618E−02 | −1.4457E−01 | 8.8118E−01 | −1.8710E+00 |
| S8 | 8.0704E−02 | −2.8658E−01 | 4.5709E−01 | −8.2027E−01 | 1.1850E+00 |
| S9 | 3.3781E−02 | 1.1343E−01 | −5.7640E−01 | 1.1086E+00 | −1.3088E+00 |
| S10 | −2.2975E−01 | 4.6141E−01 | −8.2723E−01 | 1.0489E+00 | −9.0917E−01 |
| S11 | −2.7549E−02 | −2.3671E−03 | −4.9872E−02 | −6.9358E−02 | −5.6886E−02 |
| S12 | −3.1045E−02 | 6.9656E−02 | −1.1833E−01 | 9.9107E−02 | −5.2983E−02 |
| S13 | 4.7411E−02 | 1.3926E−02 | −4.9251E−02 | 4.2511E−02 | −1.7313E−02 |
| S14 | 3.6032E−02 | −4.3828E−02 | 2.3214E−02 | −7.8324E−03 | 1.7279E−03 |
| surface number | A14 | A16 | A18 | A20 | |
| S1 | −9.4942E−02 | 5.4139E−02 | −1.7068E−02 | 2.2121E−03 | |
| S2 | −9.7115E−02 | 1.6777E−02 | 5.4321E−03 | −2.1484E−03 | |
| S3 | −2.8334E−01 | 1.2556E−01 | −3.1723E−02 | 3.6867E−03 | |
| S4 | 1.1550E+00 | −7.4782E−01 | 2.6901E−01 | −4.1001E−02 | |
| S5 | 2.9389E+00 | −2.0070E+00 | 7.5457E−01 | −1.2002E−01 | |
| S6 | −3.0989E−01 | 3.5668E−01 | −2.0513E−01 | 4.6127E−02 | |
| S7 | 2.1829E+00 | −1.4571E+00 | 5.3114E−01 | −8.3844E−02 | |
| S8 | −1.1503E+00 | 6.9775E−01 | −2.3261E−01 | 3.1940E−02 | |
| S9 | 9.5615E−01 | −4.1143E−01 | 9.4836E−02 | −9.0042E−03 | |
| S10 | 5.1467E−01 | −1.7905E−01 | 3.4450E−02 | −2.7938E−03 | |
| S11 | 2.7503E−02 | −7.7820E−03 | 1.2291E−03 | −8.4550E−05 | |
| S12 | 1.8356E−02 | −3.8520E−03 | 4.3815E−04 | −2.0621E−05 | |
| S13 | 3.9418E−03 | −5.1974E−04 | 3.7348E−05 | −1.1376E−06 | |
| S14 | −2.5283E−04 | 2.3811E−05 | −1.2851E−06 | 2.9294E−08 | |

TABLE 9

| | parameter | | | |
|---|---|---|---|---|
| | f1 (mm) | f2 (mm) | f3 (mm) | f4 (mm) | f5 (mm) |
| numerical value | 60.04 | 3.61 | −8.28 | 14.06 | −8.72 |

| | parameter | | | |
|---|---|---|---|---|
| | f6 (mm) | f7 (mm) | f (mm) | TTL (mm) | ImgH (mm) |
| numerical value | 3.04 | −2.80 | 4.22 | 5.15 | 3.52 |

Figure 6A:
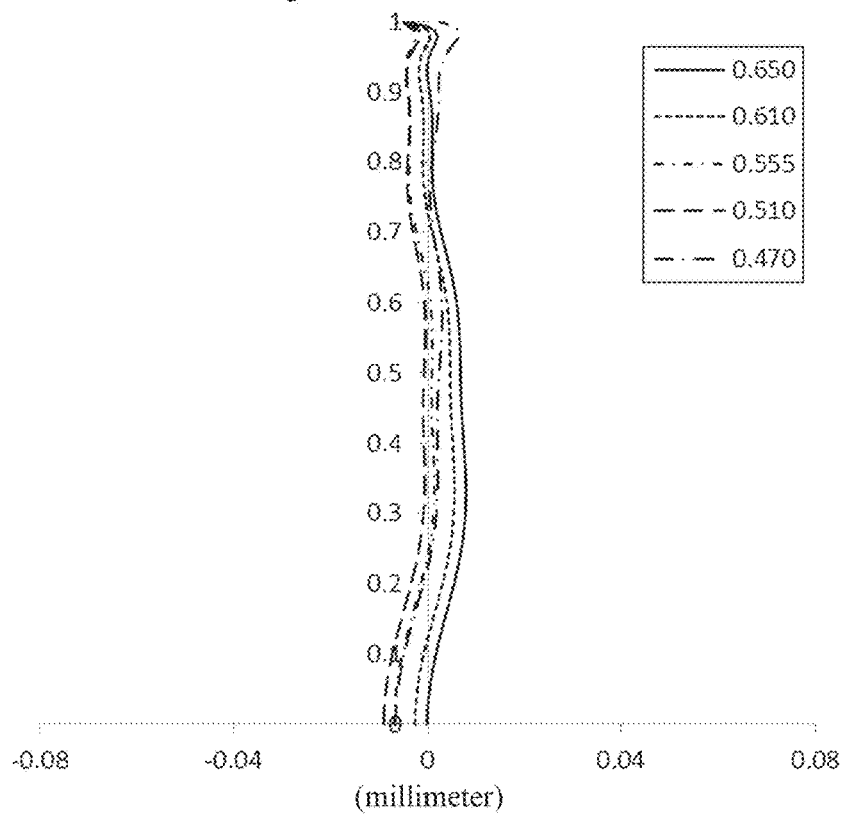
FIGS. 6A-6D respectively illustrate a longitudinal aberration curve, an astigmatic curve, a distortion curve and a lateral color curve of the optical imaging lens assembly according to Embodiment 3.
Figure 6B:
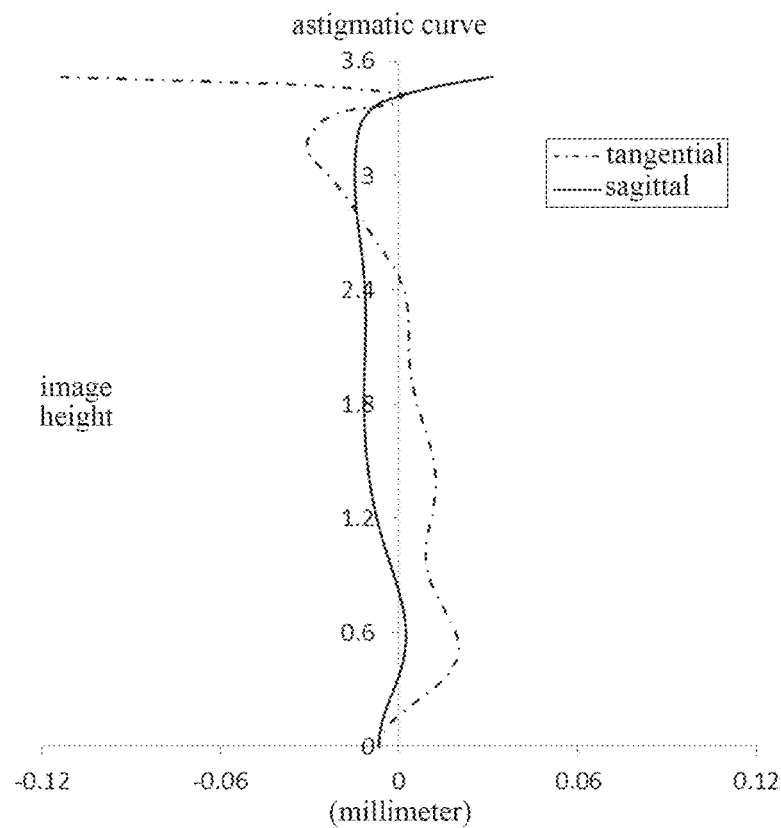
Figure 6C:
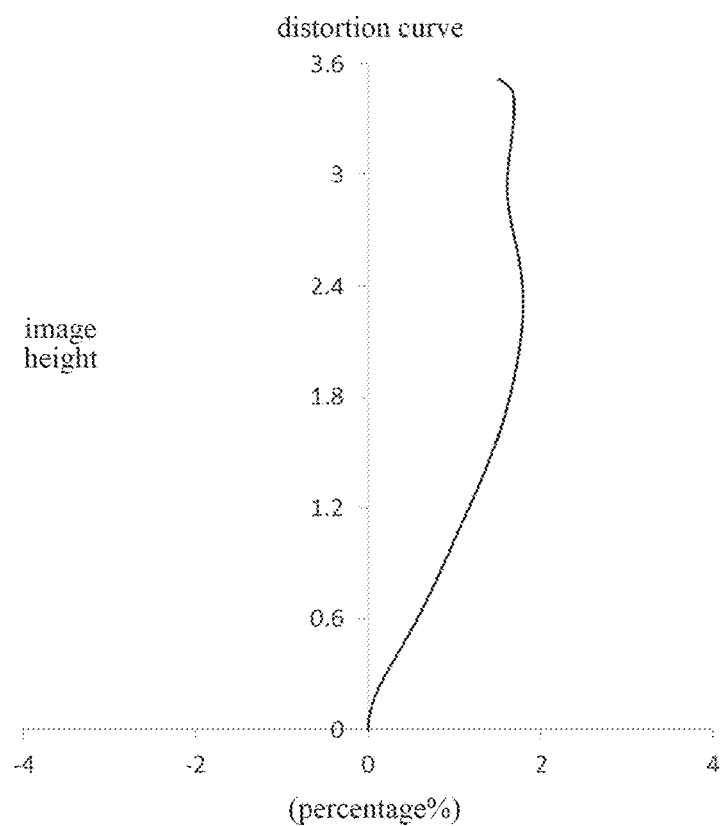
Figure 6D:
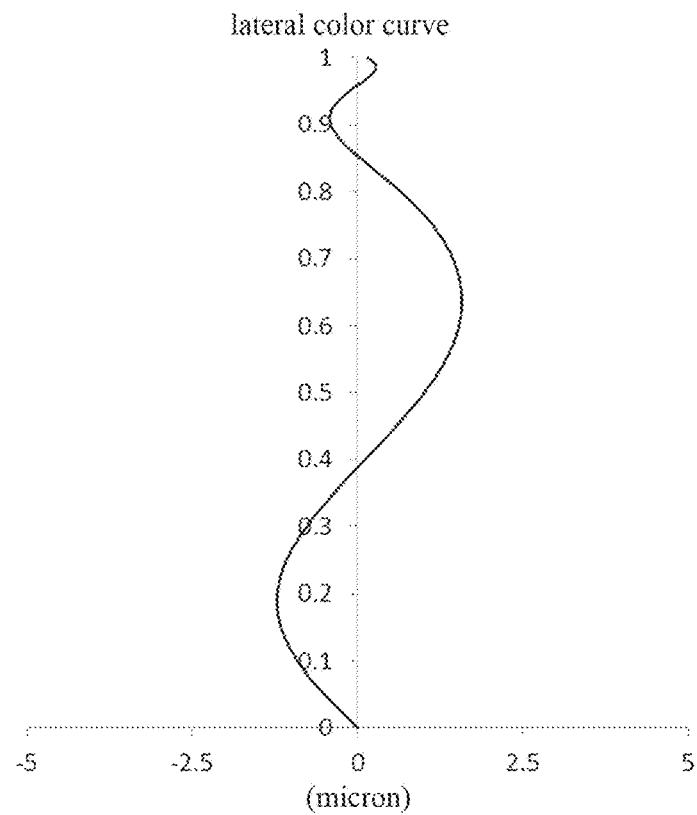

FIG. 6A shows the longitudinal aberration curve of the optical imaging lens assembly according to Embodiment 3, representing deviations of converged focal points of light of different wavelengths after passing through the lens assembly. FIG. 6B shows the astigmatic curve of the optical imaging lens assembly according to Embodiment 3, representing a curvature of the tangential image plane and a curvature of the sagittal image plane. FIG. 6C shows the distortion curve of the optical imaging lens assembly according to Embodiment 3, representing amounts of distortion at different viewing angles. FIG. 6D shows the lateral color curve of the optical imaging lens assembly according to Embodiment 3, representing deviations of different image heights on the image plane after light passes through the lens assembly. It can be seen from FIG. 6A to FIG. 6D that the optical imaging lens assembly given in Embodiment 3 can achieve a good imaging quality.

Embodiment 4

Figure 7:
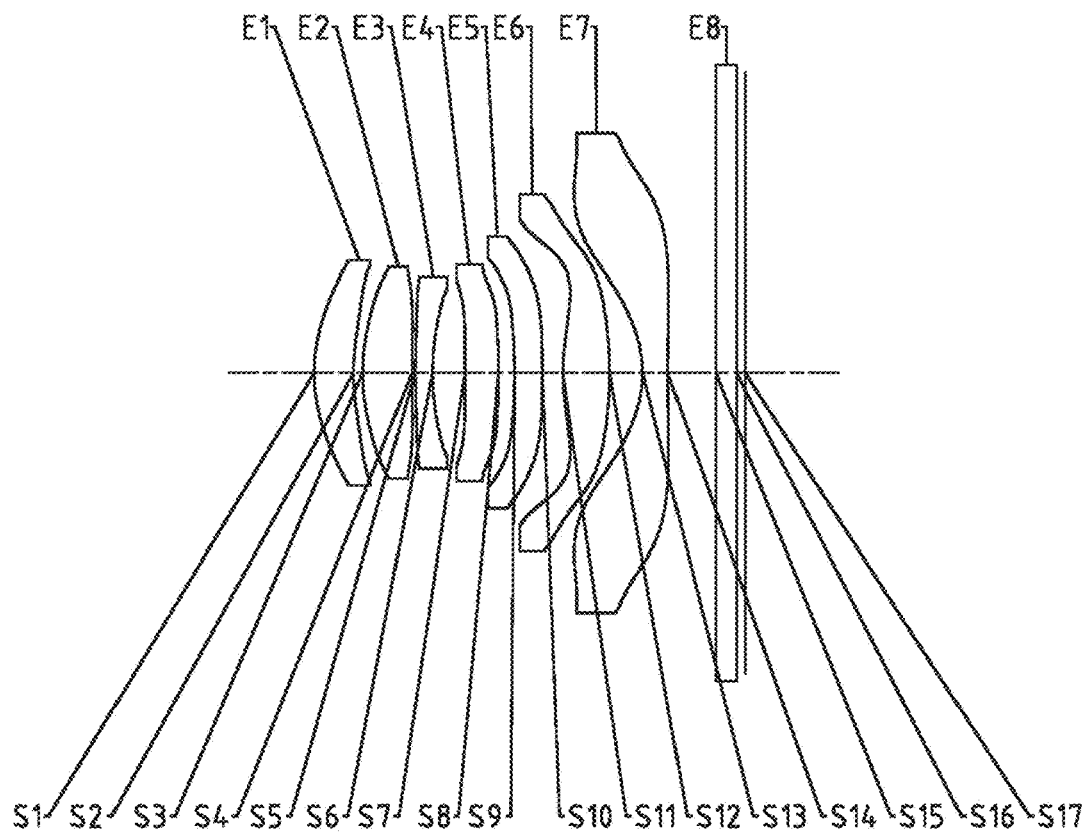
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 10 shows the surface type, the radius of curvature, the thickness, the material and the conic coefficient of each lens of the optical imaging lens assembly in Embodiment 4. The radius of curvature and the thickness are shown in millimeters (mm). Table 11 shows the high-order coefficients applicable to each aspheric surface in Embodiment 4. The surface type of each aspheric surface may be defined by the formula (1) given in the above Embodiment 1. Table 12 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens

TABLE 10

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 1.9978 | 0.4734 | 1.54 | 55.7 | −2.1953 |
| S2 | aspheric | 2.9877 | 0.1078 | | | −10.5826 |
| S3 (STO) | aspheric | 2.3721 | 0.5876 | 1.55 | 56.1 | −7.6667 |
| S4 | aspheric | 13.1960 | 0.0336 | | | −13.1351 |
| S5 | aspheric | 6.9709 | 0.2100 | 1.67 | 20.4 | 0.0000 |
| S6 | aspheric | 3.1138 | 0.3870 | | | −1.7474 |
| S7 | aspheric | 24.6894 | 0.4016 | 1.55 | 56.1 | 0.0000 |

TABLE 10-continued

| surface number | surface type | radius of curvature | thickness | material refractive index | abbe number | conic coefficient |
|---|---|---|---|---|---|---|
| S8 | aspheric | −15.7861 | 0.1947 | | | 50.0000 |
| S9 | aspheric | −7.5275 | 0.3309 | 1.67 | 20.4 | 0.0000 |
| S10 | aspheric | 40.7259 | 0.2466 | | | −99.0000 |
| S11 | aspheric | 2.2163 | 0.5590 | 1.55 | 56.1 | −11.0017 |
| S12 | aspheric | −5.6584 | 0.3969 | | | 0.0000 |
| S13 | aspheric | −1.4343 | 0.3000 | 1.54 | 55.7 | −0.7995 |
| S14 | aspheric | 26.9094 | 0.5690 | | | 0.0000 |
| S15 | spherical | infinite | 0.2471 | 1.52 | 64.2 | |
| S16 | spherical | infinite | 0.1050 | | | |
| S17 | spherical | infinite | | | | |

TABLE 11

| surface number | A4 | A6 | A8 | A10 | A12 |
|---|---|---|---|---|---|
| S1 | 1.6500E−02 | 7.6900E−03 | −7.2900E−02 | 1.5400E−01 | −2.0000E−01 |
| S2 | 1.2000E−02 | −9.8400E−02 | 1.0700E−01 | −9.8100E−02 | 1.1100E−01 |
| S3 | 5.6500E−02 | −8.2600E−02 | −2.7500E−02 | 2.7200E−01 | −4.9500E−01 |
| S4 | −1.9200E−02 | −1.6200E−01 | 2.3700E−01 | −1.0000E−01 | −3.3200E−02 |
| S5 | −5.9800E−02 | −1.2100E−01 | 5.0300E−01 | −9.7000E−01 | 1.4800E+00 |
| S6 | −2.8100E−02 | −6.0000E−02 | 5.9800E−01 | −1.7000E+00 | 2.9600E+00 |
| S7 | −5.8600E−02 | 2.7800E−02 | −5.6200E−01 | 2.1600E+00 | −4.6500E+00 |
| S8 | 7.7800E−03 | −7.0200E−02 | −5.3600E−02 | 5.2500E−02 | 2.0100E−02 |
| S9 | −5.1600E−02 | 3.0800E−01 | −8.6600E−01 | 1.3600E+00 | −1.5300E+00 |
| S10 | −2.6000E−01 | 5.1000E−01 | −7.7900E−01 | 8.2800E−01 | −6.4700E−01 |
| S11 | −1.4500E−01 | 1.9300E−01 | −2.5000E−01 | 2.2900E−01 | −1.5900E−01 |
| S12 | −3.5300E−02 | 3.3400E−02 | −3.3900E−02 | 3.0300E−02 | −2.7100E−02 |
| S13 | 2.9100E−02 | 9.8400E−03 | −2.3600E−02 | 2.1600E−02 | −8.9000E−03 |
| S14 | 2.3200E−03 | −1.5300E−02 | 6.3500E−03 | −7.9500E−04 | −2.8600E−04 |

| surface number | A14 | A16 | A18 | A20 |
|---|---|---|---|---|
| S1 | 1.6100E−01 | −7.7600E−02 | 2.0900E−02 | −2.4500E−03 |
| S2 | −8.2200E−02 | 3.0300E−02 | −2.7400E−03 | −7.7300E−04 |
| S3 | 5.5600E−01 | −3.8300E−01 | 1.4500E−01 | −2.3100E−02 |
| S4 | −1.6600E−02 | 8.3600E−02 | −5.2400E−02 | 9.9800E−03 |
| S5 | −1.7100E+00 | 1.2700E+00 | −5.1200E−01 | 8.5400E−02 |
| S6 | −3.3100E+00 | 2.2600E+00 | −8.3700E−01 | 1.2800E−01 |
| S7 | 6.1200E+00 | −4.8900E+00 | 2.1900E+00 | −4.1900E−01 |
| S8 | −3.4700E−02 | 5.2100E−03 | 1.2300E−02 | −4.9200E−03 |
| S9 | 1.1500E+00 | −5.1900E−01 | 1.2700E−01 | −1.2900E−02 |
| S10 | 3.5500E−01 | −1.2400E−01 | 2.4200E−02 | −1.9900E−03 |
| S11 | 7.2300E−02 | −1.9600E−02 | 2.9500E−03 | −1.9200E−04 |
| S12 | 1.4200E−02 | −3.8800E−03 | 5.2300E−04 | −2.7800E−05 |
| S13 | 1.9900E−03 | −2.5500E−04 | 1.7600E−05 | −5.1400E−07 |
| S14 | 1.2400E−04 | −1.9600E−05 | 1.4800E−06 | −4.5100E−08 |

TABLE 12

| parameter | f1 (mm) | f2 (mm) | f3 (mm) | f4 (mm) | f5 (mm) |
|---|---|---|---|---|---|
| numerical value | 9.63 | 5.20 | −8.64 | 17.70 | −9.52 |

| parameter | f6 (mm) | f7 (mm) | f (mm) | TTL (mm) | ImgH (mm) |
|---|---|---|---|---|---|
| numerical value | 2.99 | −2.53 | 4.27 | 5.15 | 3.57 |

Figure 8A:
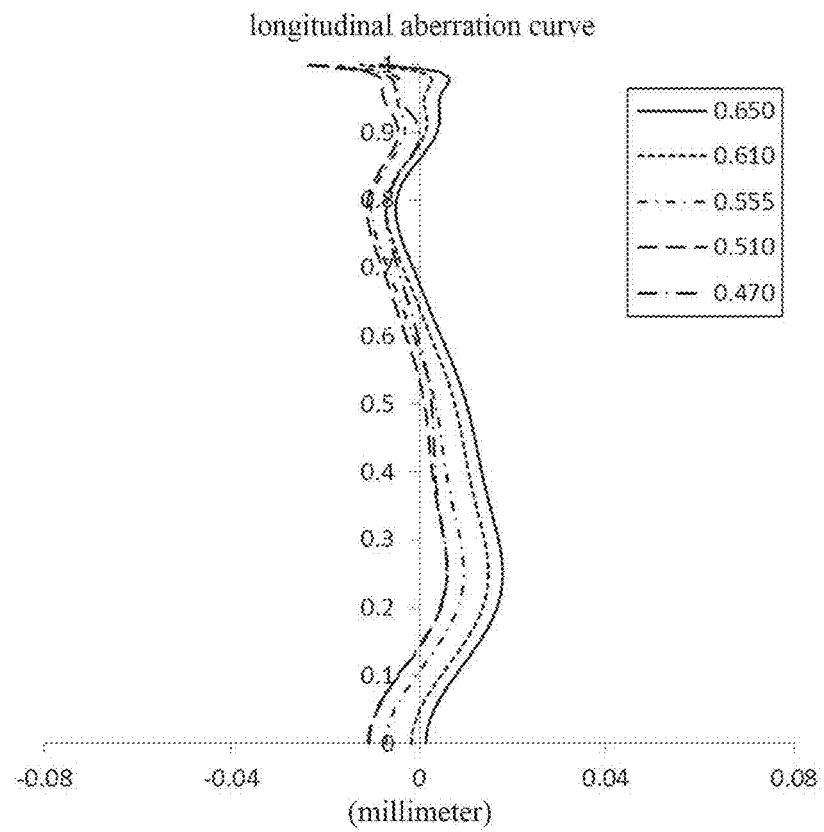
FIGS. 8A-8D respectively illustrate a longitudinal aberration curve, an astigmatic curve, a distortion curve and a lateral color curve of the optical imaging lens assembly according to Embodiment 4.
Figure 8B:
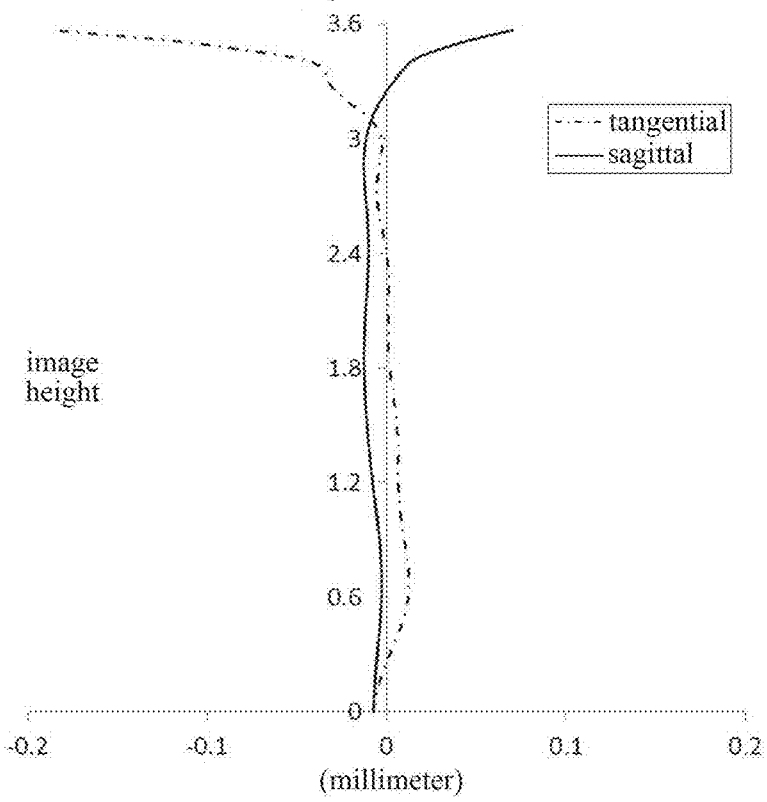
Figure 8C:
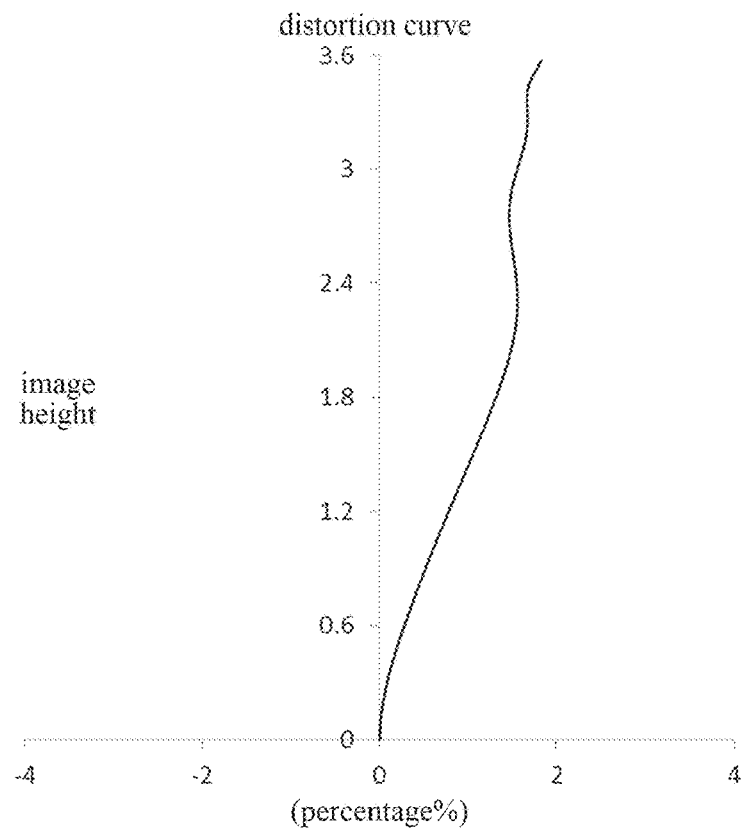
Figure 8D:
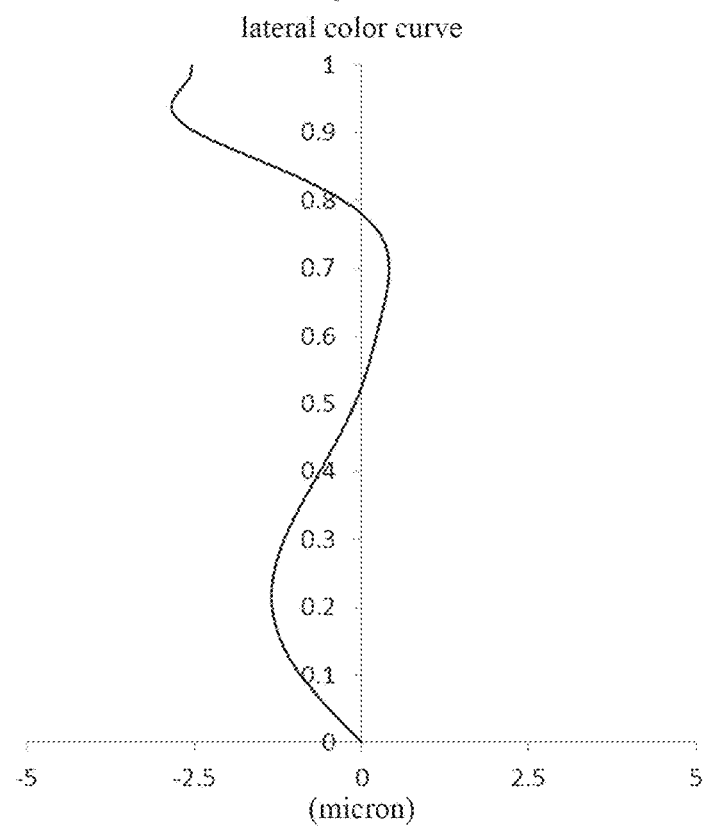

FIG. 8A shows the longitudinal aberration curve of the optical imaging lens assembly according to Embodiment 4, representing deviations of converged focal points of light of different wavelengths after passing through the lens assembly. FIG. 8B shows the astigmatic curve of the optical imaging lens assembly according to Embodiment 4, representing a curvature of the tangential image plane and a curvature of the sagittal image plane. FIG. 8C shows the distortion curve of the optical imaging lens assembly according to Embodiment 4, representing amounts of distortion at different viewing angles. FIG. 8D shows the lateral color curve of the optical imaging lens assembly according to Embodiment 4, representing deviations of different image heights on the image plane after light passes through the lens assembly. It can be seen from FIG. 8A to FIG. 8D that the optical imaging lens assembly given in Embodiment 4 can achieve a good imaging quality.

Embodiment 5

Figure 9:
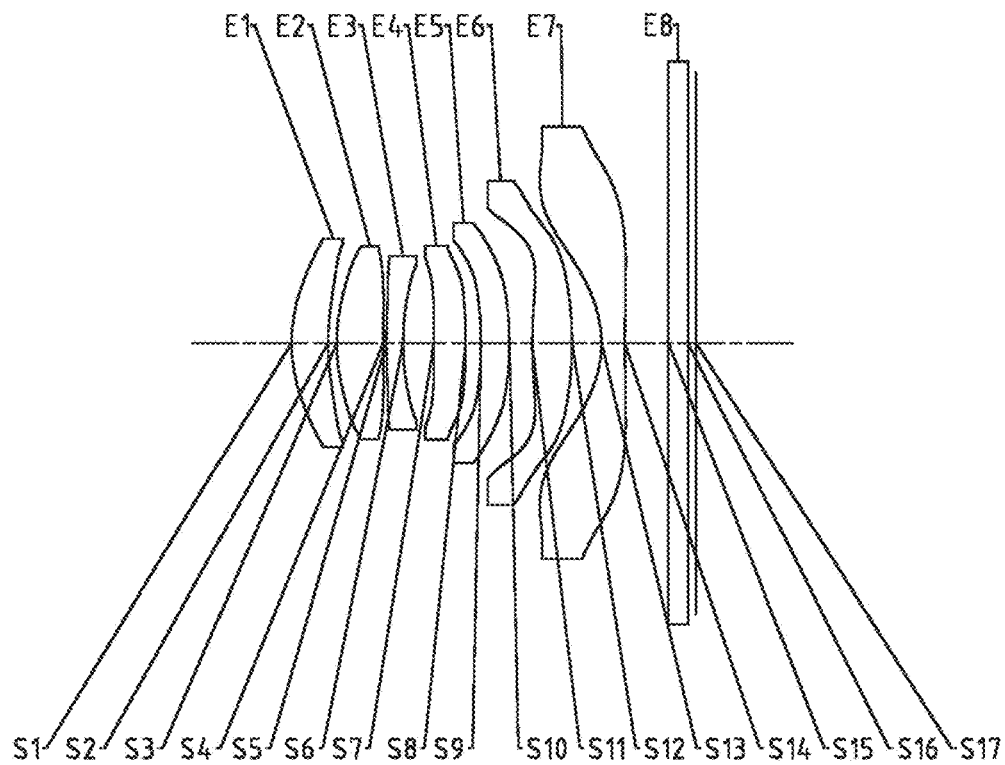
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 13 shows the surface type, the radius of curvature, the thickness, the material and the conic coefficient of each lens of the optical imaging lens assembly in Embodiment 5. The radius of curvature and the thickness are shown in millimeters (mm). Table 14 shows the high-order coefficients applicable to each aspheric surface in Embodiment 5. The surface type of each aspheric surface may be defined by the formula (1) given in the above Embodiment 1. Table 15 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 5.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.0387 | 0.4737 | 1.54, | 55.7 | −2.2830 |
| S2 | aspheric | 3.0942 | 0.1128 | | | −10.9743 |
| S3 (STO) | aspheric | 2.4058 | 0.6037 | 1.55, | 56.1 | −7.4496 |
| S4 | aspheric | 14.7559 | 0.0406 | | | 10.9357 |
| S5 | aspheric | 7.5864 | 0.2159 | 1.67, | 20.4 | 0.0000 |
| S6 | aspheric | 3.2108 | 0.3990 | | | −1.9907 |
| S7 | aspheric | 76.6006 | 0.4127 | 1.55, | 56.1 | 0.0000 |
| S8 | aspheric | −11.0999 | 0.1994 | | | 49.9878 |
| S9 | aspheric | −4.8826 | 0.3603 | 1.67, | 20.4 | 0.0000 |
| S10 | aspheric | −5.2315 | 0.2952 | | | −68.3809 |
| S11 | aspheric | 4.0724 | 0.5184 | 1.55, | 56.1 | −8.1126 |
| S12 | aspheric | −5.5397 | 0.3834 | | | 0.0000 |
| S13 | aspheric | −1.4702 | 0.3000 | 1.54, | 55.7 | −0.7950 |
| S14 | aspheric | 27.6944 | 0.5646 | | | 0.0000 |
| S15 | spherical | infinite | 0.2539 | 1.52, | 64.2 | |
| S16 | spherical | infinite | 0.1050 | | | |
| S17 | spherical | infinite | | | | |

TABLE 14

| surface number | A4 | A6 | A8 | A10 | A12 |
|---|---|---|---|---|---|
| S1 | 1.7800E−02 | −9.2600E−03 | −1.5400E−02 | 3.6000E−02 | −4.7600E−02 |
| S2 | 8.9700E−03 | −9.5400E−02 | 1.2200E−01 | −1.3500E−01 | 1.5000E−01 |
| S3 | 5.4500E−02 | −9.7500E−02 | 9.6300E−02 | −6.8700E−02 | 4.7500E−02 |
| S4 | −3.3000E−02 | −1.2300E−01 | 3.6800E−01 | −7.7800E−01 | 1.1700E+00 |

TABLE 14-continued

| | | | | | |
|---|---|---|---|---|---|
| S5 | −7.3800E−02 | −7.9000E−02 | 5.8300E−01 | −1.4800E+00 | 2.3400E+00 |
| S6 | −3.2400E−02 | −2.5800E−02 | 4.7200E−01 | −1.3700E+00 | 2.3000E+00 |
| S7 | −5.5700E−02 | −6.4900E−02 | 7.0600E−02 | 1.8500E−01 | −9.7100E−01 |
| S8 | −2.5600E−03 | −1.6500E−01 | 2.8800E−01 | −4.5400E−01 | 4.0900E−01 |
| S9 | 5.1200E−03 | 6.0700E−02 | −4.3800E−01 | 9.7200E−01 | −1.3800E+00 |
| S10 | −1.3500E−01 | 2.0500E−01 | −3.4000E−01 | 4.1900E−01 | −3.9700E−01 |
| S11 | −1.4100E−01 | 1.7800E−01 | −2.6000E−01 | 2.8500E−01 | −2.3000E−01 |
| S12 | −6.2300E−02 | 9.2900E−02 | −9.5500E−02 | 7.2400E−02 | −4.7000E−02 |
| S13 | 2.5200E−02 | 1.8100E−02 | −3.4200E−02 | 2.8400E−02 | −1.1500E−02 |
| S14 | 1.4600E−02 | −3.1200E−02 | 1.5600E−02 | −4.1200E−03 | 5.5900E−04 |

| surface number | A14 | A16 | A18 | A20 |
|---|---|---|---|---|
| S1 | 3.6400E−02 | −1.5300E−02 | 3.5800E−03 | −3.9900E−04 |
| S2 | −1.1200E−01 | 4.8700E−02 | −1.0100E−02 | 5.1700E−04 |
| S3 | 5.2100E−03 | −3.7800E−02 | 2.4500E−02 | −5.2900E−03 |
| S4 | −1.1400E+00 | 6.8800E−01 | −2.3100E−01 | 3.2700E−02 |
| S5 | −2.3700E+00 | 1.5000E+00 | −5.3500E−01 | 8.1600E−02 |
| S6 | −2.4500E+00 | 1.6200E+00 | −5.9800E−01 | 9.3500E−02 |
| S7 | 1.8200E+00 | −1.8100E+00 | 9.4500E−01 | −2.0200E−01 |
| S8 | −1.3900E−01 | −6.0100E−02 | 6.8600E−02 | −1.6900E−02 |
| S9 | 1.2200E+00 | −6.2500E−01 | 1.7200E−01 | −1.9900E−02 |
| S10 | 2.6200E−01 | −1.0600E−01 | 2.3300E−02 | −2.1200E−03 |
| S11 | 1.1700E−01 | −3.5800E−02 | 5.9700E−03 | −4.2300E−04 |
| S12 | 2.0500E−02 | −5.1200E−03 | 6.6100E−04 | −3.4400E−05 |
| S13 | 2.5800E−03 | −3.3600E−04 | 2.3800E−05 | −7.1500E−07 |
| S14 | −2.3900E−05 | −3.3100E−06 | 4.8700E−07 | −1.9400E−08 |

TABLE 15

| | parameter | | | | |
|---|---|---|---|---|---|
| | f1 (mm) | f2 (mm) | f3 (mm) | f4 (mm) | f5 (mm) |
| numerical value | 9.63 | 5.29 | −8.82 | 17.60 | −9.44 |

| | parameter | | | | |
|---|---|---|---|---|---|
| | f6 (mm) | f7 (mm) | f (mm) | TTL (mm) | ImgH (mm) |
| numerical value | 2.98 | −2.54 | 4.26 | 5.17 | 3.60 |

Figure 10A:
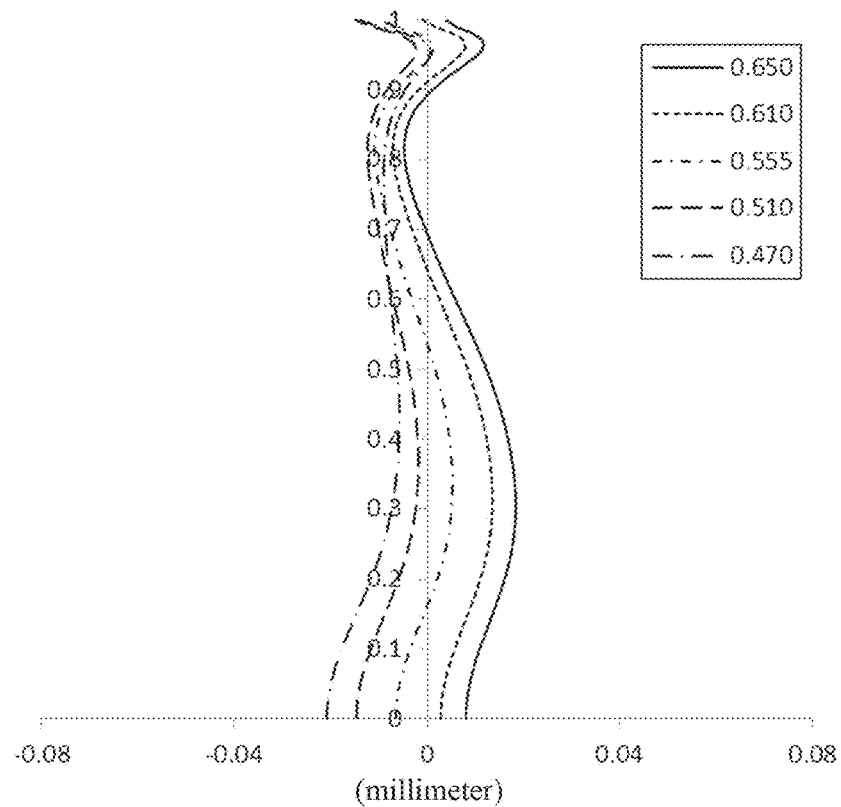
FIGS. 10A-10D respectively illustrate a longitudinal aberration curve, an astigmatic curve, a distortion curve and a lateral color curve of the optical imaging lens assembly according to Embodiment 5.
Figure 10B:
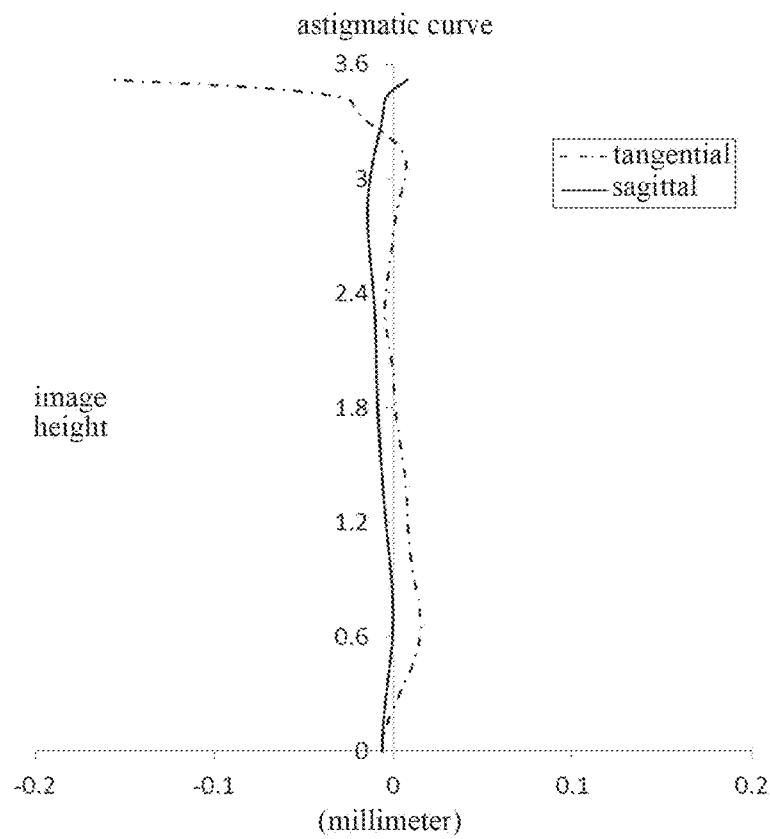
Figure 10C:
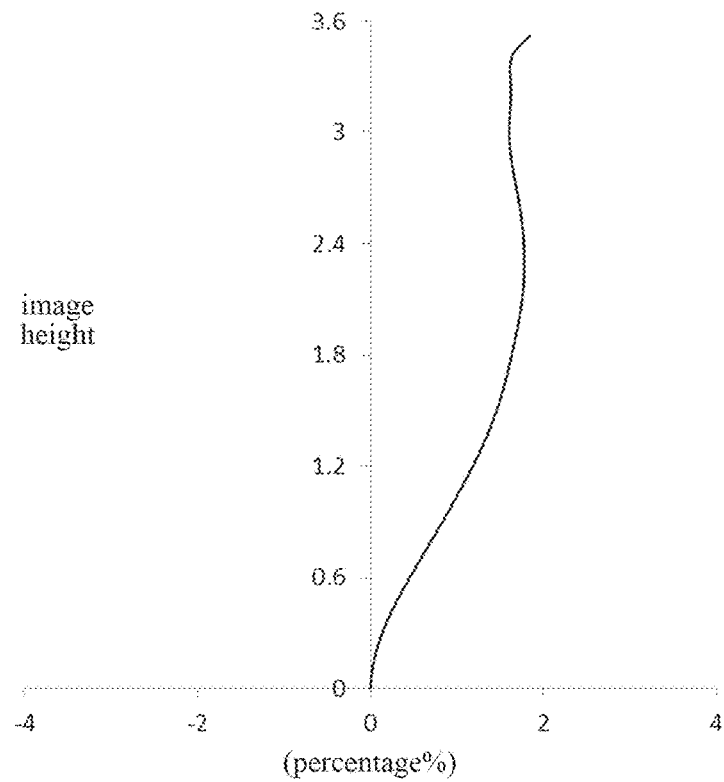
Figure 10D:
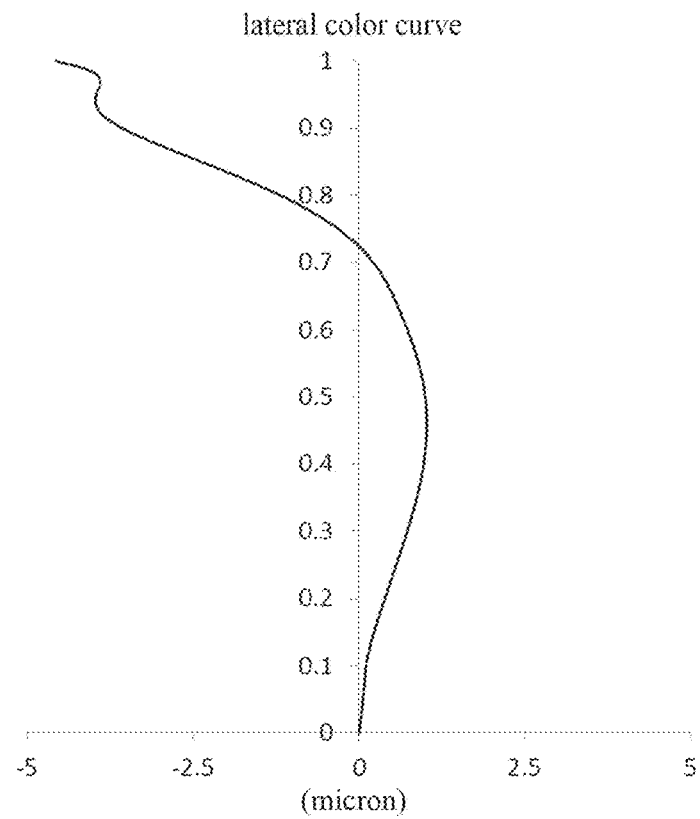

FIG. 10A shows the longitudinal aberration curve of the optical imaging lens assembly according to Embodiment 5, representing deviations of converged focal points of light of different wavelengths after passing through the lens assembly. FIG. 10B shows the astigmatic curve of the optical imaging lens assembly according to Embodiment 5, representing a curvature of the tangential image plane and a curvature of the sagittal image plane. FIG. 10C shows the distortion curve of the optical imaging lens assembly according to Embodiment 5, representing amounts of distortion at different viewing angles. FIG. 10D shows the lateral color curve of the optical imaging lens assembly according to Embodiment 5, representing deviations of different image heights on the image plane after light passes through the lens assembly. It can be seen from FIG. 10A to FIG. 10D that the optical imaging lens assembly given in Embodiment 5 can achieve a good imaging quality.

Embodiment 6

Figure 11:
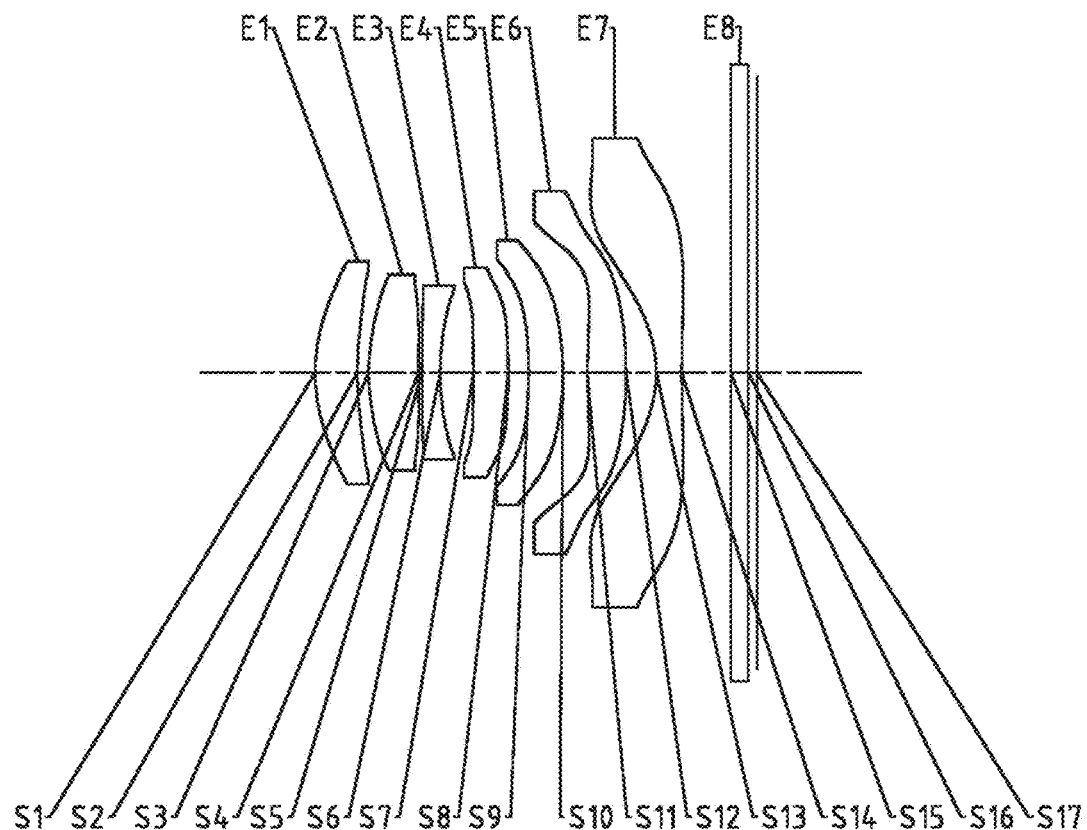
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 16 shows the surface type, the radius of curvature, the thickness, the material and the conic coefficient of each lens of the optical imaging lens assembly in Embodiment 6. The radius of curvature and the thickness are shown in millimeters (mm). Table 17 shows the high-order coefficients applicable to each aspheric surface in Embodiment 6. The surface type of each aspheric surface may be defined by the formula (1) given in the above Embodiment 1. Table 18 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.0848 | 0.5042 | 1.54 | 55.7 | −2.2847 |
| S2 | aspheric | 3.8904 | 0.1394 | | | −10.9592 |
| S3 (STO) | aspheric | 2.7502 | 0.5984 | 1.55 | 56.1 | −7.5228 |
| S4 | aspheric | 28.0918 | 0.0410 | | | 35.8438 |
| S5 | aspheric | 9.9276 | 0.2194 | 1.67 | 20.4 | 0.0000 |
| S6 | aspheric | 3.1287 | 0.3990 | | | −1.9742 |
| S7 | aspheric | 73.8604 | 0.4172 | 1.55 | 56.1 | 0.0000 |
| S8 | aspheric | −9.6371 | 0.2482 | | | 50.0000 |
| S9 | aspheric | −4.3581 | 0.3980 | 1.67 | 20.4 | 0.0000 |
| S10 | aspheric | −3.7134 | 0.2943 | | | −46.2659 |
| S11 | aspheric | 5.8839 | 0.4664 | 1.55 | 56.1 | −4.3577 |
| S12 | aspheric | −5.5546 | 0.3633 | | | 0.0000 |
| S13 | aspheric | −1.4847 | 0.3028 | 1.54 | 55.7 | −0.7927 |
| S14 | aspheric | 18.9853 | 0.5928 | | | 0.0000 |
| S15 | spherical | infinite | 0.2100 | 1.52 | 64.2 | |
| S16 | spherical | infinite | 0.1050 | | | |
| S17 | spherical | infinite | | | | |

TABLE 17

| surface number | A4 | A6 | A8 | A10 | A12 |
|---|---|---|---|---|---|
| S1 | 1.4200E−02 | 9.5900E−03 | −6.4300E−02 | 1.1200E−01 | −1.2300E−01 |
| S2 | −3.5200E−03 | −3.7300E−02 | −1.3200E−02 | 7.0100E−02 | −5.2500E−02 |
| S3 | 4.4200E−02 | −5.8600E−02 | 3.6000E−02 | −5.5600E−02 | 1.6300E−01 |
| S4 | −5.4800E−02 | 1.6500E−01 | −9.2800E−01 | 2.3100E+00 | −3.2400E+00 |
| S5 | −1.0300E−01 | 2.4500E−01 | −8.3800E−01 | 1.8700E+00 | −2.3900E+00 |
| S6 | −4.6900E−02 | 9.5200E−02 | −3.2100E−03 | −3.1800E−01 | 9.5300E−01 |
| S7 | −7.3700E−02 | 3.5700E−02 | −3.0600E−01 | 1.1300E+00 | −2.6200E+00 |
| S8 | −3.6800E−02 | −7.8300E−03 | −2.3500E−01 | 7.3500E−01 | −1.3400E+00 |
| S9 | 5.2500E−03 | 1.1300E−01 | −7.0200E−01 | 1.5900E+00 | −2.2400E+00 |
| S10 | −1.3400E−01 | 2.5800E−01 | −5.3100E−01 | 7.1700E−01 | −6.6600E−01 |
| S11 | −1.2500E−01 | 1.9700E−01 | −3.3100E−01 | 3.5300E−01 | −2.6300E−01 |
| S12 | −8.6600E−02 | 1.6600E−01 | −1.9300E−01 | 1.3800E−01 | −7.1600E−02 |
| S13 | 1.5000E−02 | 3.9100E−02 | −5.1800E−02 | 3.6600E−02 | −1.3800E−02 |
| S14 | 1.1900E−02 | −3.6000E−02 | 2.3800E−02 | −9.3300E−03 | 2.2800E−03 |

| surface number | A14 | A16 | A18 | A20 |
|---|---|---|---|---|
| S1 | 8.5200E−02 | −3.5000E−02 | 8.0100E−03 | −8.1200E−04 |
| S2 | 1.1000E−02 | 8.1100E−03 | −5.2900E−03 | 9.0400E−04 |
| S3 | −2.0600E−01 | 1.3700E−01 | −4.8500E−02 | 7.2700E−03 |
| S4 | 2.7800E+00 | −1.4300E+00 | 4.0600E−01 | −4.8000E−02 |
| S5 | 1.7100E+00 | −5.9600E−01 | 3.8100E−02 | 2.0600E−02 |
| S6 | −1.4800E+00 | 1.3000E+00 | −6.0000E−01 | 1.1600E−01 |
| S7 | 3.7500E+00 | −3.2200E+00 | 1.5200E+00 | −2.9800E−01 |
| S8 | 1.5300E+00 | −1.0500E+00 | 3.9900E−01 | −6.3800E−02 |
| S9 | 1.9700E+00 | −1.0400E+00 | 2.9900E−01 | −3.6500E−02 |
| S10 | 4.1000E−01 | −1.5600E−01 | 3.2500E−02 | −2.8500E−03 |
| S11 | 1.2700E−01 | −3.7200E−02 | 6.0600E−03 | −4.2000E−04 |
| S12 | 2.5600E−02 | −5.6400E−03 | 6.7400E−04 | −3.3300E−05 |
| S13 | 3.0500E−03 | −3.9500E−04 | 2.8300E−05 | −8.6600E−07 |
| S14 | −3.5100E−04 | 3.2800E−05 | −1.6800E−06 | 3.5100E−08 |

TABLE 18

| | parameter | | | | |
|---|---|---|---|---|---|
| | f1 (mm) | f2 (mm) | f3 (mm) | f4 (mm) | f5 (mm) |
| numerical value | 9.63 | 5.18 | −8.53 | 17.79 | −187.21 |
| | parameter | | | | |
| | f6 (mm) | f7 (mm) | f (mm) | TTL (mm) | ImgH (mm) |
| numerical value | 4.38 | −2.59 | 4.38 | 5.24 | 3.52 |

Figure 12A:
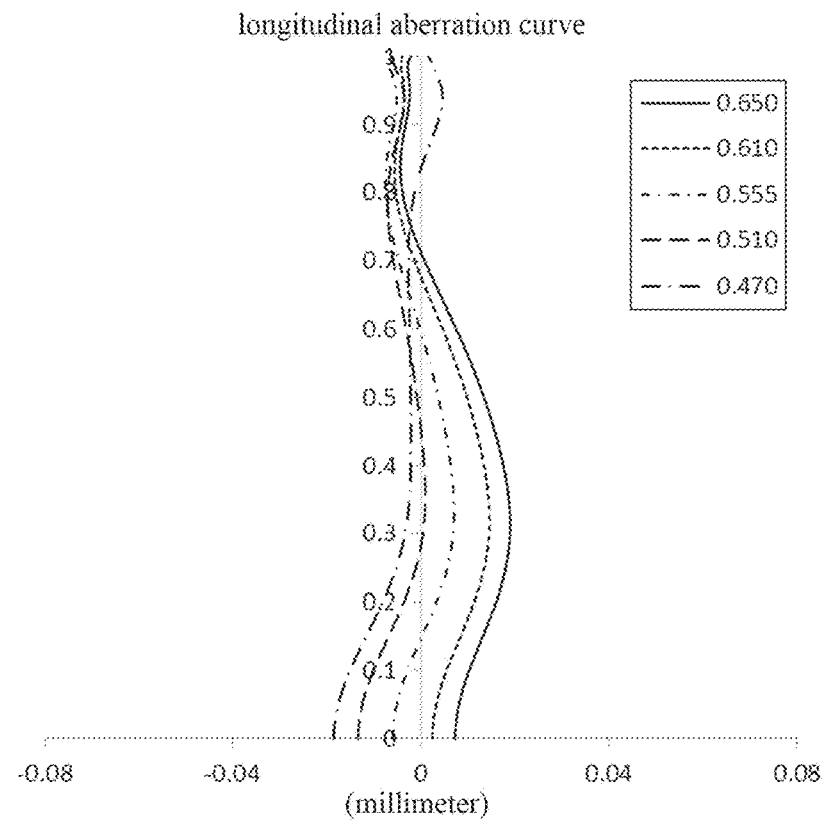
FIGS. 12A-12D respectively illustrate a longitudinal aberration curve, an astigmatic curve, a distortion curve and a lateral color curve of the optical imaging lens assembly according to Embodiment 6.
Figure 12B:
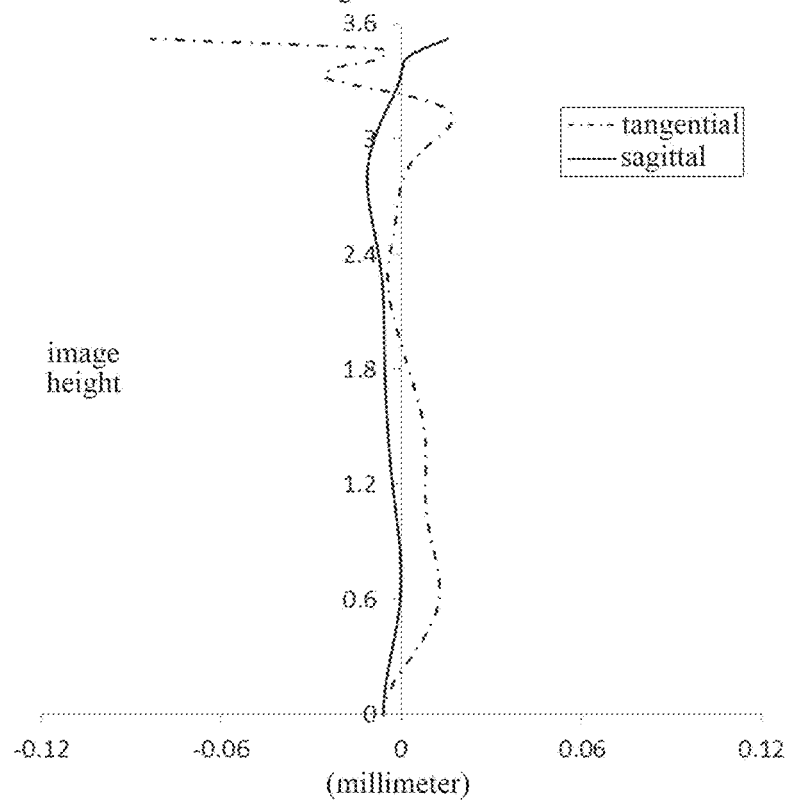
Figure 12C:
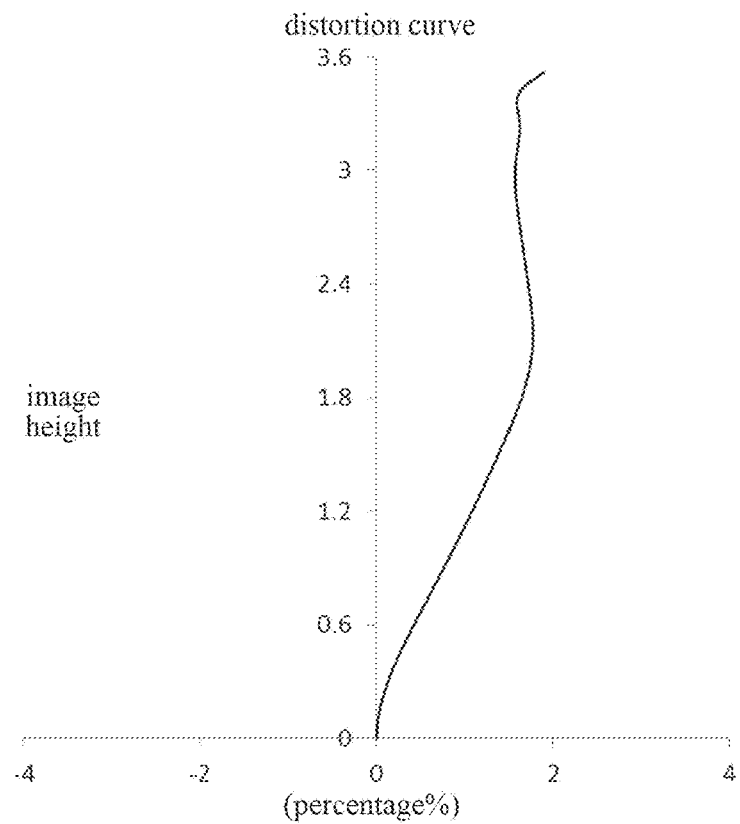
Figure 12D:
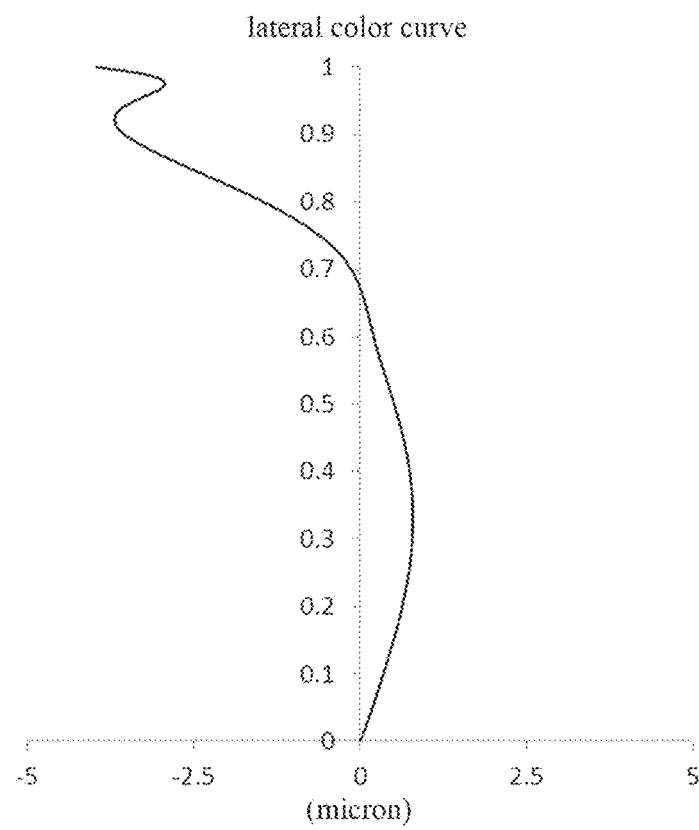

FIG. 12A shows the longitudinal aberration curve of the optical imaging lens assembly according to Embodiment 6, representing deviations of converged focal points of light of different wavelengths after passing through the lens assembly. FIG. 12B shows the astigmatic curve of the optical imaging lens assembly according to Embodiment 6, representing a curvature of the tangential image plane and a curvature of the sagittal image plane. FIG. 12C shows the distortion curve of the optical imaging lens assembly according to Embodiment 6, representing amounts of distortion at different viewing angles. FIG. 12D shows the lateral color curve of the optical imaging lens assembly according to Embodiment 6, representing deviations of different image heights on the image plane after light passes through the lens assembly. It can be seen from FIG. 12A to FIG. 12D that the optical imaging lens assembly given in Embodiment 6 can achieve a good imaging quality.

Embodiment 7

Figure 13:
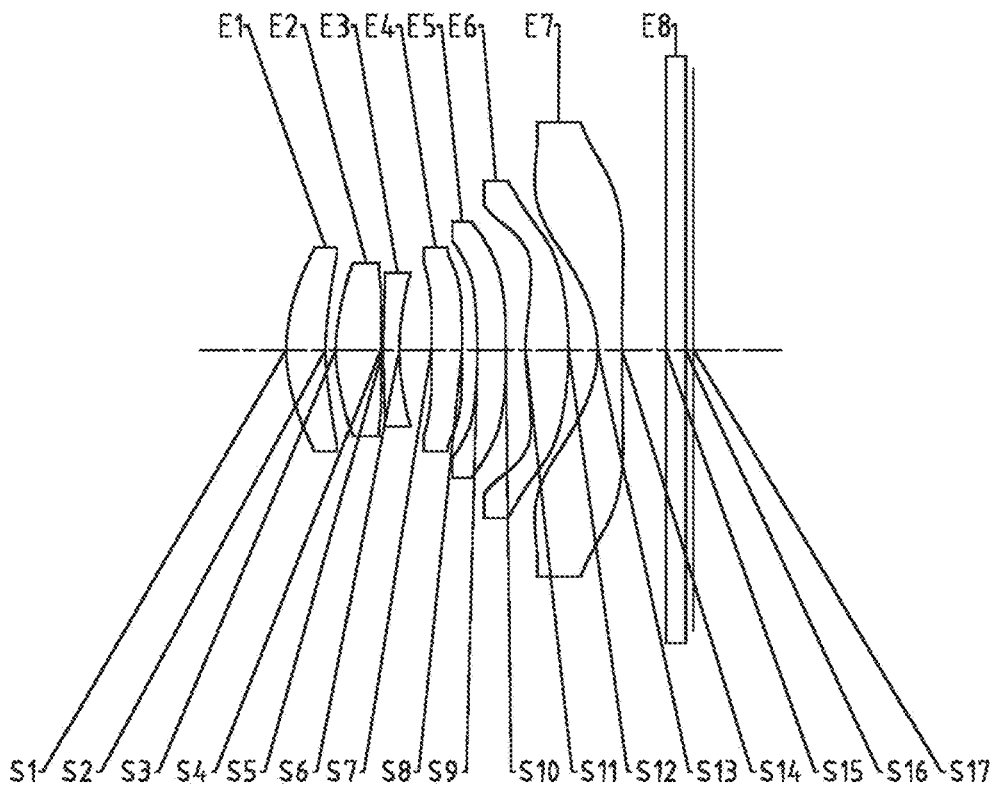
FIG. 13 is a schematic structural diagram illustrating an optical imaging lens assembly according to Embodiment 7 of the present disclosure.

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a positive refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 19 shows the surface type, the radius of curvature, the thickness, the material and the conic coefficient of each lens of the optical imaging lens assembly in Embodiment 7. The radius of curvature and the thickness are shown in millimeters (mm). Table 20 shows the high-order coefficients applicable to each aspheric surface in Embodiment 7. The surface type of each aspheric surface may be defined by the formula (1) given in the above Embodiment 1. Table 21 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 7.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 2.0231 | 0.5120 | 1.54 | 55.7 | −2.1115 |
| S2 | aspheric | 3.0824 | 0.1391 | | | −10.6484 |
| S3 (STO) | aspheric | 2.3665 | 0.5787 | 1.55 | 56.1 | −7.6638 |
| S4 | aspheric | 17.9192 | 0.0323 | | | −16.0791 |
| S5 | aspheric | 8.1797 | 0.2123 | 1.67 | 20.4 | 0.0000 |
| S6 | aspheric | 3.1088 | 0.4160 | | | −1.9127 |
| S7 | aspheric | 32.3928 | 0.4043 | 1.55 | 56.1 | 0.0000 |

TABLE 19-continued

| surface number | surface type | radius of curvature | thickness | material refractive index | abbe number | conic coefficient |
|---|---|---|---|---|---|---|
| S8 | aspheric | −15.1730 | 0.2014 | | | 50.0000 |
| S9 | aspheric | −6.3424 | 0.3673 | 1.67 | 20.4 | 0.0000 |
| S10 | aspheric | −245.5670 | 0.2582 | | | −99.0000 |
| S11 | aspheric | 2.3708 | 0.5660 | 1.55 | 56.1 | −12.2289 |
| S12 | aspheric | −4.9051 | 0.3812 | | | 0.0000 |
| S13 | aspheric | −1.4384 | 0.3110 | 1.54 | 55.7 | −0.7999 |
| S14 | aspheric | 16.6206 | 0.5724 | | | 0.0000 |
| S15 | spherical | infinite | 0.2584 | 1.52 | 64.2 | |
| S16 | spherical | infinite | 0.1050 | | | |
| S17 | spherical | infinite | | | | |

TABLE 20

| surface number | A1 | A6 | A8 | A10 | A12 |
|---|---|---|---|---|---|
| S1 | 1.6800E−02 | −1.2200E−03 | −3.1100E−02 | 6.1000E−02 | −7.0000E−02 |
| S2 | 5.5900E−03 | −7.6500E−02 | 1.0400E−01 | −1.5500E−01 | 2.4200E−01 |
| S3 | 5.4600E−02 | −1.0200E−01 | 1.5900E−01 | −3.5100E−01 | 6.7200E−01 |
| S4 | −1.7800E−02 | −1.6100E−01 | 4.1700E−03 | 1.0900E+00 | −2.6800E+00 |
| S5 | −6.1600E−02 | −1.2300E−02 | −3.9800E−01 | 2.4700E+00 | −5.7900E+00 |
| S6 | −3.2200E−02 | 1.0500E−02 | 2.5700E−01 | −1.0200E+00 | 2.7400E+00 |
| S7 | −5.2900E−02 | −5.5900E−02 | −7.2100E−02 | 5.4900E−01 | −1.5100E+00 |
| S8 | 1.7700E−02 | −1.6300E−01 | 3.1300E−01 | −6.8600E−01 | 8.9500E−01 |
| S9 | −3.3600E−02 | 1.5000E−01 | −3.8300E−01 | 5.6300E−01 | −7.1700E−01 |
| S10 | −2.4100E−01 | 4.0700E−01 | −5.4000E−01 | 5.0300E−01 | −3.6600E−01 |
| S11 | −1.5100E−01 | 1.7500E−01 | −1.8300E−01 | 1.4600E−01 | −1.0700E−01 |
| S12 | −4.6200E−02 | 3.9900E−02 | −8.2100E−03 | −1.0100E−02 | −5.9700E−04 |
| S13 | 3.8700E−02 | −9.8300E−03 | −5.2900E−03 | 1.1700E−02 | −5.6600E−03 |
| S14 | 1.5000E−02 | −4.0700E−02 | 2.5800E−02 | −9.1100E−03 | 1.9300E−03 |

| surface number | A14 | A16 | A18 | A20 |
|---|---|---|---|---|
| S1 | 4.6900E−02 | −1.7600E−02 | 3.4200E−03 | −2.6200E−04 |
| S2 | −2.5200E−01 | 1.5500E−01 | −5.0900E−02 | 6.7300E−03 |
| S3 | −7.7900E−01 | 5.2300E−01 | −7.8700E−01 | 2.7300E−02 |
| S4 | 3.1500E+00 | −2.0500E+00 | 7.1000E−01 | −1.0200E−01 |
| S5 | 7.3300E+00 | −5.3400E+00 | 2.1200E+00 | −3.5500E−01 |
| S6 | −4.7600E+00 | 4.9200E+00 | −2.7300E+00 | 6.2700E−01 |
| S7 | 2.3500E+00 | −2.1600E+00 | 1.0800E+00 | −2.2900E−01 |
| S8 | −6.7900E−01 | 3.0000E−01 | −6.6300E−02 | 4.5100E−03 |
| S9 | 6.2800E−01 | −3.1600E−01 | 8.1700E−02 | −8.5100E−03 |
| S10 | 2.0000E−01 | −7.1000E−02 | 1.4100E−02 | −1.1600E−03 |
| S11 | 5.4300E−02 | −1.6400E−02 | 2.7000E−03 | −1.8900E−04 |
| S12 | 4.6800E−03 | −1.9200E−03 | 3.0800E−04 | −1.8000E−05 |
| S13 | 1.3400E−03 | −1.7400E−04 | 1.2000E−05 | −3.5000E−07 |
| S14 | −2.5100E−04 | 1.9600E−05 | −8.2900E−07 | 1.3700E−08 |

TABLE 21

| | parameter | | | | |
|---|---|---|---|---|---|
| | f1 (mm) | f2 (mm) | f3 (mm) | f4 (mm) | f5 (mm) |
| numerical value | 7.63 | 5.54 | −6.95 | 15.64 | 30.25 |
| | parameter | | | | |
| | f6 (mm) | f7 (mm) | f (mm) | TTL (mm) | ImgH (mm) |
| numerical value | 5.31 | −2.55 | 4.48 | 5.30 | 3.52 |

Figure 14A:
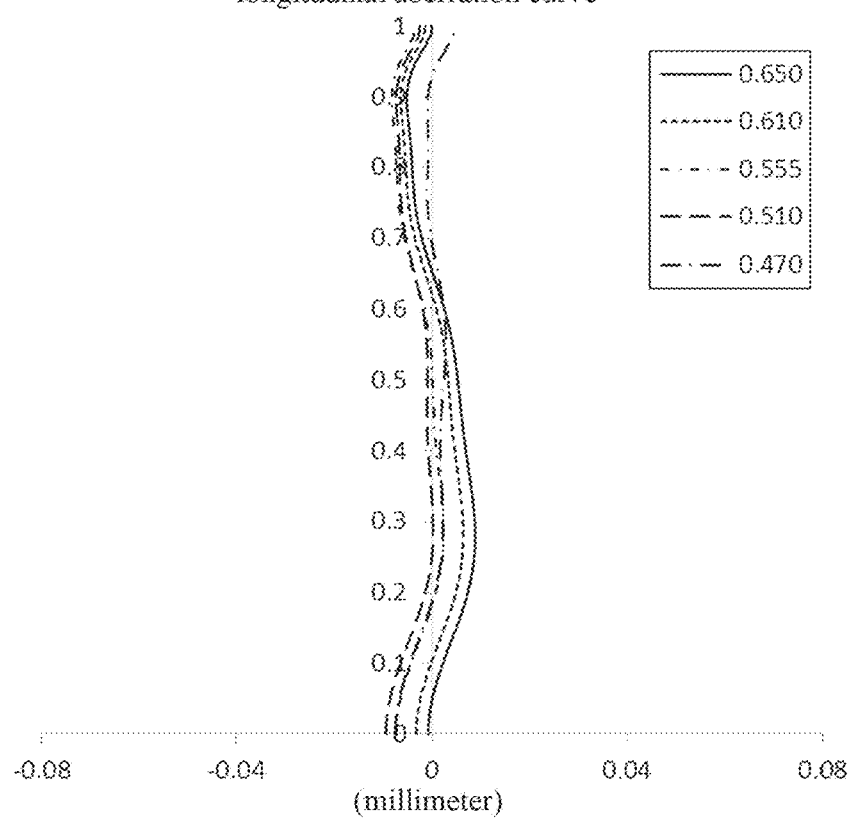
FIGS. 14A-14D respectively illustrate a longitudinal aberration curve, an astigmatic curve, a distortion curve and a lateral color curve of the optical imaging lens assembly according to Embodiment 7.
Figure 14B:
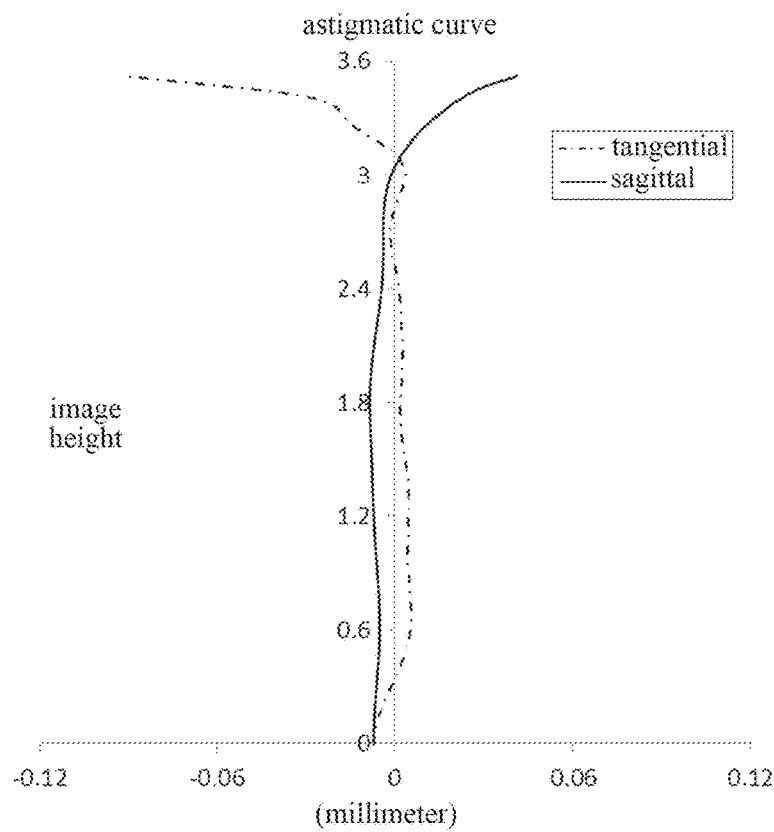
Figure 14C:
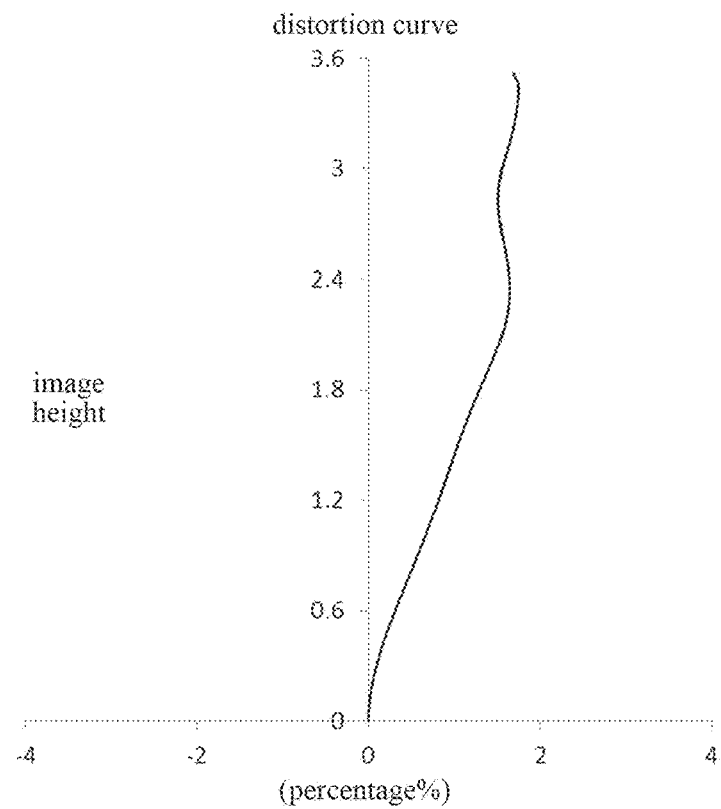
Figure 14D:
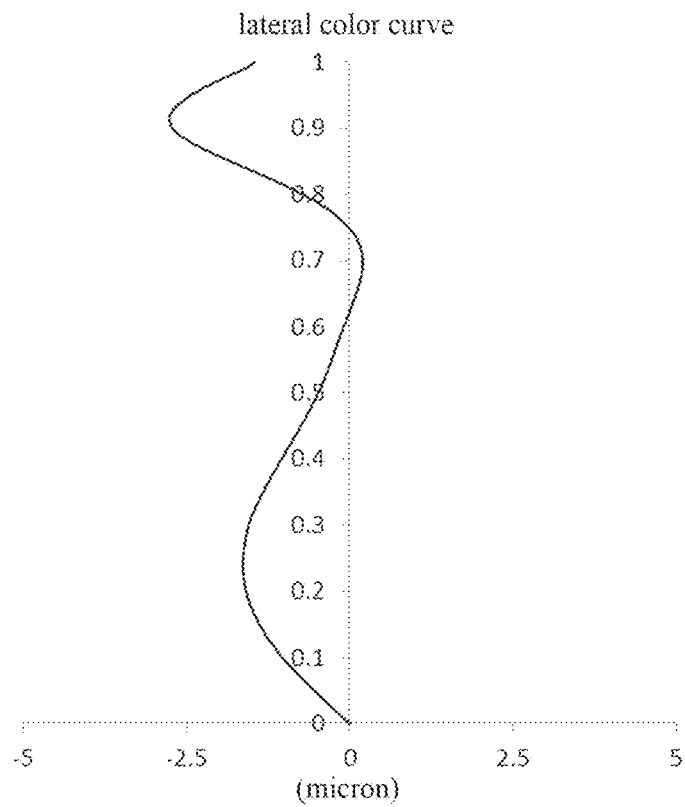

FIG. 14A shows the longitudinal aberration curve of the optical imaging lens assembly according to Embodiment 7, representing deviations of converged focal points of light of different wavelengths after passing through the lens assembly. FIG. 14B shows the astigmatic curve of the optical imaging lens assembly according to Embodiment 7, representing a curvature of the tangential image plane and a curvature of the sagittal image plane. FIG. 14C shows the distortion curve of the optical imaging lens assembly according to Embodiment 7, representing amounts of distortion at different viewing angles. FIG. 14D shows the lateral color curve of the optical imaging lens assembly according to Embodiment 7, representing deviations of different image heights on the image plane after light passes through the lens assembly. It can be seen from FIG. 14A to FIG. 14D that the optical imaging lens assembly given in Embodiment 7 can achieve a good imaging quality.

Embodiment 8

Figure 15:
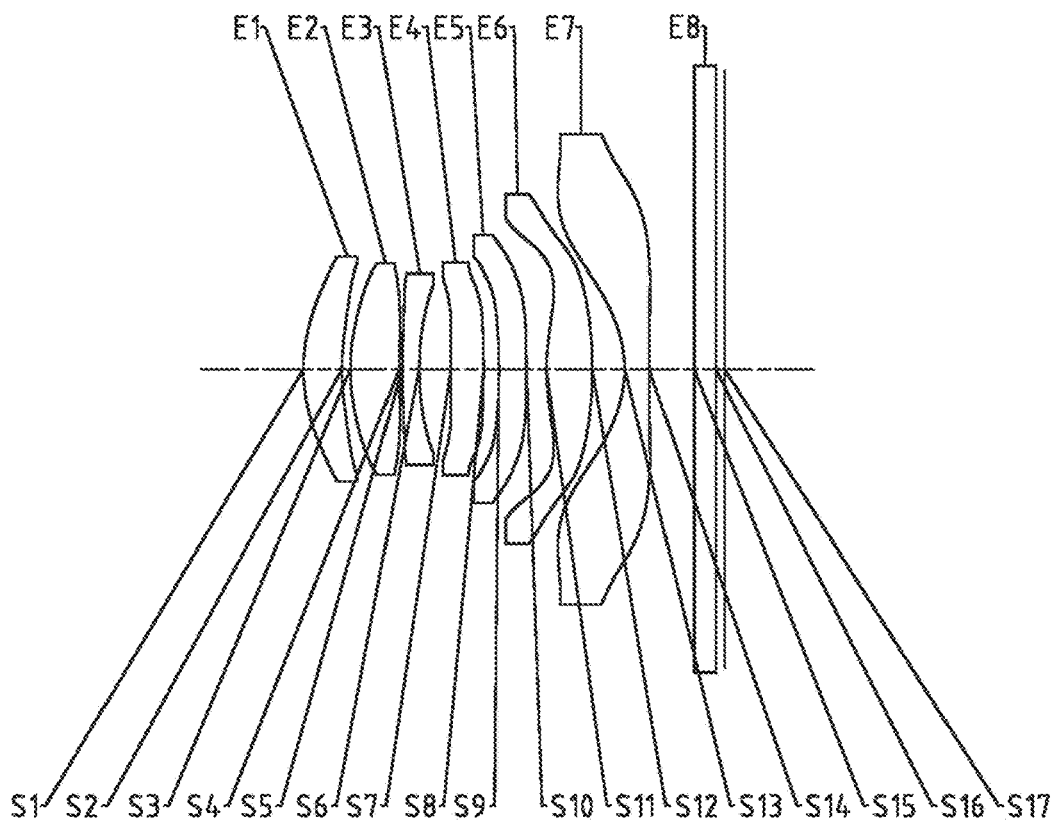
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 22 shows the surface type, the radius of curvature, the thickness, the material and the conic coefficient of each lens of the optical imaging lens assembly in Embodiment 8. The radius of curvature and the thickness are shown in millimeters (mm). Table 23 shows the high-order coefficients applicable to each aspheric surface in Embodiment 8. The surface type of each aspheric surface may be defined by the formula (1) given in the above Embodiment 1. Table 24 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 8.

TABLE 22

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.0350 | 0.4728 | 1.54 | 55.7 | −2.2575 |
| S2 | aspheric | 3.0849 | 0.1042 | | | −10.8586 |
| S3 (STO) | aspheric | 2.4001 | 0.5989 | 1.55 | 56.1 | −7.5886 |
| S4 | aspheric | 13.0142 | 0.0326 | | | −8.2165 |
| S5 | aspheric | 7.0175 | 0.2100 | 1.67 | 20.4 | 0.0000 |
| S6 | aspheric | 3.1579 | 0.3900 | | | −1.8824 |
| S7 | aspheric | 21.3641 | 0.4050 | 1.55 | 56.1 | 0.0000 |
| S8 | aspheric | −17.3379 | 0.1896 | | | 50.0000 |
| S9 | aspheric | −7.4987 | 0.3388 | 1.67 | 20.4 | 0.0000 |
| S10 | aspheric | 39.4203 | 0.2446 | | | −93.6073 |
| S11 | aspheric | 2.2090 | 0.5660 | 1.55 | 56.1 | −10.8108 |
| S12 | aspheric | −5.6045 | 0.4000 | | | 0.0000 |
| S13 | aspheric | −1.4326 | 0.3000 | 1.54 | 55.7 | −0.7998 |
| S14 | aspheric | 29.5967 | 0.5503 | | | 0.0000 |
| S15 | spherical | infinite | 0.2662 | 1.52 | 64.2 | |
| S16 | spherical | infinite | 0.1050 | | | |
| S17 | spherical | infinite | | | | |

TABLE 23

| surface number | A4 | A6 | A8 | A10 | A12 |
|---|---|---|---|---|---|
| S1 | 1.6200E−02 | 5.0700E−03 | −6.4300E−02 | 1.3400E−01 | −1.7100E−01 |
| S2 | 1.1500E−02 | −1.0100E−01 | 1.1700E−01 | −1.1700E−01 | 1.3800E−01 |
| S3 | 5.5900E−02 | −8.1800E−02 | −2.7800E−02 | 2.7700E−01 | −4.9900E−01 |
| S4 | −1.9700E−02 | −1.6000E−01 | 2.4300E−01 | −1.3300E−01 | 2.2900E−02 |
| S5 | −6.0200E−02 | −1.1900E−01 | 5.0100E−01 | −9.5700E−01 | 1.4100E+00 |

TABLE 23-continued

| | | | | | |
|---|---|---|---|---|---|
| S6 | −2.9500E−02 | −4.9700E−02 | 5.4300E−01 | −1.5000E+00 | 2.5300E+00 |
| S7 | −6.0800E−02 | 4.2000E−02 | −6.2900E−01 | 2.3800E+00 | −5.1200E+00 |
| S8 | 1.8000E−03 | −4.8200E−02 | −9.9900E−02 | 1.1500E−01 | −3.5000E−02 |
| S9 | −5.6400E−02 | 3.3100E−01 | −9.3300E−01 | 1.4900E+00 | −1.6900E+00 |
| S10 | −2.5900E−01 | 5.0200E−01 | −7.5600E−01 | 7.8600E−01 | −6.0000E−01 |
| S11 | −1.4500E−01 | 1.9500E−01 | −2.5300E−01 | 2.3200E−01 | −1.6200E−01 |
| S12 | −3.6500E−02 | 3.4200E−02 | −3.1900E−02 | 2.7800E−02 | −2.5600E−02 |
| S13 | 2.8400E−02 | 1.1400E−02 | −2.5400E−02 | 2.2600E−02 | −9.2300E−03 |
| S14 | 6.1200E−03 | −1.7600E−02 | 7.2600E−03 | −1.0200E−03 | −2.4600E−04 |

| surface number | A14 | A16 | A18 | A20 |
|---|---|---|---|---|
| S1 | 1.3500E−01 | −6.3800E−02 | 1.6700E−02 | −1.9100E−03 |
| S2 | −1.1100E−01 | 5.0300E−02 | −1.0300E−02 | 4.2400E−04 |
| S3 | 5.4600E−01 | −3.6700E−01 | 1.3600E−01 | −2.1200E−02 |
| S4 | −6.3900E−02 | 1.0500E−01 | −5.7900E−02 | 1.0600E−02 |
| S5 | −1.5600E+00 | 1.1200E+00 | −4.4300E−01 | 7.2500E−02 |
| S6 | −2.7200E+00 | 1.7700E+00 | −6.1500E−01 | 8.5100E−02 |
| S7 | 6.7100E+00 | −5.3400E+00 | 2.3700E+00 | −4.4800E−01 |
| S8 | −3.9000E−03 | −4.0400E−03 | 1.2900E−02 | −4.6700E−03 |
| S9 | 1.2900E+00 | −5.9600E−01 | 1.5000E−01 | −1.5800E−02 |
| S10 | 3.2300E−01 | −1.1100E−01 | 2.1500E−02 | −1.7500E−03 |
| S11 | 7.3200E−02 | −1.9900E−02 | 2.9800E−03 | −1.9200E−04 |
| S12 | 1.3600E−02 | −3.7300E−03 | 5.0400E−04 | −2.6800E−05 |
| S13 | 2.0600E−03 | −2.6300E−04 | 1.8100E−05 | −5.2800E−07 |
| S14 | 1.1800E−04 | −1.8800E−05 | 1.4200E−06 | −4.2600E−08 |

TABLE 24

| parameter | | | | |
|---|---|---|---|---|
| f1 (mm) | f2 (mm) | f3 (mm) | f4 (mm) | f5 (mm) |
| numerical value 9.38 | 4.93 | −7.66 | 18.98 | −9.79 |

| parameter | | | | |
|---|---|---|---|---|
| f6 (mm) | f7 (mm) | f (mm) | TTL (mm) | ImgH (mm) |
| numerical value 3.01 | −2.45 | 4.44 | 5.31 | 3.52 |

Figure 16A:
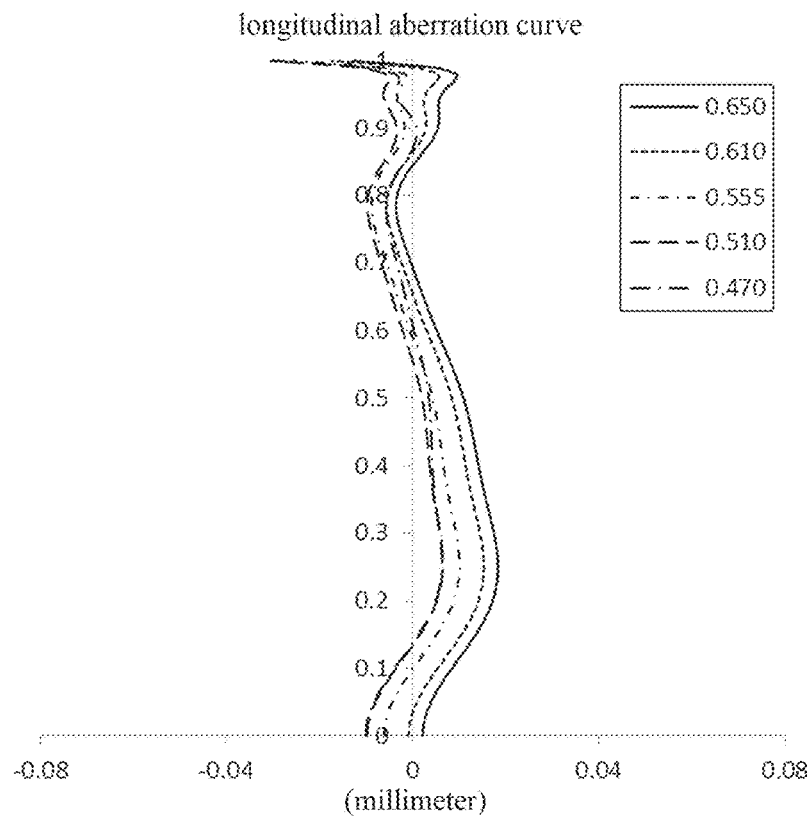
FIGS. 16A-16D respectively illustrate a longitudinal aberration curve, an astigmatic curve, a distortion curve and a lateral color curve of the optical imaging lens assembly according to Embodiment 8.
Figure 16B:
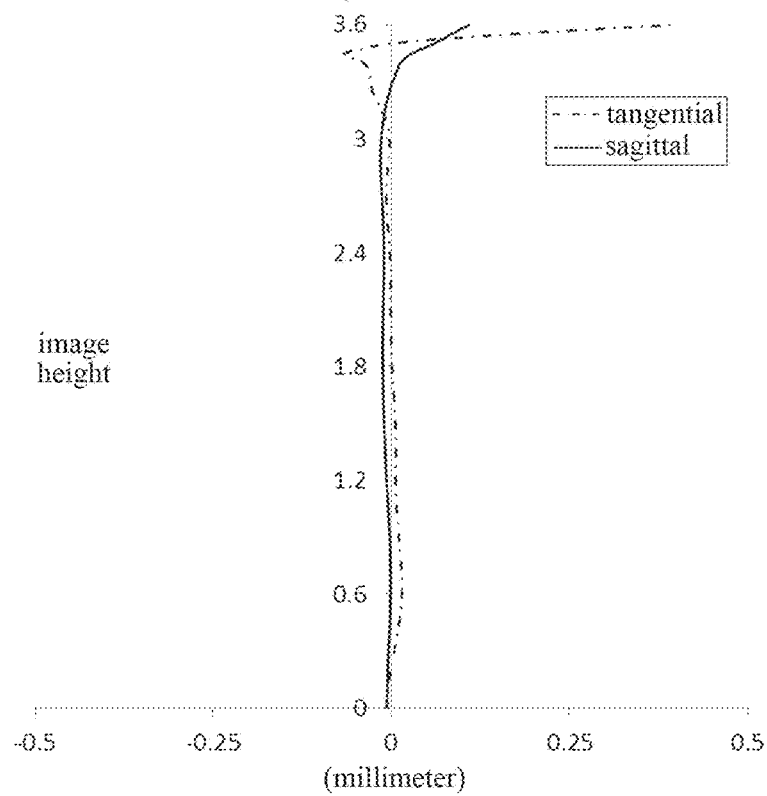
Figure 16C:
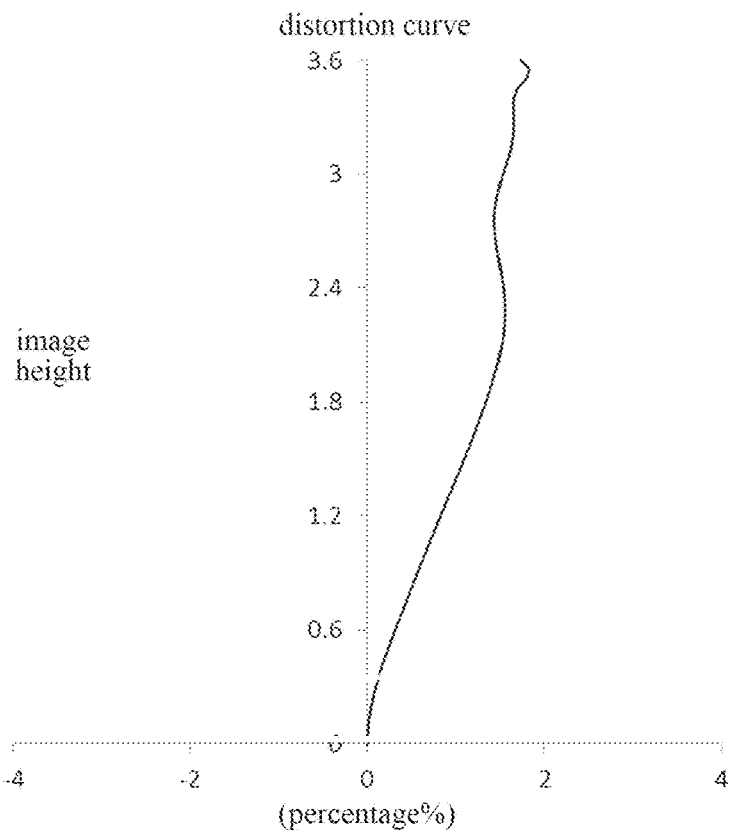
Figure 16D:
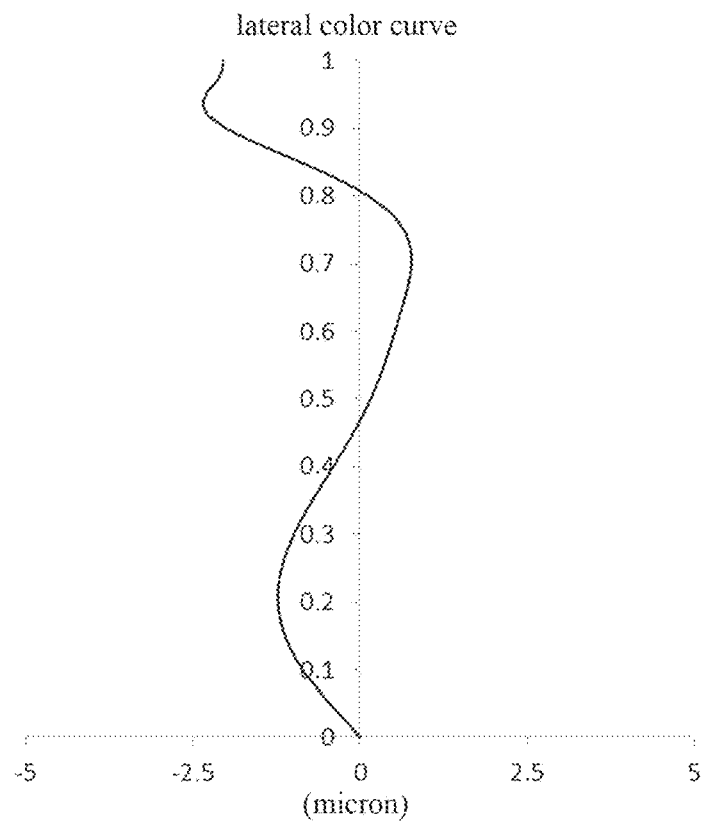

FIG. 16A shows the longitudinal aberration curve of the optical imaging lens assembly according to Embodiment 8, representing deviations of converged focal points of light of different wavelengths after passing through the lens assembly. FIG. 16B shows the astigmatic curve of the optical imaging lens assembly according to Embodiment 8, representing a curvature of the tangential image plane and a curvature of the sagittal image plane. FIG. 16C shows the distortion curve of the optical imaging lens assembly according to Embodiment 8, representing amounts of distortion at different viewing angles. FIG. 16D shows the lateral color curve of the optical imaging lens assembly according to Embodiment 8, representing deviations of different image heights on the image plane after light passes through the lens assembly. It can be seen from FIG. 16A to FIG. 16D that the optical imaging lens assembly given in Embodiment 8 can achieve a good imaging quality.

Embodiment 9

Figure 17:
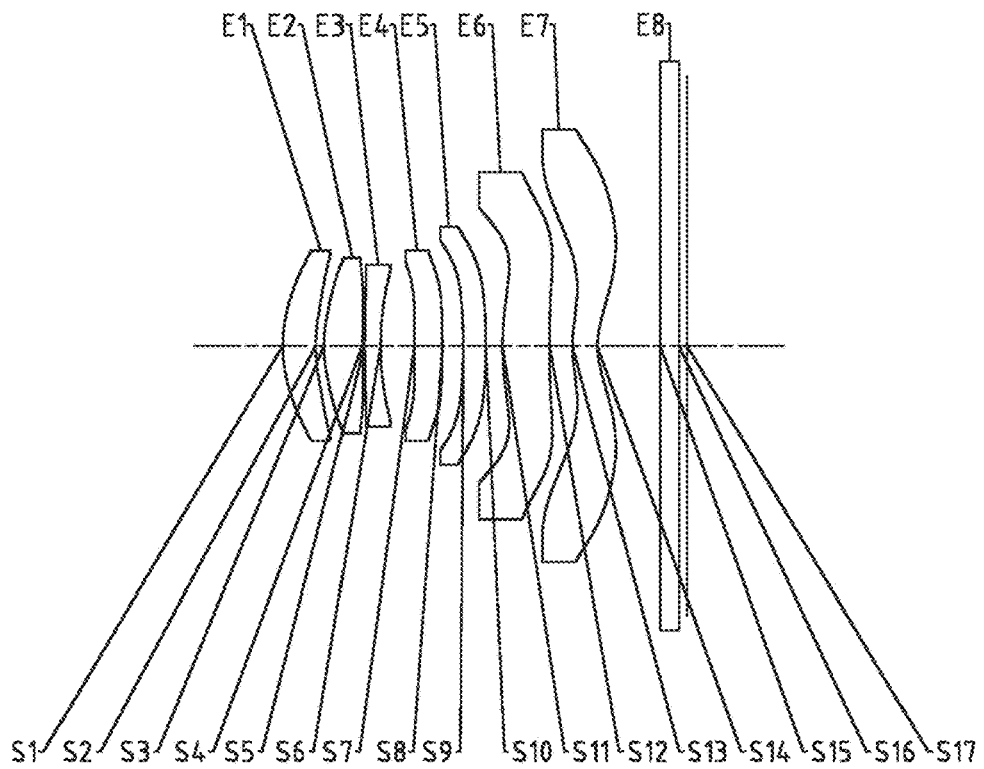
FIG. 17 is a schematic structural diagram illustrating an optical imaging lens assembly according to Embodiment 9 of the present disclosure.

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a planar surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a convex surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 25 shows the surface type, the radius of curvature, the thickness, the material and the conic coefficient of each lens of the optical imaging lens assembly in Embodiment 9. The radius of curvature and the thickness are shown in millimeters (mm). Table 26 shows the high-order coefficients applicable to each aspheric surface in Embodiment 9. The surface type of each aspheric surface may be defined by the formula (1) given in the above Embodiment 1. Table 27 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 9.

TABLE 25

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.8899 | 0.4361 | 1.54 | 55.7 | −2.0623 |
| S2 | aspheric | 2.1931 | 0.1112 | | | −9.9918 |
| S3(STO) | aspheric | 2.0132 | 0.5022 | 1.55 | 56.1 | −8.0058 |
| S4 | aspheric | 13.5924 | 0.0300 | | | −28.7993 |
| S5 | aspheric | 9.5576 | 0.2100 | 1.67 | 20.4 | 0.0000 |
| S6 | aspheric | 3.6641 | 0.4500 | | | −1.7282 |
| S7 | aspheric | infinite | 0.3718 | 1.55 | 56.1 | 0.0000 |
| S8 | aspheric | −16.3360 | 0.2804 | | | 1.7381 |
| S9 | aspheric | −6.9583 | 0.2937 | 1.67 | 20.4 | 0.0000 |
| S10 | aspheric | −21.9216 | 0.2217 | | | −47.1480 |
| S11 | aspheric | 3.2377 | 0.6296 | 1.55 | 56.1 | −3.2312 |
| S12 | aspheric | −562.9490 | 0.3009 | | | 0.0000 |
| S13 | aspheric | 1.7587 | 0.3294 | 1.54 | 55.7 | −3.0656 |
| S14 | aspheric | 0.9739 | 0.8273 | | | −4.2473 |
| S15 | spherical | infinite | 0.2495 | 1.52 | 64.2 | |
| S16 | spherical | infinite | 0.1060 | | | |
| S17 | spherical | infinite | | | | |

TABLE 26

| surface number | A4 | A6 | A8 | A10 | A12 |
|---|---|---|---|---|---|
| S1 | 1.6900E−02 | −1.0500E−02 | 1.1300E−02 | −2.9100E−02 | 4.3200E−02 |
| S2 | 3.0500E−02 | −1.4600E−01 | 2.2600E−01 | −3.7100E−01 | 5.3600E−01 |
| S3 | 6.3800E−02 | −1.4300E−01 | 1.9700E−01 | −3.3400E−01 | 5.0300E−01 |
| S4 | −6.0700E−02 | −4.4700E−02 | 2.8100E−01 | −7.4700E−01 | 1.3100E+00 |
| S5 | −8.0100E−02 | −8.4000E−03 | 3.9400E−01 | −1.1200E+00 | 1.8900E+00 |
| S6 | −2.1500E−02 | 7.6000E−03 | 1.8200E−01 | −5.1500E−01 | 7.3000E−01 |
| S7 | −6.5300E−02 | 3.2100E−02 | −3.6300E−01 | 1.2000E+00 | −2.4400E+00 |
| S8 | −4.2200E−02 | −1.5000E−02 | 1.6100E−02 | −2.5400E−01 | 5.9100E−01 |
| S9 | −5.7900E−02 | 1.5200E−01 | −3.0500E−01 | 3.9400E−01 | −4.1300E−01 |
| S10 | −1.3200E−01 | 1.3000E−01 | −1.4400E−01 | 1.7700E−01 | −1.9900E−01 |
| S11 | −8.1400E−03 | −1.2500E−01 | 1.6800E−01 | −1.6500E−01 | 1.1200E−01 |
| S12 | 1.1500E−01 | −1.3600E−01 | 8.4000E−02 | −4.1600E−02 | 1.6000E−02 |
| S13 | −3.8500E−01 | 3.0600E−01 | −1.8200E−01 | 7.7200E−02 | −2.1800E−02 |
| S14 | −1.9300E−01 | 1.3700E−01 | −7.2400E−02 | 2.6500E−02 | −6.5300E−03 |

| surface number | A14 | A16 | A18 | A20 |
|---|---|---|---|---|
| S1 | −4.4600E−02 | 2.9200E−02 | −1.0100E−02 | 1.3700E−03 |
| S2 | −5.0400E−01 | 2.8900E−01 | −9.2100E−02 | 1.2500E−02 |
| S3 | −4.4100E−01 | 2.1500E−01 | −5.4700E−02 | 5.5900E−03 |
| S4 | −1.4900E+00 | 1.0200E+00 | −3.7700E−01 | 5.7700E−02 |
| S5 | −2.0700E+00 | 1.4100E+00 | −5.2100E−01 | 7.9100E−02 |
| S6 | −5.7900E−01 | 2.1700E−01 | 8.4700E−03 | −2.3400E−02 |
| S7 | 3.1400E+00 | −2.4800E+00 | 1.1200E+00 | −2.2000E−01 |
| S8 | −6.8900E−01 | 4.6000E−01 | −1.6100E−01 | 2.2500E−02 |
| S9 | 2.7900E−01 | −9.8800E−02 | 1.4300E−02 | −1.8200E−04 |
| S10 | 1.4000E−01 | −5.5500E−02 | 1.1300E−02 | −9.4000E−04 |
| S11 | −5.0500E−02 | 1.4300E−02 | −2.2400E−03 | 1.4600E−04 |
| S12 | −4.3300E−03 | 7.6000E−04 | −7.5500E−05 | 3.1900E−06 |
| S13 | 3.9800E−03 | −4.5000E−04 | 2.8600E−05 | −7.8600E−07 |
| S14 | 1.0600E−03 | −1.0900E−04 | 6.3600E−06 | −1.6200E−07 |

TABLE 27

| | parameter | | | | |
|---|---|---|---|---|---|
| | f1 (mm) | f2 (mm) | f3 (mm) | f4 (mm) | f5 (mm) |
| numerical value | 16.95 | 4.26 | −9.05 | 29.72 | −15.43 |

| | parameter | | | | |
|---|---|---|---|---|---|
| | f6 (mm) | f7 (mm) | f (mm) | TTL (mm) | ImgH (mm) |
| numerical value | 5.90 | −4.77 | 4.48 | 5.35 | 3.52 |

Figure 18A:
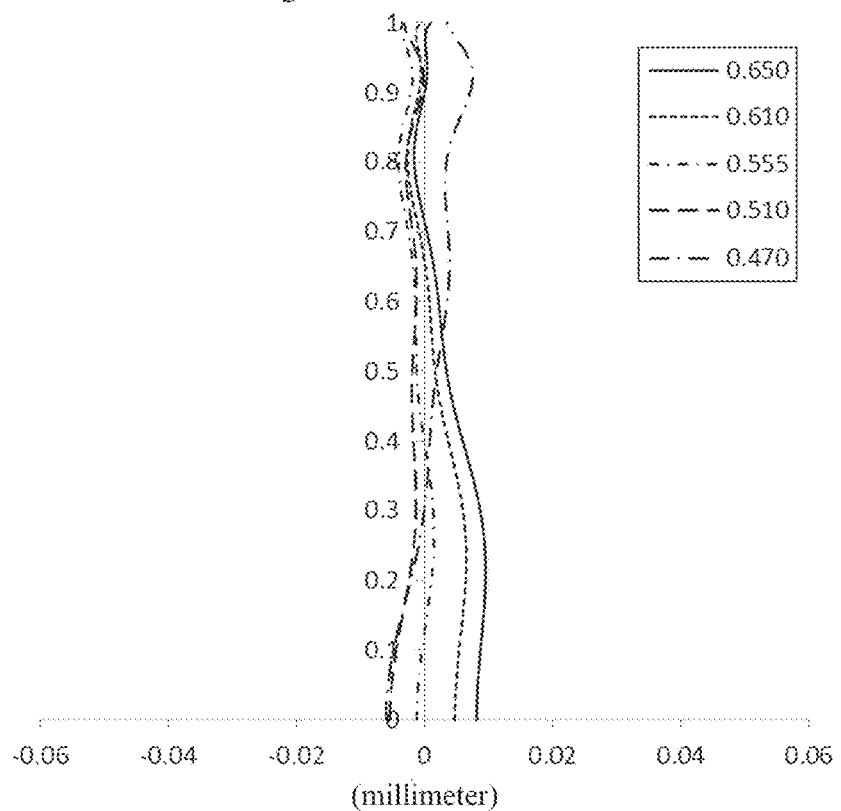
FIGS. 18A-18D respectively illustrate a longitudinal aberration curve, an astigmatic curve, a distortion curve and a lateral color curve of the optical imaging lens assembly according to Embodiment 9.
Figure 18B:
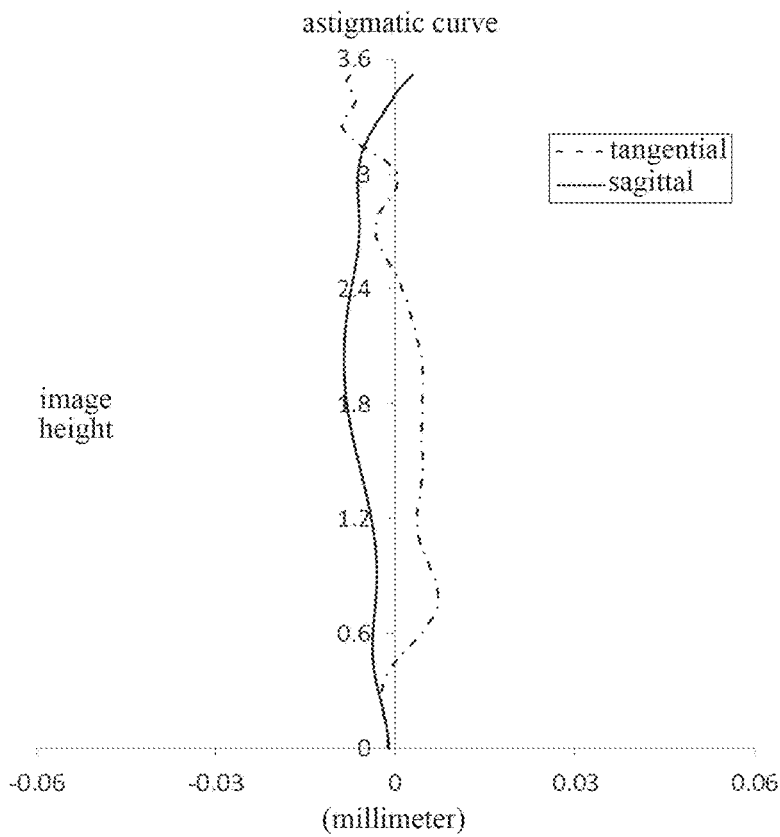
Figure 18C:
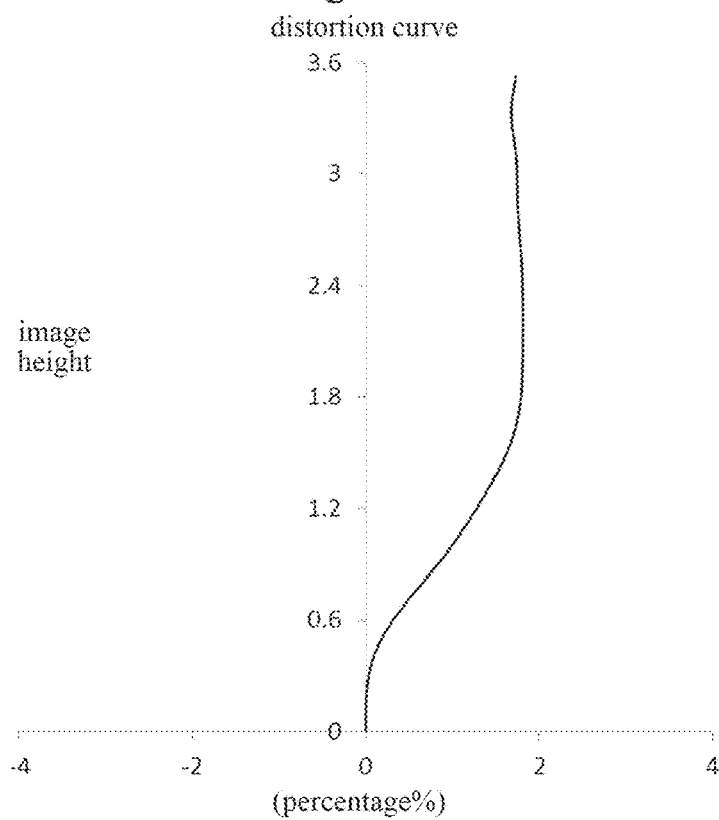
Figure 18D:
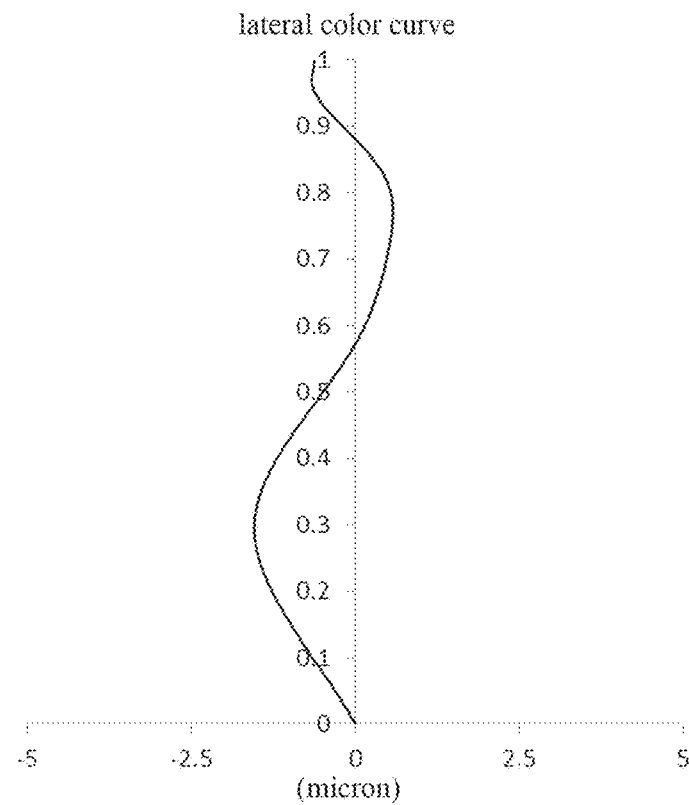

FIG. 18A shows the longitudinal aberration curve of the optical imaging lens assembly according to Embodiment 9, representing deviations of converged focal points of light of different wavelengths after passing through the lens assembly. FIG. 18B shows the astigmatic curve of the optical imaging lens assembly according to Embodiment 9, representing a curvature of the tangential image plane and a curvature of the sagittal image plane. FIG. 18C shows the distortion curve of the optical imaging lens assembly according to Embodiment 9, representing amounts of distortion at different viewing angles. FIG. 18D shows the lateral color curve of the optical imaging lens assembly according to Embodiment 9, representing deviations of different image heights on the image plane after light passes through the lens assembly. It can be seen from FIG. 18A to FIG. 18D that the optical imaging lens assembly given in Embodiment 9 can achieve a good imaging quality.

Embodiment 10

Figure 19:
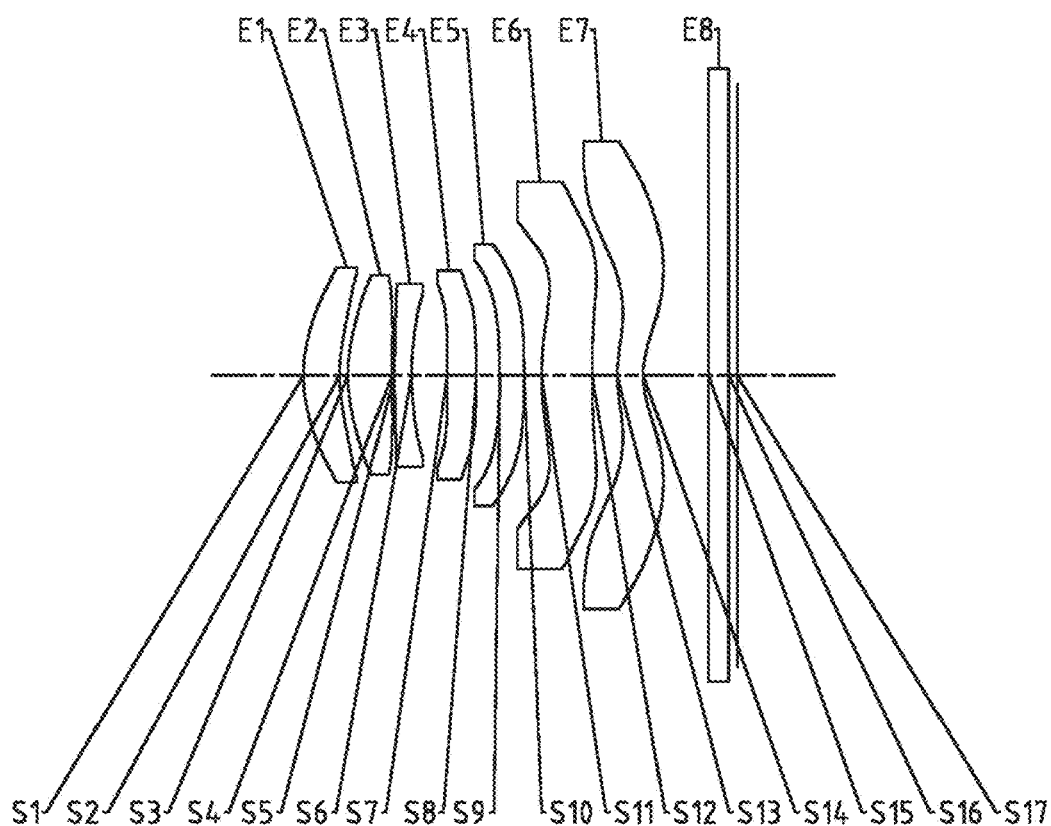
FIG. 19 is a schematic structural diagram illustrating an optical imaging lens assembly according to Embodiment 10 of the present disclosure.

An optical imaging lens assembly according to Embodiment 10 of the present disclosure is described below with reference to FIGS. 19-20D. FIG. 19 is a schematic structural diagram illustrating the optical imaging lens assembly according to Embodiment 10 of the present disclosure.

As shown in FIG. 19, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 28 shows the surface type, the radius of curvature, the thickness, the material and the conic coefficient of each lens of the optical imaging lens assembly in Embodiment 10. The radius of curvature and the thickness are shown in millimeters (mm). Table 29 shows the high-order coefficients applicable to each aspheric surface in Embodiment 10. The surface type of each aspheric surface may be defined by the formula (1) given in the above Embodiment 1. Table 30 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 10.

TABLE 28

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 1.9062 | 0.4472 | 1.54 | 55.7 | −2.0764 |
| S2 | aspheric | 2.1872 | 0.1032 | | | −10.0747 |
| S3(STO) | aspheric | 2.0269 | 0.5384 | 1.55 | 56.1 | −8.1278 |
| S4 | aspheric | 13.2605 | 0.0300 | | | −24.0350 |
| S5 | aspheric | 9.4932 | 0.2100 | 1.67 | 20.4 | 0.0000 |
| S6 | aspheric | 3.7084 | 0.4410 | | | −1.8182 |
| S7 | aspheric | 76.4369 | 0.3617 | 1.55 | 56.1 | 0.0000 |

TABLE 28-continued

| surface number | surface type | radius of curvature | thickness | material refractive index | abbe number | conic coefficient |
|---|---|---|---|---|---|---|
| S8 | aspheric | −18.9852 | 0.2897 | | | 50.0000 |
| S9 | aspheric | −7.8748 | 0.3000 | 1.67 | 20.4 | 0.0000 |
| S10 | aspheric | −28.2589 | 0.2137 | | | 50.0000 |
| S11 | aspheric | 3.1957 | 0.6285 | 1.55 | 56.1 | −1.8980 |
| S12 | aspheric | 36.0535 | 0.3112 | | | 0.0000 |
| S13 | aspheric | 1.5668 | 0.3167 | 1.54 | 55.7 | −3.2293 |
| S14 | aspheric | 0.9219 | 0.8031 | | | −4.2473 |
| S15 | spherical | infinite | 0.2495 | 1.52 | 64.2 | |
| S16 | spherical | infinite | 0.1060 | | | |
| S17 | spherical | infinite | | | | |

TABLE 29

| surface number | A4 | A6 | A8 | A10 | A12 |
|---|---|---|---|---|---|
| S1 | 1.6700E−02 | −1.0400E−02 | 9.9500E−03 | −2.3100E−02 | 2.9900E−02 |
| S2 | 3.2500E−02 | −1.5100E−01 | 2.2500E−01 | −3.4300E−01 | 4.6600E−01 |
| S3 | 6.1600E−02 | −1.2900E−01 | 1.1800E−01 | −7.5200E−02 | 1.6000E−02 |
| S4 | −6.0200E−02 | −4.9600E−02 | 2.9700E−01 | −7.6600E−01 | 1.3300E+00 |
| S5 | −8.0600E−02 | −5.9900E−03 | 3.6300E−01 | −1.0000E+00 | 1.6700E+00 |
| S6 | −2.2200E−02 | 1.2100E−02 | 1.6100E−01 | −4.4700E−01 | 6.1600E−01 |
| S7 | −6.8300E−02 | 4.5500E−02 | −3.7500E−01 | 1.1400E+00 | −2.2000E+00 |
| S8 | −4.3500E−02 | −5.1500E−02 | 1.9600E−01 | −6.7400E−01 | 1.2000E+00 |
| S9 | −4.3600E−02 | 1.5800E−02 | 9.8700E−02 | −3.0500E−01 | 3.7300E−01 |
| S10 | −9.4800E−02 | −3.5500E−02 | 2.2000E−01 | −3.1800E−01 | 2.4500E−01 |
| S11 | 2.0500E−02 | −2.0600E−01 | 2.9500E−01 | −2.8600E−01 | 1.8500E−01 |
| S12 | 1.0500E−01 | −1.1900E−01 | 6.6300E−02 | −2.8800E−02 | 9.7900E−03 |
| S13 | −4.3200E−01 | 3.7400E−01 | −2.3800E−01 | 1.0400E−01 | −2.9900E−02 |
| S14 | −2.0500E−01 | 1.4900E−01 | −7.8500E−02 | 2.8100E−02 | −6.6800E−03 |

| surface number | A14 | A16 | A18 | A20 |
|---|---|---|---|---|
| S1 | −2.7200E−02 | 1.6100E−02 | −4.9200E−03 | 5.6400E−04 |
| S2 | −4.0700E−01 | 2.1100E−01 | −5.8200E−02 | 6.3900E−03 |
| S3 | 1.1700E−01 | −1.7300E−01 | 9.6200E−02 | −1.9700E−02 |
| S4 | −1.5000E+00 | 1.0300E+00 | −3.8600E−01 | 5.9300E−02 |
| S5 | −1.8500E+00 | 1.2900E+00 | −5.0000E−01 | 8.1100E−02 |
| S6 | −4.8500E−01 | 2.0300E−01 | −1.9700E−02 | −9.8900E−03 |
| S7 | 2.7000E+00 | −2.0500E+00 | 8.8800E−01 | −1.7000E−01 |
| S8 | −1.2500E+00 | 7.7800E−01 | −2.6100E−01 | 3.5700E−02 |
| S9 | −2.8700E−01 | 1.4900E−01 | −4.5000E−02 | 5.6900E−03 |
| S10 | −1.1800E−01 | 3.7500E−02 | −7.2600E−03 | 6.3700E−04 |
| S11 | −7.8300E−02 | 2.0700E−02 | −3.0400E−03 | 1.8700E−04 |
| S12 | −2.4100E−03 | 3.9300E−04 | −3.6600E−05 | 1.4500E−06 |
| S13 | 5.5000E−03 | −6.2700E−04 | 4.0300E−05 | −1.1200E−06 |
| S14 | 1.0400E−03 | −1.0300E−04 | 5.8400E−06 | −1.4500E−07 |

TABLE 30

| parameter | f1 (mm) | f2 (mm) | f3 (mm) | f4 (mm) | f5 (mm) |
|---|---|---|---|---|---|
| numerical value | 17.77 | 4.31 | −9.28 | 27.89 | −16.50 |

| parameter | f6 (mm) | f7 (mm) | f (mm) | TTL (mm) | ImgH (mm) |
|---|---|---|---|---|---|
| numerical value | 6.38 | −5.04 | 4.46 | 5.35 | 3.52 |

Figure 20A:
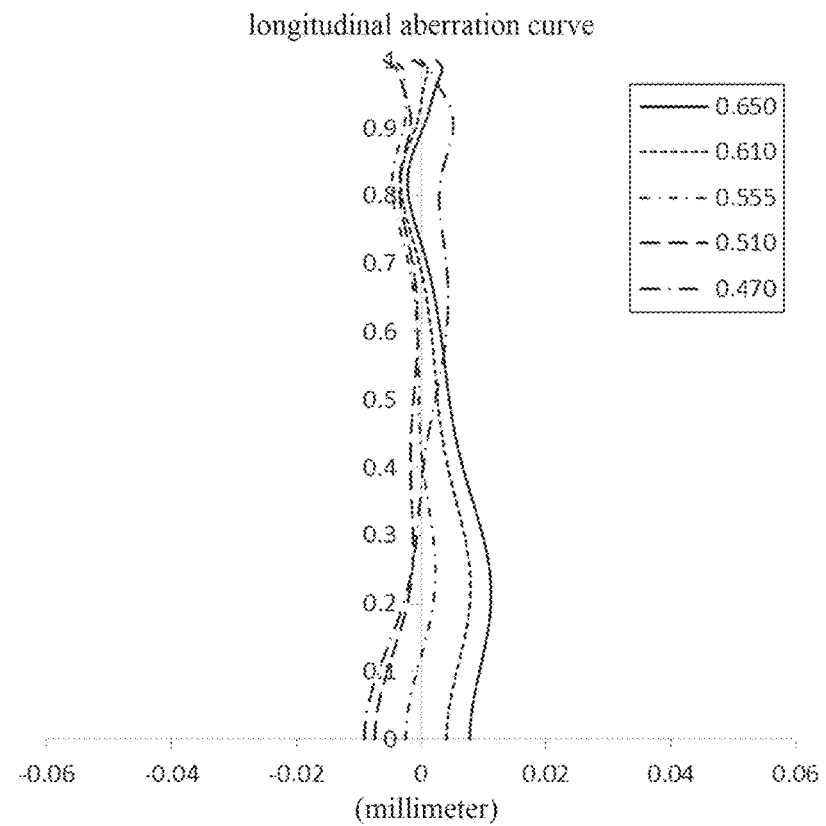
FIGS. 20A-20D respectively illustrate a longitudinal aberration curve, an astigmatic curve, a distortion curve and a lateral color curve of the optical imaging lens assembly according to Embodiment 10.
Figure 20B:
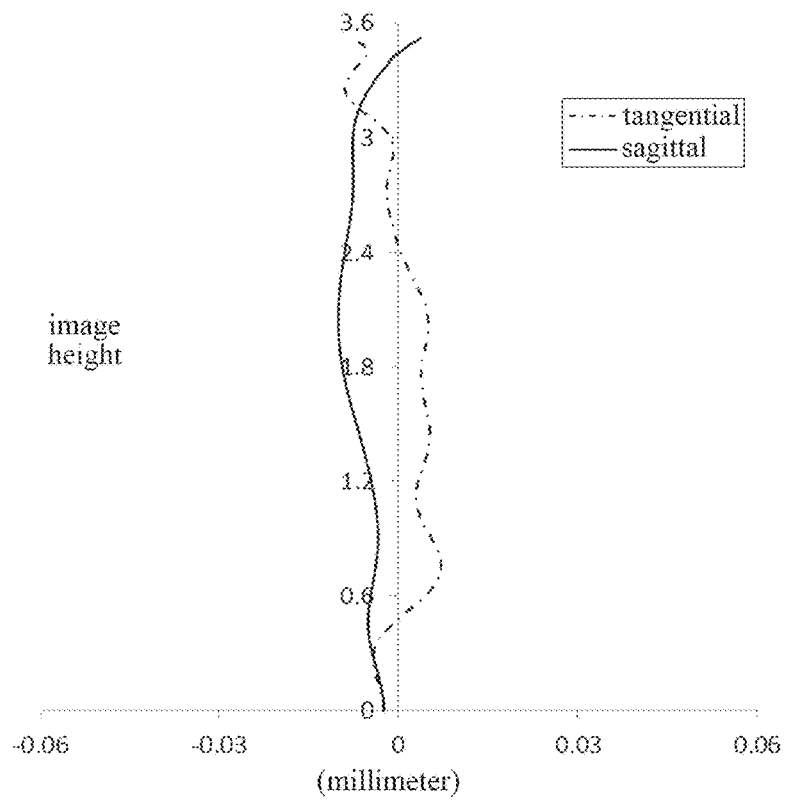
Figure 20C:
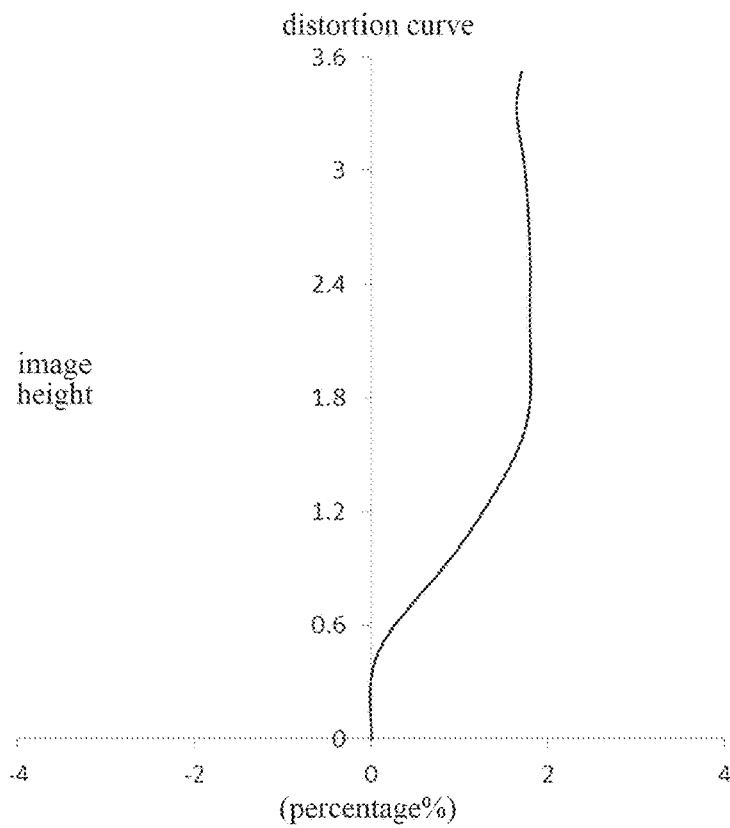
Figure 20D:
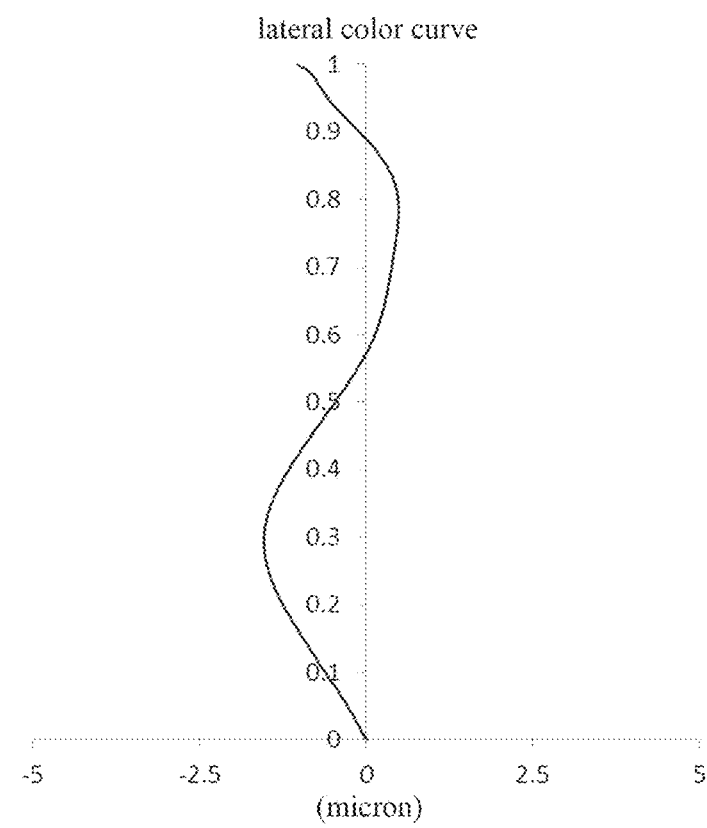

FIG. 20A shows the longitudinal aberration curve of the optical imaging lens assembly according to Embodiment 10, representing deviations of converged focal points of light of different wavelengths after passing through the lens assembly. FIG. 20B shows the astigmatic curve of the optical imaging lens assembly according to Embodiment 10, representing a curvature of the tangential image plane and a curvature of the sagittal image plane. FIG. 20C shows the distortion curve of the optical imaging lens assembly according to Embodiment 10, representing amounts of distortion at different viewing angles. FIG. 20D shows the lateral color curve of the optical imaging lens assembly according to Embodiment 10, representing deviations of different image heights on the image plane after light passes through the lens assembly. It can be seen from FIG. 20A to FIG. 20D that the optical imaging lens assembly given in Embodiment 10 can achieve a good imaging quality.

Embodiment 11

Figure 21:
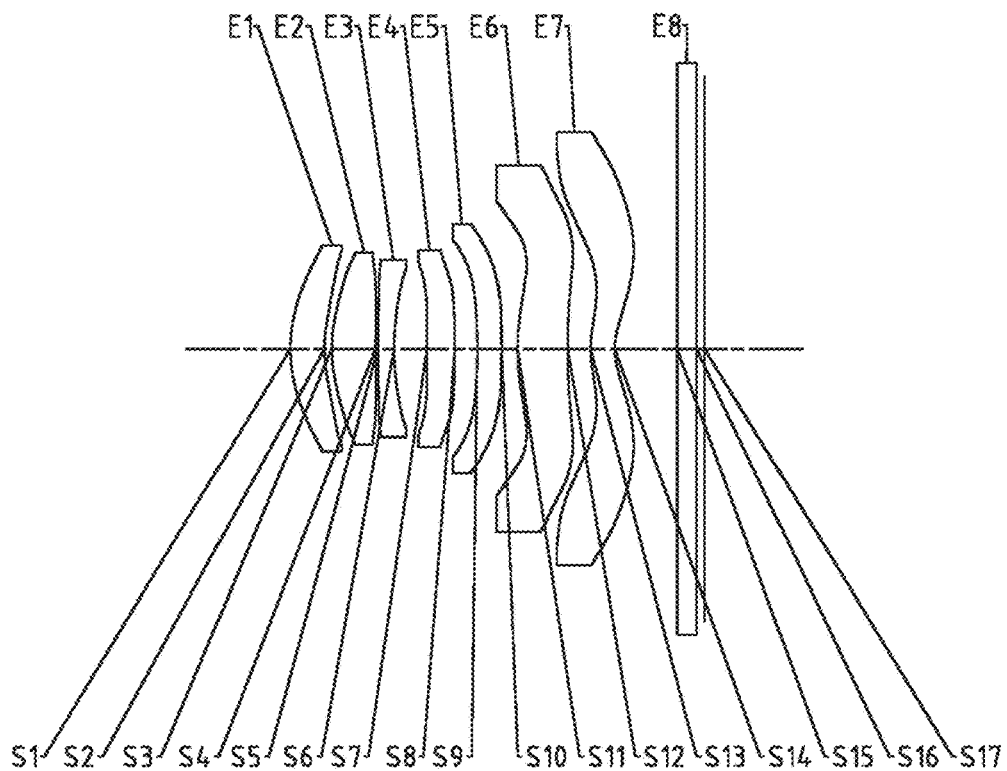
FIG. 21 is a schematic structural diagram illustrating an optical imaging lens assembly according to Embodiment 11 of the present disclosure.

An optical imaging lens assembly according to Embodiment 11 of the present disclosure is described below with reference to FIGS. 21-22D. FIG. 21 is a schematic structural diagram illustrating the optical imaging lens assembly according to Embodiment 11 of the present disclosure.

As shown in FIG. 21, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 31 shows the surface type, the radius of curvature, the thickness, the material and the conic coefficient of each lens of the optical imaging lens assembly in Embodiment 11. The radius of curvature and the thickness are shown in millimeters (mm). Table 32 shows the high-order coefficients applicable to each aspheric surface in Embodiment 11. The surface type of each aspheric surface may be defined by the formula (1) given in the above Embodiment 1. Table 33 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 11.

TABLE 31

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9370 | 0.4438 | 1.54 | 55.7 | −2.1654 |
| S2 | aspheric | 2.1591 | 0.0942 | | | −10.1959 |
| S3(STO) | aspheric | 2.0017 | 0.5660 | 1.55 | 56.1 | −8.0715 |
| S4 | aspheric | 12.9930 | 0.0300 | | | −20.7619 |
| S5 | aspheric | 9.0141 | 0.2100 | 1.67 | 20.4 | 0.0000 |
| S6 | aspheric | 3.6799 | 0.4240 | | | −1.9595 |
| S7 | aspheric | 35.6869 | 0.3612 | 1.55 | 56.1 | 0.0000 |
| S8 | aspheric | −24.5914 | 0.2919 | | | 50.0000 |
| S9 | aspheric | −8.6855 | 0.3070 | 1.67 | 20.4 | 0.0000 |
| S10 | aspheric | −49.6846 | 0.2043 | | | 50.0000 |
| S11 | aspheric | 3.0187 | 0.6502 | 1.55 | 56.1 | −1.4992 |
| S12 | aspheric | 20.7365 | 0.2951 | | | 0.0000 |
| S13 | aspheric | 1.4461 | 0.3134 | 1.54 | 55.7 | −3.3483 |
| S14 | aspheric | 0.8893 | 0.8039 | | | −4.2473 |
| S15 | spherical | infinite | 0.2495 | 1.52 | 64.2 | |
| S16 | spherical | infinite | 0.1060 | | | |
| S17 | spherical | infinite | | | | |

TABLE 32

| surface number | A4 | A6 | A8 | A10 | A12 |
|---|---|---|---|---|---|
| S1 | 1.6200E−02 | −1.3100E−02 | 2.3400E−02 | −5.7400E−02 | 7.9100E−02 |
| S2 | 3.5300E−02 | −1.6200E−01 | 2.5100E−01 | −3.8800E−01 | 5.2100E−01 |
| S3 | 6.2000E−02 | −1.3000E−01 | 1.1200E−01 | −4.4900E−02 | −4.0100E−02 |
| S4 | −6.0500E−02 | −4.6400E−02 | 2.8800E−01 | −7.4300E−01 | 1.2800E+00 |
| S3 | −8.0100E−02 | −7.5300E−03 | 3.6800E−01 | −1.0200E+00 | 1.7200E+00 |
| S6 | −2.1900E−02 | 1.1200E−02 | 1.6500E−01 | −4.6600E−01 | 6.8500E−01 |

TABLE 32-continued

| S7 | −6.3700E−02 | −1.1300E−02 | −5.8200E−02 | 1.9000E−01 | −4.6900E−01 |
| S3 | −3.7800E−02 | −1.2800E−01 | 5.1700E−01 | −1.4100E+00 | 2.2200E+00 |
| S9 | −3.5200E−02 | −4.1100E−02 | 2.2500E−01 | −4.3400E−01 | 4.0600E−01 |
| S10 | −7.4300E−02 | −1.3100E−01 | 4.1300E−01 | −5.4300E−01 | 4.0300E−01 |
| S11 | 3.3600E−02 | −2.4200E−01 | 3.4700E−01 | −3.2500E−01 | 2.0000E−01 |
| S12 | 9.7800E−02 | −1.0900E−01 | 6.1700E−02 | −2.8500E−02 | 1.0200E−02 |
| S13 | −4.6200E−01 | 4.1400E−01 | −2.7100E−01 | 1.2200E−01 | −3.5600E−02 |
| S14 | −2.1900E−01 | 1.6400E−01 | −9.0200E−02 | 3.3200E−02 | −8.0300E−03 |

| surface number | A14 | A16 | A18 | A20 |
|---|---|---|---|---|
| S1 | −6.9000E−02 | 3.7100E−02 | −1.0700E−02 | 1.2500E−03 |
| S2 | −4.5000E−01 | 2.3000E−01 | −6.2600E−02 | 6.8000E−03 |
| S3 | 1.6800E−01 | −1.9700E−01 | 1.0000E−01 | −1.9600E−02 |
| S4 | −1.4300E+00 | 9.8200E−01 | −3.6700E−01 | 5.6600E−02 |
| S3 | −1.9300E+00 | 1.3600E+00 | −5.3700E−01 | 8.8700E−02 |
| S6 | −6.3100E−01 | 3.7000E−01 | −1.1800E−01 | 1.3600E−02 |
| S7 | 7.2200E−01 | −6.5200E−01 | 3.3200E−01 | −7.3000E−02 |
| S3 | −2.1500E+00 | 1.2600E+00 | −4.0400E−01 | 5.4300E−02 |
| S9 | −2.2900E−01 | 8.5800E−02 | −1.9900E−02 | 2.0100E−03 |
| S10 | −1.8400E−01 | 5.2100E−02 | −8.5000E−03 | 6.0700E−04 |
| S11 | −8.0200E−02 | 2.0100E−02 | −2.8200E−03 | 1.6700E−04 |
| S12 | −2.5800E−03 | 4.1800E−04 | −3.8400E−05 | 1.4900E−06 |
| S13 | 6.6800E−03 | −7.7300E−04 | 5.0400E−05 | −1.4200E−06 |
| S14 | 1.2600E−03 | −1.2500E−04 | 7.0600E−06 | −1.7500E−07 |

TABLE 33

| parameter | | | | |
|---|---|---|---|---|
| f1 (mm) | f2 (mm) | f3 (mm) | f4 (mm) | f5 (mm) |

| numerical value | 20.67 | 4.26 | −9.49 | 26.72 | −15.86 |

| parameter | | | | |
|---|---|---|---|---|
| f6 (mm) | f7 (mm) | f (mm) | TTL (mm) | ImgH (mm) |

| numerical value | 6.39 | −5.36 | 4.41 | 5.35 | 3.52 |

Figure 22A:
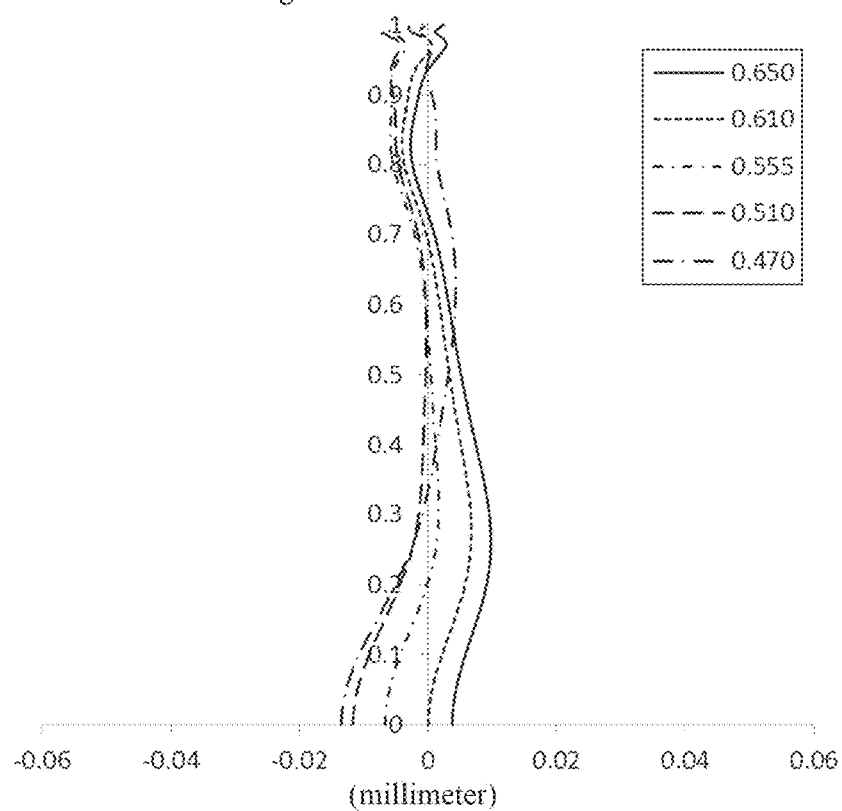
FIGS. 22A-22D respectively illustrate a longitudinal aberration curve, an astigmatic curve, a distortion curve and a lateral color curve of the optical imaging lens assembly according to Embodiment 11.
Figure 22B:
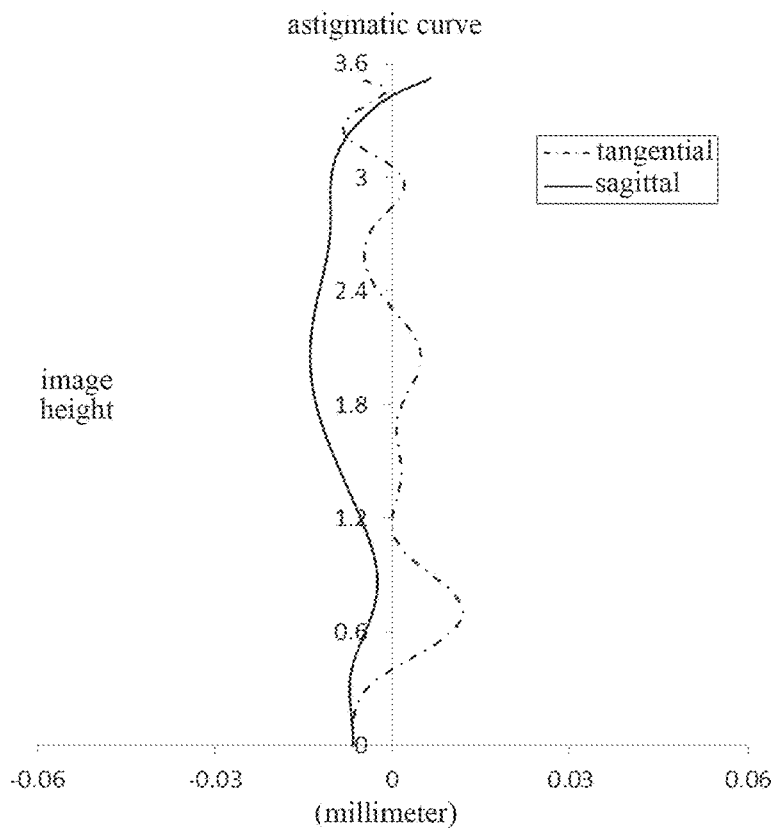
Figure 22C:
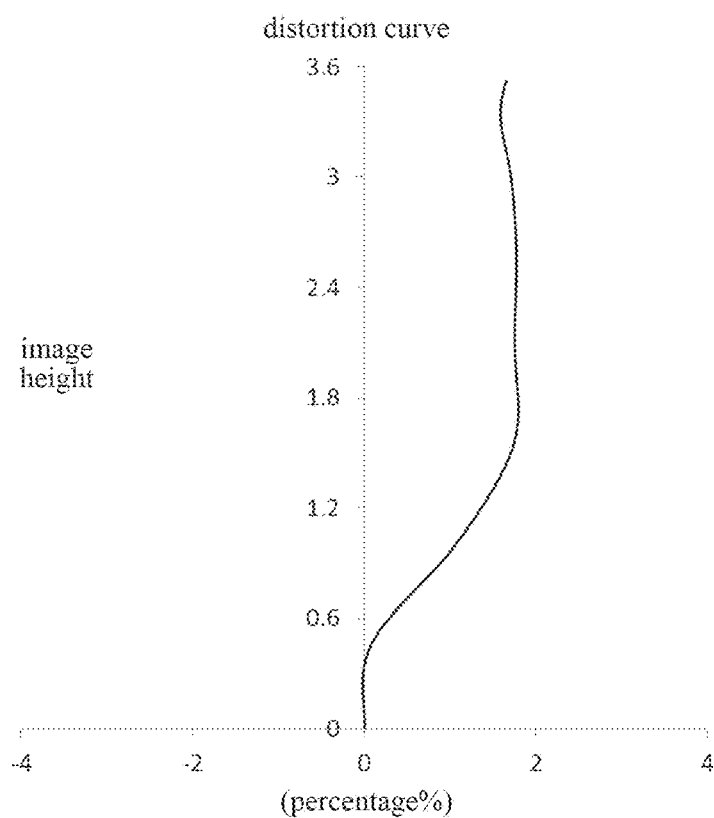
Figure 22D:
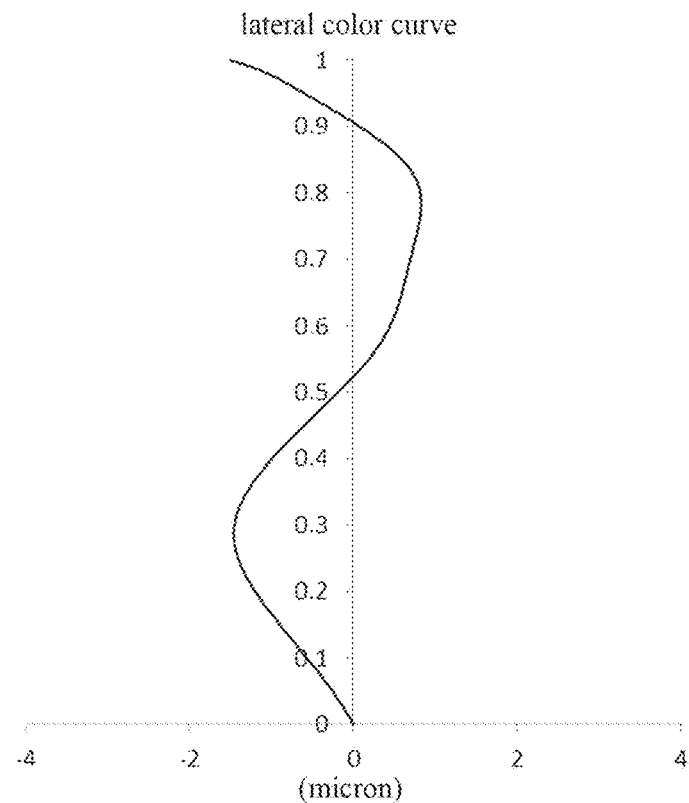

FIG. 22A shows the longitudinal aberration curve of the optical imaging lens assembly according to Embodiment 11, representing deviations of converged focal points of light of different wavelengths after passing through the lens assembly. FIG. 22B shows the astigmatic curve of the optical imaging lens assembly according to Embodiment 11, representing a curvature of the tangential image plane and a curvature of the sagittal image plane. FIG. 22C shows the distortion curve of the optical imaging lens assembly according to Embodiment 11, representing amounts of distortion at different viewing angles. FIG. 22D shows the lateral color curve of the optical imaging lens assembly according to Embodiment 11, representing deviations of different image heights on the image plane after light passes through the lens assembly. It can be seen from FIG. 22A to FIG. 22D that the optical imaging lens assembly given in Embodiment 11 can achieve a good imaging quality.

Embodiment 12

Figure 23:
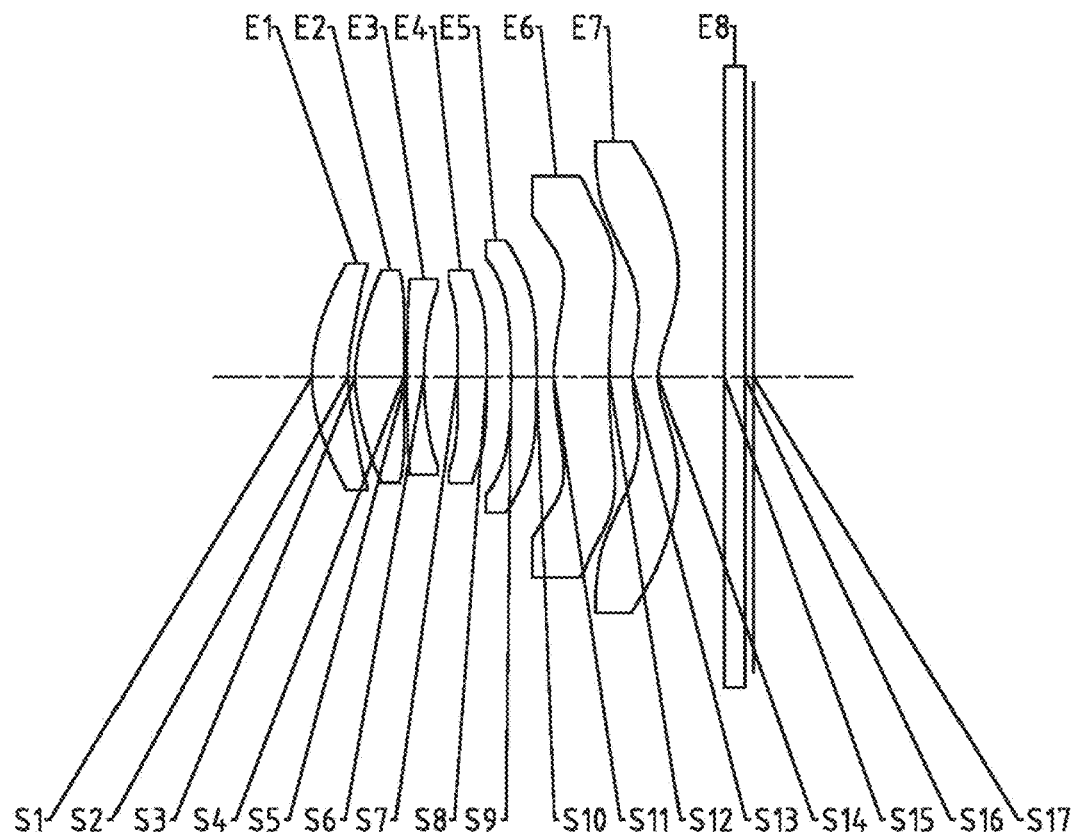
FIG. 23 is a schematic structural diagram illustrating an optical imaging lens assembly according to Embodiment 12 of the present disclosure.

An optical imaging lens assembly according to Embodiment 12 of the present disclosure is described below with reference to FIGS. 23-24D. FIG. 23 is a schematic structural diagram illustrating the optical imaging lens assembly according to Embodiment 12 of the present disclosure.

As shown in FIG. 23, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 34 shows the surface type, the radius of curvature, the thickness, the material and the conic coefficient of each lens of the optical imaging lens assembly in Embodiment 12. The radius of curvature and the thickness are shown in millimeters (mm). Table 35 shows the high-order coefficients applicable to each aspheric surface in Embodiment 12. The surface type of each aspheric surface may be defined by the formula (1) given in the above Embodiment 1. Table 36 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 12.

TABLE 34

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.9596 | 0.4385 | 1.54 | 55.7 | −2.2605 |
| S2 | aspheric | 2.1192 | 0.0890 | | | −10.3260 |
| S3(STO) | aspheric | 1.9673 | 0.5822 | 1.55 | 56.1 | −8.0217 |
| S4 | aspheric | 12.6041 | 0.0300 | | | −15.7748 |
| S5 | aspheric | 8.5578 | 0.2100 | 1.67 | 20.4 | 0.0000 |
| S6 | aspheric | 3.6384 | 0.4080 | | | −1.9193 |
| S7 | aspheric | 25.2540 | 0.3556 | 1.55 | 56.1 | 0.0000 |
| S8 | aspheric | −30.6512 | 0.2968 | | | 50.0000 |
| S9 | aspheric | −10.4197 | 0.3069 | 1.67 | 20.4 | 0.0000 |
| S10 | aspheric | −436.0210 | 0.2095 | | | 50.0000 |
| S11 | aspheric | 2.9370 | 0.6735 | 1.55 | 56.1 | −1.3962 |
| S12 | aspheric | 17.4679 | 0.2840 | | | 0.0000 |
| S13 | aspheric | 1.4338 | 0.3103 | 1.54 | 55.7 | −3.4492 |
| S14 | aspheric | 0.8895 | 0.7951 | | | −4.2473 |
| S15 | spherical | infinite | 0.2495 | 1.52 | 64.2 | |
| S16 | spherical | infinite | 0.1060 | | | |
| S17 | spherical | infinite | | | | |

TABLE 35

| surface number | A4 | A6 | A8 | A10 | A12 |
|---|---|---|---|---|---|
| S1 | 1.5000E−02 | −1.1900E−02 | 2.0900E−02 | −5.3200E−02 | 7.2700E−02 |
| S2 | 3.7100E−02 | −1.7000E−01 | 2.6800E−01 | −4.1900E−01 | 5.6400E−01 |
| S3 | 6.2300E−02 | −1.3100E−01 | 1.1200E−01 | −4.1900E−02 | −4.1800E−02 |
| S4 | −6.0700E−02 | −4.4300E−02 | 2.8000E−01 | −7.1600E−01 | 1.2200E+00 |
| S5 | −7.9900E−02 | −7.4700E−03 | 3.6600E−01 | −1.0100E+00 | 1.7000E+00 |
| S6 | −2.1800E−02 | 9.9600E−03 | 1.6800E−01 | −4.6500E−01 | 6.8800E−01 |
| S7 | −6.4200E−02 | 5.6600E−04 | −1.1200E−01 | 3.3300E−01 | −6.8700E−01 |
| S8 | −3.5700E−02 | −1.3700E−01 | 5.2600E−01 | −1.4000E+00 | 2.1800E+00 |
| S9 | −2.8800E−02 | −6.7100E−02 | 2.5900E−01 | −4.4900E−01 | 3.9500E−01 |
| S10 | −6.5500E−02 | −1.6000E−01 | 4.5200E−01 | −5.7800E−01 | 4.2600E−01 |
| S11 | 3.6300E−02 | −2.4800E−01 | 3.5400E−01 | −3.3100E−01 | 2.0200E−01 |
| S12 | 9.1100E−02 | −9.7600E−02 | 5.2600E−02 | −2.4100E−02 | 8.7400E−03 |
| S13 | −4.6600E−01 | 4.1900E−01 | −2.7500E−01 | 1.2300E−01 | −3.6000E−02 |
| S14 | −2.2500E−01 | 1.7200E−01 | −9.6400E−02 | 3.6000E−02 | −8.7800E−03 |

| surface number | A14 | A16 | A18 | A20 |
|---|---|---|---|---|
| S1 | −6.2300E−02 | 3.2800E−02 | −9.3400E−03 | 1.0600E−03 |
| S2 | −4.9000E−01 | 2.5400E−01 | −7.0600E−02 | 7.9600E−03 |
| S3 | 1.6100E−01 | −1.8500E−01 | 9.3700E−02 | −1.8100E−02 |
| S4 | −1.3600E+00 | 9.2700E−01 | −3.4500E−01 | 5.3000E−02 |
| S5 | −1.8900E+00 | 1.3300E+00 | −5.2100E−01 | 8.5600E−02 |
| S6 | −6.5500E−01 | 4.0500E−01 | −1.4000E−01 | 1.8700E−02 |
| S7 | 9.1700E−01 | −7.4700E−01 | 3.5000E−01 | −7.2200E−02 |
| S8 | −2.0800E+00 | 1.2100E+00 | −3.8400E−01 | 5.1000E−02 |
| S9 | −2.0400E−01 | 6.9000E−02 | −1.3100E−02 | 1.0700E−03 |
| S10 | −1.9400E−01 | 5.4700E−02 | −8.8100E−03 | 6.1800E−04 |
| S11 | −8.0200E−02 | 1.9900E−02 | −2.7600E−03 | 1.6200E−04 |
| S12 | −2.2200E−03 | 3.6300E−04 | −3.3300E−05 | 1.2900E−06 |
| S13 | 6.7400E−03 | −7.7700E−04 | 5.0500E−05 | −1.4100E−06 |
| S14 | 1.3800E−03 | −1.3700E−04 | 7.7500E−06 | −1.9100E−07 |

TABLE 36

| | parameter | | | | |
|---|---|---|---|---|---|
| | f1 (mm) | f2 (mm) | f3 (mm) | f4 (mm) | f5 (mm) |
| numerical value | 24.74 | 4.19 | −9.67 | 25.42 | −16.04 |

| | parameter | | | | |
|---|---|---|---|---|---|
| | f6 (mm) | f7 (mm) | f (mm) | TTL (mm) | ImgH (mm) |
| numerical value | 6.36 | −5.45 | 4.37 | 5.34 | 3.52 |

Figure 24A:
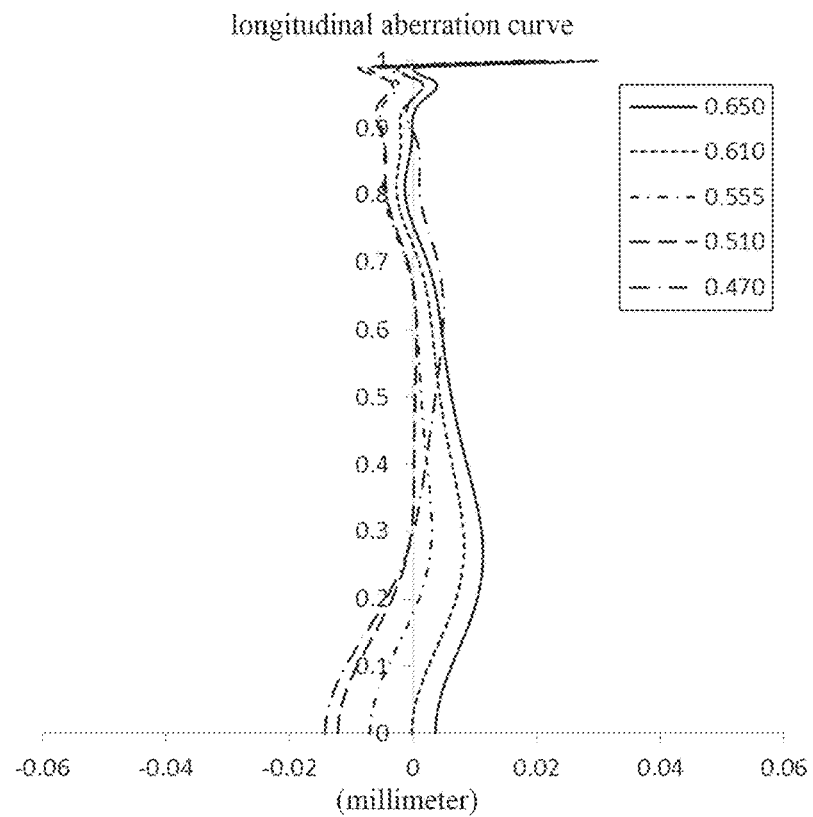
FIGS. 24A-24D respectively illustrate a longitudinal aberration curve, an astigmatic curve, a distortion curve and a lateral color curve of the optical imaging lens assembly according to Embodiment 12.
Figure 24B:
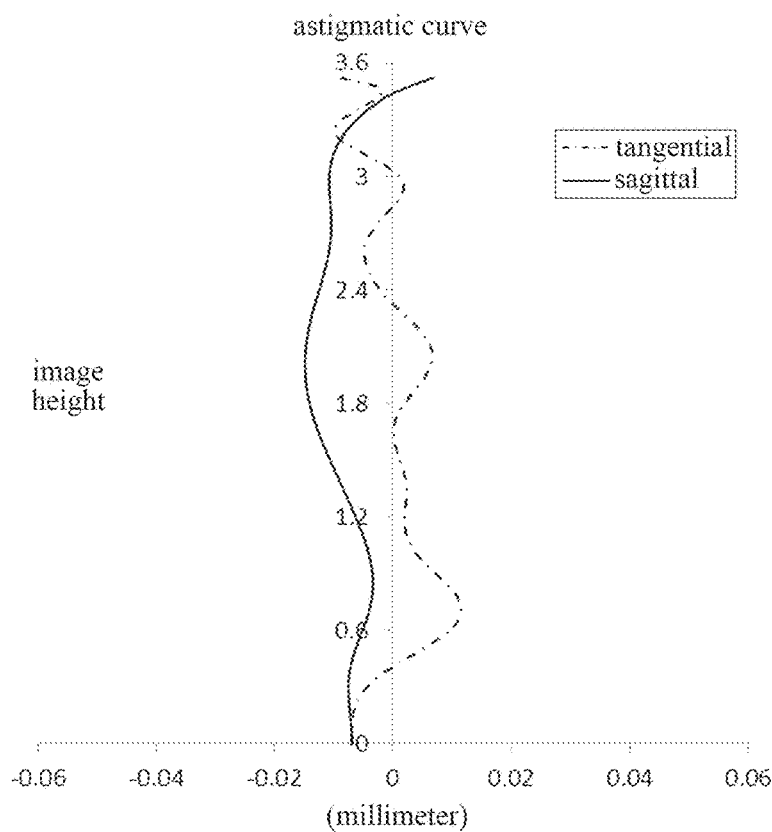
Figure 24C:
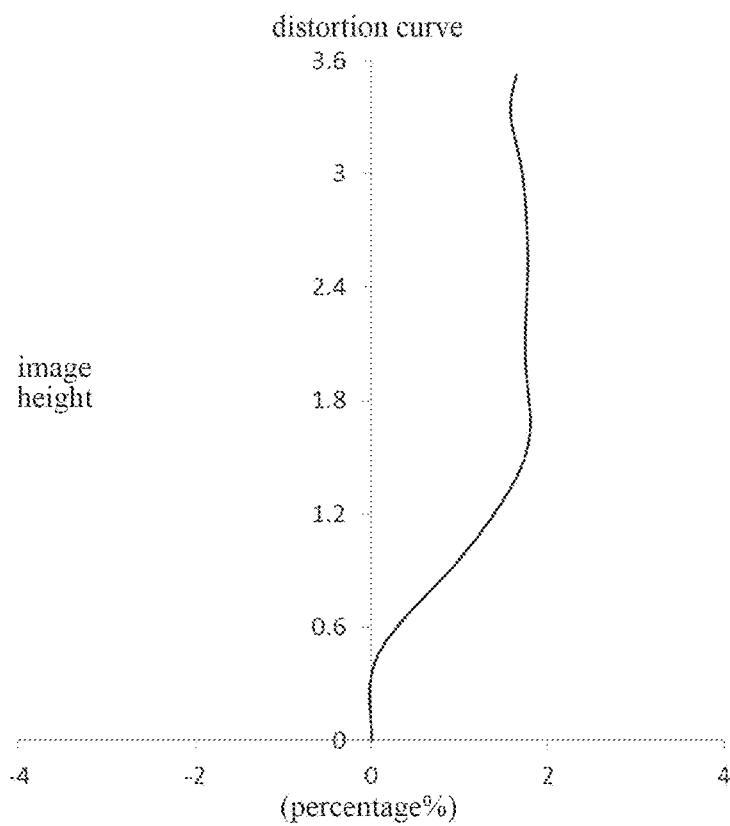
Figure 24D:
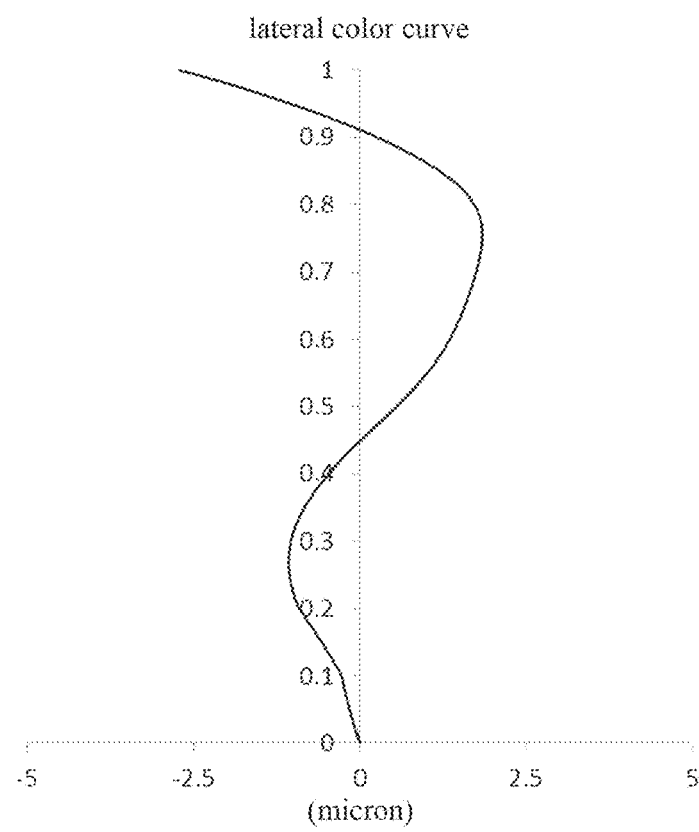

FIG. 24A shows the longitudinal aberration curve of the optical imaging lens assembly according to Embodiment 12, representing deviations of converged focal points of light of different wavelengths after passing through the lens assembly. FIG. 24B shows the astigmatic curve of the optical imaging lens assembly according to Embodiment 12, representing a curvature of the tangential image plane and a curvature of the sagittal image plane. FIG. 24C shows the distortion curve of the optical imaging lens assembly according to Embodiment 12, representing amounts of distortion at different viewing angles. FIG. 24D shows the lateral color curve of the optical imaging lens assembly according to Embodiment 12, representing deviations of different image heights on the image plane after light passes through the lens assembly. It can be seen from FIG. 24A to FIG. 24D that the optical imaging lens assembly given in Embodiment 12 can achieve a good imaging quality.

Embodiment 13

Figure 25:
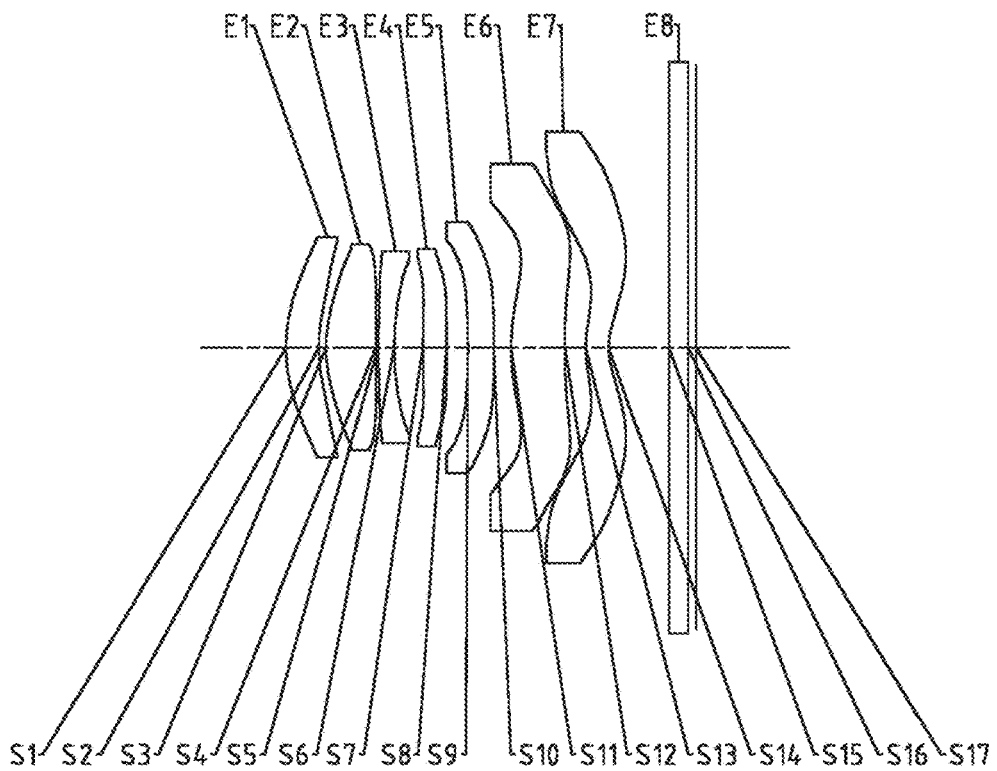
FIG. 25 is a schematic structural diagram illustrating an optical imaging lens assembly according to Embodiment 13 of the present disclosure.

An optical imaging lens assembly according to Embodiment 13 of the present disclosure is described below with reference to FIGS. 25-26D. FIG. 25 is a schematic structural diagram illustrating the optical imaging lens assembly according to Embodiment 13 of the present disclosure.

As shown in FIG. 25, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 37 shows the surface type, the radius of curvature, the thickness, the material and the conic coefficient of each lens of the optical imaging lens assembly in Embodiment 13. The radius of curvature and the thickness are shown in millimeters (mm). Table 38 shows the high-order coefficients applicable to each aspheric surface in Embodiment 13. The surface type of each aspheric surface may be defined by the formula (1) given in the above Embodiment 1. Table 39 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 13.

TABLE 37

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 2.0294 | 0.4310 | 1.54 | 55.7 | −2.6993 |
| S2 | aspheric | 2.0122 | 0.0947 | | | −11.3899 |
| S3 | aspheric | 1.8667 | 0.6429 | 1.55 | 56.1 | −8.0197 |
| S4 | aspheric | 13.1846 | 0.0300 | | | −0.1788 |
| S5 | aspheric | 8.2217 | 0.2100 | 1.67 | 20.4 | 0.0000 |
| S6(STO) | aspheric | 3.5749 | 0.3760 | | | −3.4477 |
| S7 | aspheric | 10.0308 | 0.3091 | 1.55 | 56.1 | 0.0000 |

TABLE 37-continued

| surface number | surface type | radius of curvature | thickness | material refractive index | abbe number | conic coefficient |
|---|---|---|---|---|---|---|
| S8 | aspheric | 71.8458 | 0.2807 | | | −99.0000 |
| S9 | aspheric | −13.4467 | 0.3358 | 1.67 | 20.4 | 0.0000 |
| S10 | aspheric | 45.4402 | 0.2256 | | | −99.0000 |
| S11 | aspheric | 2.8256 | 0.7055 | 1.55 | 56.1 | −1.3049 |
| S12 | aspheric | 15.1535 | 0.2721 | | | 0.0000 |
| S13 | aspheric | 1.4110 | 0.3000 | 1.54 | 55.7 | −4.0427 |
| S14 | aspheric | 0.8900 | 0.7811 | | | −4.2473 |
| S15 | spherical | infinite | 0.2495 | 1.52 | 64.2 | |
| S16 | spherical | infinite | 0.1060 | | | |
| S17 | spherical | infinite | | | | |

TABLE 38

| surface number | A4 | A6 | A8 | A10 | A12 |
|---|---|---|---|---|---|
| S1 | 1.1200E−02 | −8.1600E−03 | 3.6500E−04 | −4.6000E−04 | −1.8200E−03 |
| S2 | 5.4700E−02 | −2.2400E−01 | 3.2900E−01 | −3.9200E−01 | 3.9100E−01 |
| S3 | 7.2500E−02 | −1.6100E−01 | 1.7800E−01 | −1.6200E−01 | 1.4400E−01 |
| S4 | −6.8000E−02 | 8.6500E−02 | −4.3000E−01 | 1.2100E+00 | −1.8200E+00 |
| S5 | −9.5000E−02 | 1.6800E−01 | −5.4000E−01 | 1.5000E+00 | −2.4200E+00 |
| S6 | −2.6700E−02 | 3.4200E−02 | 9.5600E−02 | −3.5800E−01 | 7.0200E−01 |
| S7 | −5.4400E−02 | −3.1300E−02 | −1.0300E−02 | 4.6300E−02 | −5.4500E−02 |
| S8 | −1.7000E−02 | −1.9500E−02 | 6.1100E−01 | −1.4800E+00 | 2.2300E+00 |
| S9 | −1.2500E−02 | −1.2400E−01 | 3.3100E−01 | −5.1500E−01 | 4.4300E−01 |
| S10 | −5.7500E−02 | −1.6200E−01 | 4.0800E−01 | −5.0500E−01 | 3.7200E−01 |
| S11 | 3.0800E−02 | −2.2300E−01 | 3.3400E−01 | −3.4500E−01 | 2.3300E−01 |
| S12 | 6.0000E−02 | −3.2400E−02 | −1.2600E−02 | 1.2600E−02 | −3.9900E−03 |
| S13 | −4.7800E−01 | 4.3600E−01 | −2.9100E−01 | 1.3200E−01 | −3.9000E−02 |
| S14 | −2.4500E−01 | 1.9800E−01 | −1.1800E−01 | 4.6600E−02 | −1.1900E−02 |

| surface number | A14 | A16 | A18 | A20 |
|---|---|---|---|---|
| S1 | 7.5200E−04 | 1.4300E−03 | −9.2200E−04 | 1.4200E−04 |
| S2 | −2.7300E−01 | 1.2000E−01 | −2.9700E−02 | 3.0700E−03 |
| S3 | −6.6000E−02 | −4.3100E−03 | 1.4800E−02 | −3.9100E−03 |
| S4 | 1.6000E+00 | −8.1800E−01 | 2.2600E−01 | −2.6000E−02 |
| S5 | 2.2800E+00 | −1.2400E+00 | 3.6100E−01 | −4.3300E−02 |
| S6 | −9.0300E−01 | 7.2200E−01 | −3.1400E−01 | 5.6300E−02 |
| S7 | 1.2400E−02 | 3.0100E−02 | −1.7300E−02 | 1.3000E−03 |
| S8 | −2.1200E+00 | 1.2300E+00 | −3.9800E−01 | 5.4100E−02 |
| S9 | −2.2000E−01 | 6.3900E−02 | −9.7900E−03 | 4.7200E−04 |
| S10 | −1.6800E−01 | 4.6000E−02 | −6.9700E−03 | 4.4300E−04 |
| S11 | −1.0000E−01 | 2.6500E−02 | −3.8400E−03 | 2.3300E−04 |
| S12 | 5.1600E−04 | 1.3000E−05 | −9.6600E−06 | 6.6200E−07 |
| S13 | 7.3200E−03 | −8.4800E−04 | 5.5100E−05 | −1.5400E−06 |
| S14 | 1.9500E−03 | −1.9800E−04 | 1.1300E−05 | −2.8100E−07 |

TABLE 39

| parameter | | | | |
|---|---|---|---|---|
| f1 (mm) | f2 (mm) | f3 (mm) | f4 (mm) | f5 (mm) |
| numerical value 57.08 | 3.90 | −9.68 | 21.32 | −15.55 |

| parameter | | | | |
|---|---|---|---|---|
| f6 (mm) | f7 (mm) | f (mm) | TTL (mm) | ImgH (mm) |
| numerical value 6.24 | −5.62 | 4.30 | 5.35 | 3.62 |

Figure 26A:
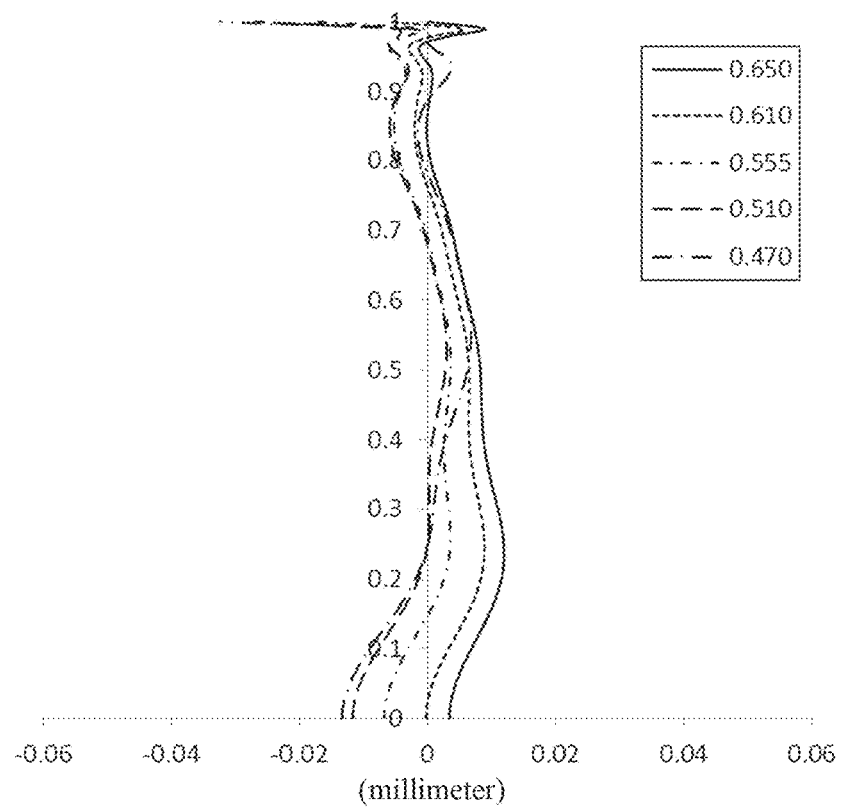
FIGS. 26A-26D respectively illustrate a longitudinal aberration curve, an astigmatic curve, a distortion curve and a lateral color curve of the optical imaging lens assembly according to Embodiment 13.
Figure 26B:
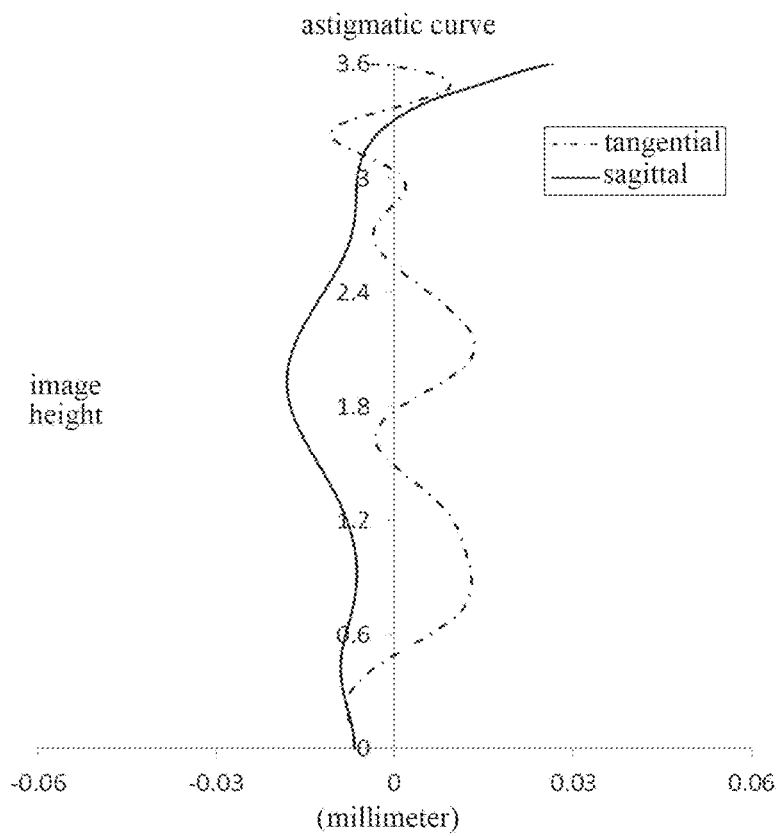
Figure 26C:
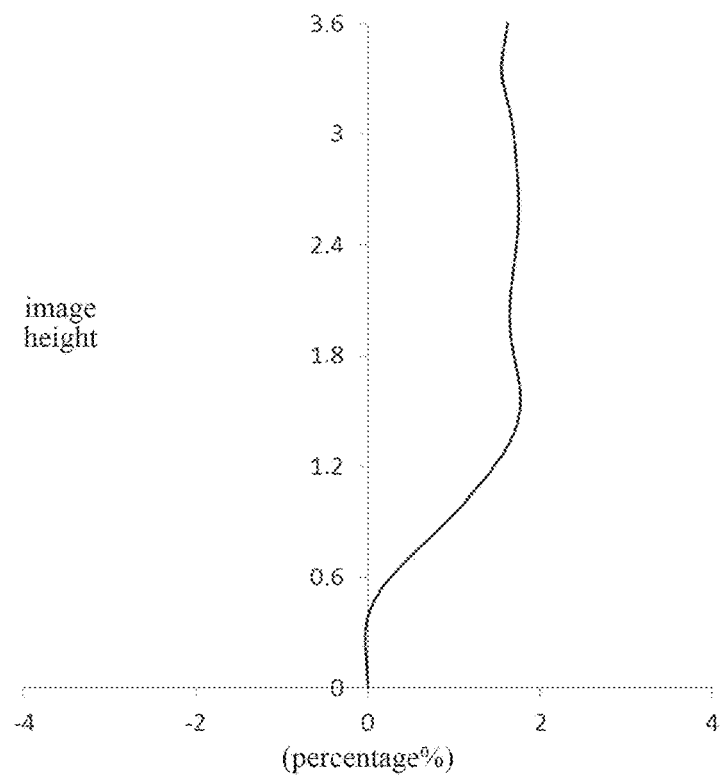
Figure 26D:
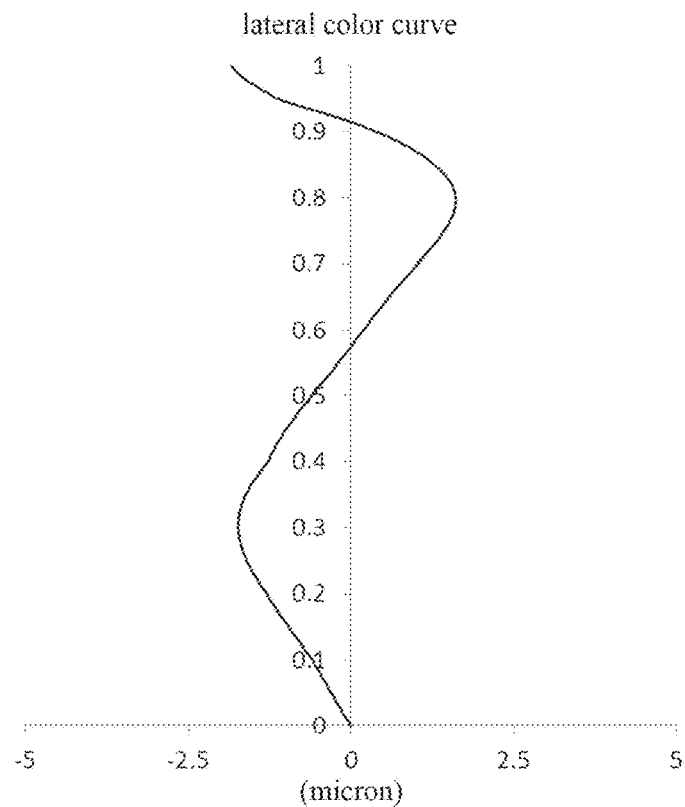

FIG. 26A shows the longitudinal aberration curve of the optical imaging lens assembly according to Embodiment 13, representing deviations of converged focal points of light of different wavelengths after passing through the lens assembly. FIG. 26B shows the astigmatic curve of the optical imaging lens assembly according to Embodiment 13, representing a curvature of the tangential image plane and a curvature of the sagittal image plane. FIG. 26C shows the distortion curve of the optical imaging lens assembly according to Embodiment 13, representing amounts of distortion at different viewing angles. FIG. 26D shows the lateral color curve of the optical imaging lens assembly according to Embodiment 13, representing deviations of different image heights on the image plane after light passes through the lens assembly. It can be seen from FIG. 26A to FIG. 26D that the optical imaging lens assembly given in Embodiment 13 can achieve a good imaging quality.

Embodiment 14

Figure 27:
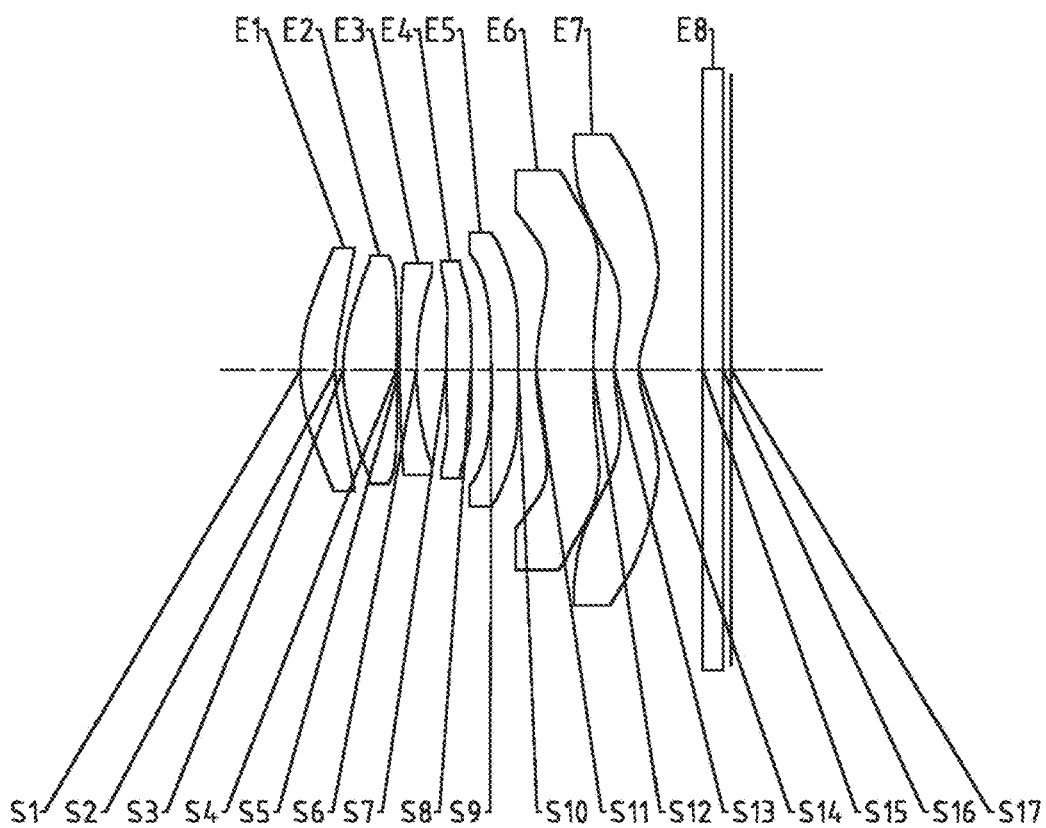
FIG. 27 is a schematic structural diagram illustrating an optical imaging lens assembly according to Embodiment 14 of the present disclosure.

An optical imaging lens assembly according to Embodiment 14 of the present disclosure is described below with reference to FIGS. 27-28D. FIG. 27 is a schematic structural diagram illustrating the optical imaging lens assembly according to Embodiment 14 of the present disclosure.

As shown in FIG. 27, the optical imaging lens assembly includes a first lens E1, a second lens E2, a third lens E3, a fourth lens E4, a fifth lens E5, a sixth lens E6, a seventh lens E7 and an image plane S17 sequentially from an object side to an image side along an optical axis.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a concave surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S14 of the seventh lens E7 is a convex surface, an image-side surface S14 of the seventh lens E7 is a concave surface, and the object-side surface S14 and the image-side surface S14 of the seventh lens E7 are both aspheric surfaces.

Alternatively, the optical imaging lens assembly may further include an optical filter E8 having an object-side surface S15 and an image-side surface S16. Light from an object passes through the surfaces S1 to S16 sequentially and is finally imaged on the image plane S17.

Table 40 shows the surface type, the radius of curvature, the thickness, the material and the conic coefficient of each lens of the optical imaging lens assembly in Embodiment 14. The radius of curvature and the thickness are shown in millimeters (mm). Table 41 shows the high-order coefficients applicable to each aspheric surface in Embodiment 14. The surface type of each aspheric surface may be defined by the formula (1) given in the above Embodiment 1. Table 42 shows the effective focal lengths f1-f7 of the lenses, the total effective focal length f of the optical imaging lens assembly, the total track length TTL of the optical imaging lens assembly and the half of the diagonal length ImgH of the effective pixel area on the image plane S17 of the optical imaging lens assembly in Embodiment 14.

TABLE 40

| surface number | surface type | radius of curvature | thickness | refractive index | abbe number | conic coefficient |
|---|---|---|---|---|---|---|
| OBJ | spherical | infinite | infinite | | | |
| S1 | aspheric | 2.0502 | 0.4319 | 1.54 | 55.7 | −2.8198 |
| S2 | aspheric | 2.0198 | 0.1007 | | | −11.6503 |
| S3(STO) | aspheric | 1.8723 | 0.6567 | 1.55 | 56.1 | −8.0571 |
| S4 | aspheric | 13.5668 | 0.0340 | | | 4.2799 |
| S5 | aspheric | 8.1705 | 0.2100 | 1.67 | 20.4 | 0.0000 |
| S6 | aspheric | 3.5876 | 0.3730 | | | −3.8276 |
| S7 | aspheric | 9.0670 | 0.3092 | 1.55 | 56.1 | 0.0000 |
| S8 | aspheric | 42.4376 | 0.2510 | | | −99.0000 |
| S9 | aspheric | −13.9806 | 0.3349 | 1.67 | 20.4 | 0.0000 |
| S10 | aspheric | 33.8672 | 0.2191 | | | −99.0000 |
| S11 | aspheric | 2.7661 | 0.7118 | 1.55 | 56.1 | −0.9934 |
| S12 | aspheric | 14.8553 | 0.2600 | | | 0.0000 |
| S13 | aspheric | 1.3909 | 0.3075 | 1.54 | 55.7 | −4.2176 |
| S14 | aspheric | 0.8923 | 0.7843 | | | −4.2473 |
| S15 | spherical | infinite | 0.2495 | 1.52 | 64.2 | |
| S16 | spherical | infinite | 0.1060 | | | |
| S17 | spherical | infinite | | | | |

TABLE 41

| surface number | A4 | A6 | A8 | A10 | A12 |
|---|---|---|---|---|---|
| S1 | 1.0600E−02 | −9.4400E−03 | 2.4400E−03 | −9.8400E−04 | −3.9300E−03 |
| S2 | 5.5700E−02 | −2.2600E−01 | 3.3700E−01 | −3.9800E−01 | 3.8600E−01 |
| S3 | 7.2500E−02 | −1.6300E−01 | 1.9600E−01 | −2.0900E−01 | 2.0800E−01 |
| S4 | −6.4100E−02 | 5.9100E−02 | −3.1700E−01 | 9.3000E−01 | −1.4200E+00 |
| S5 | −9.4500E−02 | 1.6700E−01 | −5.3500E−01 | 1.4800E+00 | −2.3900E+00 |
| S6 | −2.8400E−02 | 3.8100E−02 | 9.4900E−02 | −3.7200E−01 | 7.3800E−01 |

TABLE 41-continued

| | | | | |
|---|---|---|---|---|
| S7 | −5.4900E−02 | −2.9900E−02 | 4.0400E−05 | −8.6600E−03 | 7.7200E−02 |
| S8 | −1.5300E−02 | −2.0500E−01 | 6.5400E−01 | −1.5800E+00 | 2.3600E+00 |
| S9 | −1.1400E−02 | −1.3300E−01 | 3.8000E−01 | −6.1900E−01 | 5.5700E−01 |
| S10 | −5.8100E−02 | −1.7100E−01 | 4.4000E−01 | −5.5400E−01 | 4.1200E−01 |
| S11 | 3.2200E−02 | −2.2900E−01 | 3.4200E−01 | −3.5200E−01 | 2.3500E−01 |
| S12 | 5.8200E−02 | −2.5200E−02 | −2.1000E−02 | 1.8000E−02 | −6.1900E−03 |
| S13 | −4.5700E−01 | 4.0900E−01 | −2.7100E−01 | 1.2300E−01 | −3.6500E−02 |
| S14 | −2.3700E−01 | 1.8900E−01 | −1.1200E−01 | 4.4900E−02 | −1.1500E−02 |

| surface number | A14 | A16 | A18 | A20 |
|---|---|---|---|---|
| S1 | 4.0600E−03 | −8.2400E−04 | −1.9200E−04 | 5.1400E−05 |
| S2 | −2.6100E−01 | 1.1200E−01 | −2.7300E−02 | 2.8000E−03 |
| S3 | −1.2200E−01 | 2.7700E−02 | 4.0200E−03 | −2.2900E−03 |
| S4 | 1.2400E+00 | −6.3300E−01 | 1.7300E−01 | −1.9700E−02 |
| S5 | 2.2400E+00 | −1.2200E+00 | 3.5700E−01 | −4.3100E−02 |
| S6 | −9.4200E−01 | 7.3900E−01 | −3.1500E−01 | 5.5200E−02 |
| S7 | −1.6200E−01 | 1.6300E−01 | −7.2000E−02 | 1.0900E−02 |
| S8 | −2.2000E+00 | 1.2500E+00 | −3.9800E−01 | 5.3300E−02 |
| S9 | −2.9000E−01 | 8.8400E−02 | −1.4700E−02 | 9.3200E−04 |
| S10 | −1.8700E−01 | 5.0600E−02 | −7.4400E−03 | 4.4800E−04 |
| S11 | −1.0100E−01 | 2.6500E−02 | −3.8300E−03 | 2.3200E−04 |
| S12 | 1.0900E−03 | −7.6400E−05 | −2.0700E−06 | 3.9300E−07 |
| S13 | 6.8900E−03 | −8.0300E−04 | 5.2500E−05 | −1.4800E−06 |
| S14 | 1.8900E−03 | −1.9200E−04 | 1.1000E−05 | −2.7200E−07 |

TABLE 42

| parameter | | | | |
|---|---|---|---|---|
| f1 (mm) | f2 (mm) | f3 (mm) | f4 (mm) | f5 (mm) |
| numerical value 3.95 | 3.90 | −9.79 | 21.05 | −14.82 |

| parameter | | | | |
|---|---|---|---|---|
| f6 (mm) | f7 (mm) | f (mm) | TTL (mm) | ImgH (mm) |
| numerical value 6.10 | −5.91 | 4.24 | 5.34 | 3.52 |

Figure 28A:
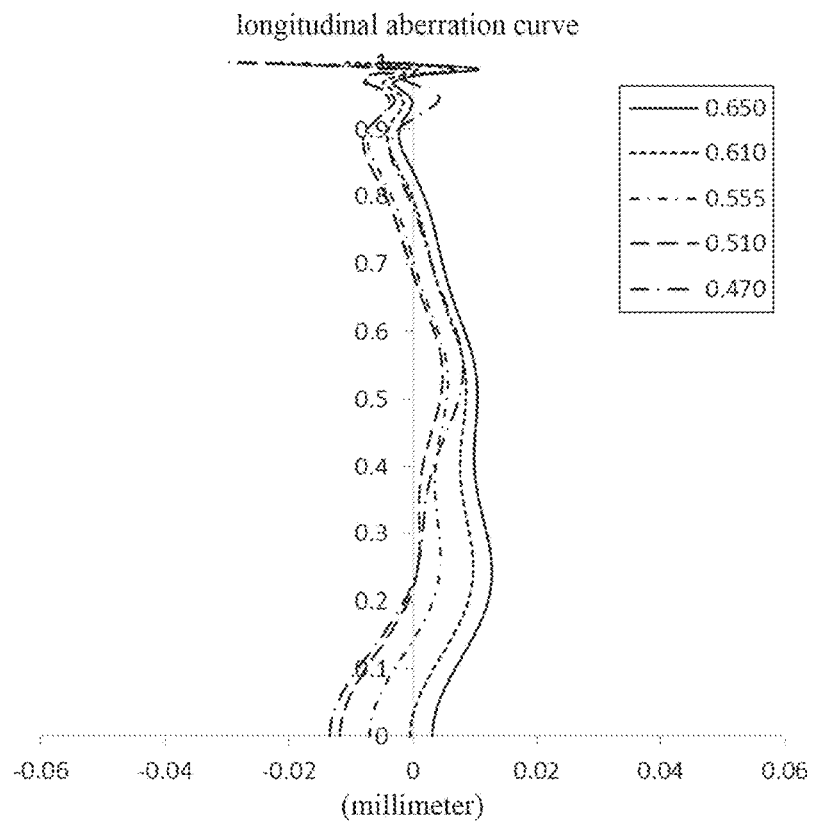
FIGS. 28A-28D respectively illustrate a longitudinal aberration curve, an astigmatic curve, a distortion curve and a lateral color curve of the optical imaging lens assembly according to Embodiment 14.
Figure 28B:
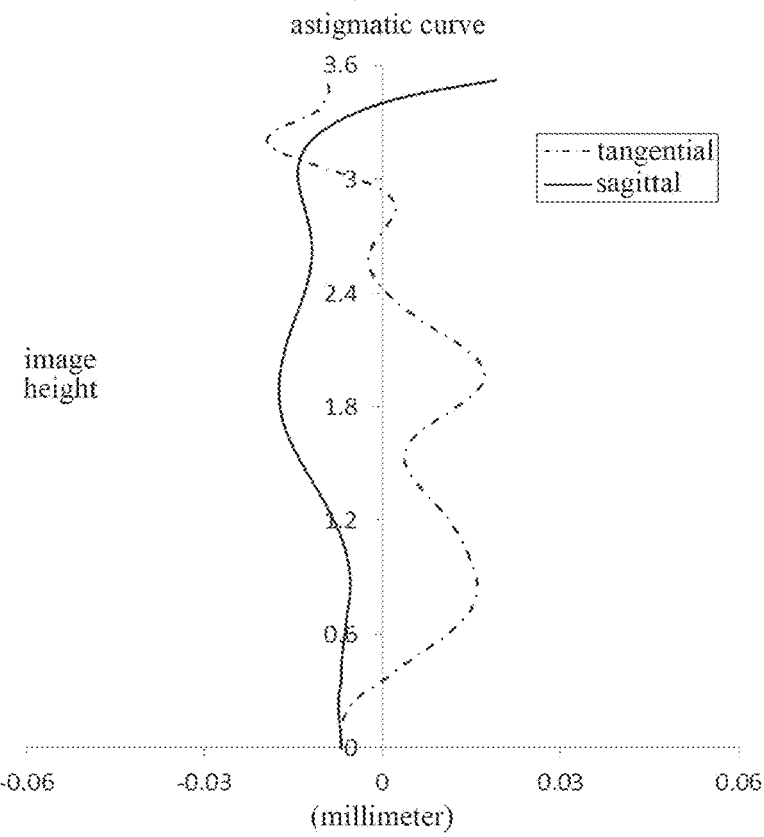
Figure 28C:
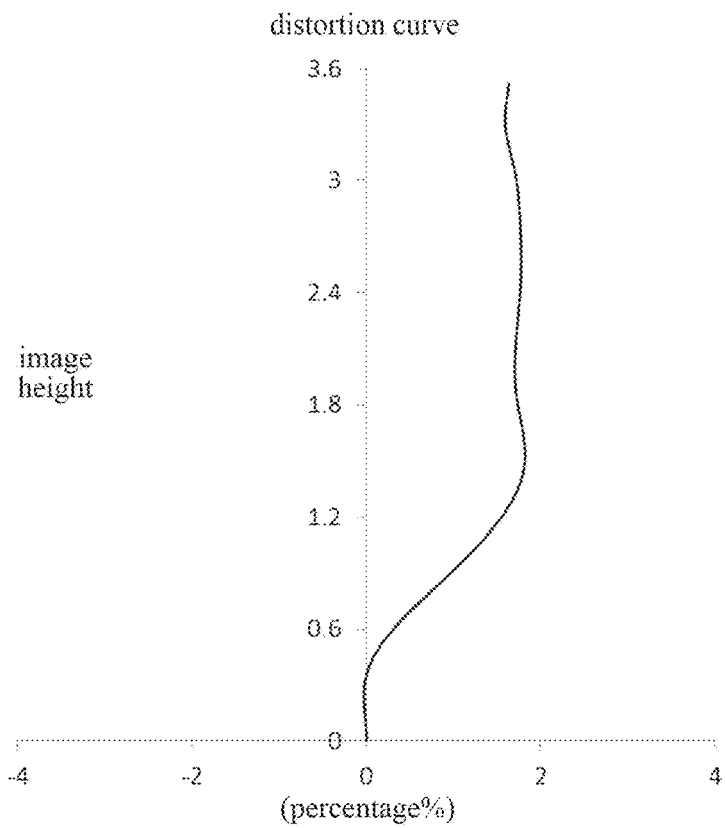
Figure 28D:
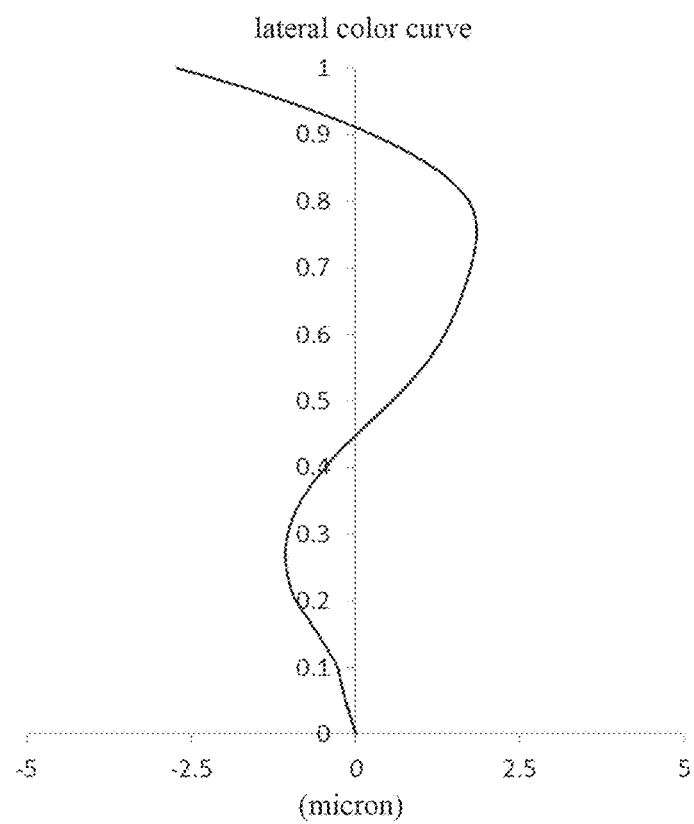

FIG. 28A shows the longitudinal aberration curve of the optical imaging lens assembly according to Embodiment 14, representing deviations of converged focal points of light of different wavelengths after passing through the lens assembly. FIG. 28B shows the astigmatic curve of the optical imaging lens assembly according to Embodiment 14, representing a curvature of the tangential image plane and a curvature of the sagittal image plane. FIG. 28C shows the distortion curve of the optical imaging lens assembly according to Embodiment 14, representing amounts of distortion at different viewing angles. FIG. 28D shows the lateral color curve of the optical imaging lens assembly according to Embodiment 14, representing deviations of different image heights on the image plane after light passes through the lens assembly. It can be seen from FIG. 28A to FIG. 28D that the optical imaging lens assembly given in Embodiment 14 can achieve a good imaging quality.

To sum up, Embodiment 1 to Embodiment 14 respectively satisfy the relationships shown in Table 43 below.

TABLE 43

| Conditional expression | embodiment | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| f/EPD | 1.68 | 1.76 | 1.68 | 1.60 | 1.58 | 1.65 | 1.83 | 1.90 | 1.85 | 1.75 | 1.68 | 1.64 | 1.53 | 1.49 |
| TTL/ImgH | 1.43 | 1.47 | 1.46 | 1.44 | 1.44 | 1.49 | 1.51 | 1.51 | 1.52 | 1.52 | 1.52 | 1.52 | 1.48 | 1.52 |
| f/f6 | 1.44 | 1.04 | 1.39 | 1.43 | 1.43 | 1.00 | 0.84 | 1.48 | 0.76 | 0.70 | 0.69 | 0.69 | 0.69 | 0.70 |
| |f/R13| | 3.04 | 3.11 | 2.87 | 2.98 | 2.97 | 2.98 | 3.02 | 3.09 | 2.55 | 2.85 | 3.05 | 3.05 | 3.05 | 3.05 |
| f/f7 | −1.69 | −1.39 | −1.51 | −1.69 | −1.68 | −1.69 | −1.76 | −1.81 | −0.94 | −0.89 | −0.82 | −0.80 | −0.77 | −0.72 |
| f3/(f1 + f2) | −0.54 | −0.42 | −0.13 | −0.58 | −0.59 | −0.58 | −0.53 | −0.54 | −0.43 | −0.42 | −0.38 | −0.33 | −0.16 | −1.25 |
| f/f1 | 0.44 | 0.45 | 0.07 | 0.44 | 0.44 | 0.45 | 0.59 | 0.47 | 0.26 | 0.25 | 0.21 | 0.18 | 0.08 | 1.07 |
| |R5 + R6|/|R5 − R6| | 2.22 | 0.08 | 2.20 | 2.61 | 2.64 | 2.47 | 1.92 | 2.23 | 2.24 | 2.28 | 2.38 | 2.48 | 2.54 | 2.57 |
| |f/f45| | 0.19 | 0.07 | 0.17 | 0.20 | 0.21 | 0.41 | 0.22 | 0.21 | 0.14 | 0.11 | 0.11 | 0.10 | 0.07 | 0.08 |
| T34/T67 | 1.01 | 0.25 | 0.88 | 0.97 | 0.98 | 1.04 | 1.10 | 1.09 | 1.50 | 1.42 | 1.44 | 1.44 | 1.38 | 1.43 |
| ΣCT/ΣAT | 2.16 | 1.36 | 1.89 | 2.09 | 2.12 | 2.02 | 1.96 | 2.07 | 1.99 | 2.02 | 2.13 | 2.18 | 2.29 | 2.39 |
| R6/R3 | 1.39 | 2.58 | 1.95 | 1.31 | 1.32 | 1.33 | 1.14 | 1.31 | 1.82 | 1.83 | 1.84 | 1.85 | 1.92 | 1.92 |
| f23/ΣAT | 7.97 | 13.79 | 3.82 | 7.89 | 7.94 | 12.97 | 7.48 | 7.65 | 5.12 | 5.13 | 5.11 | 4.98 | 4.54 | 4.65 |
| (V4 + V5 + V6)/4 | 33.15 | 33.15 | 33.15 | 32.98 | 33.15 | 33.15 | 33.15 | 33.15 | 33.15 | 33.15 | 33.15 | 33.15 | 33.15 | 33.15 |
| |f/R9| | 0.49 | 0.50 | 0.44 | 0.57 | 0.57 | 0.90 | 1.03 | 0.70 | 0.64 | 0.57 | 0.51 | 0.42 | 0.32 | 0.30 |

The present disclosure further provides an imaging device, having a photosensitive element which may be a photosensitive charge-coupled device (CCD) or a complementary metal-oxide semiconductor (CMOS) element. The imaging device may be an independent camera device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

What is claimed is:

1. An optical imaging lens assembly, comprising a first lens, a second lens, a third lens, a fourth lens, a fifth lens, a sixth lens and a seventh lens in sequence from an object side to an image side along an optical axis,
wherein the first lens, the second lens, and the sixth lens each have a positive refractive power;
the third lens and the seventh lens each have a negative refractive power;
the fourth lens and the fifth lens each have a refractive power;
an object-side surface of the first lens and an object-side surface of the second lens are both convex surfaces;
an image-side surface of the third lens is a concave surface; and
a total effective focal length f of the optical imaging lens assembly and a radius of curvature R13 of an object-side surface of the seventh lens satisfy: $|f/R13|\geq 2.5$,
wherein an effective focal length f1 of the first lens and the total effective focal length f of the optical imaging lens assembly satisfy: $0 < f/f1 \leq 1.2$.

2. The optical imaging lens assembly according to claim 1, wherein the total effective focal length f of the optical imaging lens assembly and an entrance pupil diameter EPD of the optical imaging lens assembly satisfy: $f/EPD \leq 1.95$.

3. The optical imaging lens assembly according to claim 2, wherein an axial distance TTL from the object-side surface of the first lens to an image plane of the optical imaging lens assembly and half of a diagonal length ImgH of an effective pixel area on the image plane of the optical imaging lens assembly satisfy: $TTL/ImgH \leq 1.6$.

4. The optical imaging lens assembly according to claim 1, wherein the total effective focal length f of the optical imaging lens assembly and an effective focal length f6 of the sixth lens satisfy: $f/f6 > 0.6$.

5. The optical imaging lens assembly according to claim 1, wherein an effective focal length f7 of the seventh lens and the total effective focal length f of the optical imaging lens assembly satisfy: $-2 < f/f7 < 0$.

6. The optical imaging lens assembly according to claim 1, wherein the effective focal length f1 of the first lens, an effective focal length f2 of the second lens and an effective focal length f3 of the third lens satisfy: $-1.5 < f3/(f1+f2) < 0$.

7. The optical imaging lens assembly according to claim 1, wherein the total effective focal length f of the optical imaging lens assembly and a combined focal length f45 of the fourth lens and the fifth lens satisfy: $|f/f45| \leq 0.5$.

8. The optical imaging lens assembly according to claim 1, wherein a combined refractive power of the second lens and the third lens is a positive refractive power, and a combined focal length f23 of the second lens and the third lens and a sum of spacing distances $\Sigma AT$ of any two adjacent lenses of the first lens to the seventh lens on the optical axis satisfy: $3.5 < f23/\Sigma AT < 14.5$.

9. The optical imaging lens assembly according to claim 1, wherein a sum of center thicknesses $\Sigma CT$ of the first lens to the seventh lens respectively on the optical axis and a sum of spacing distances $\Sigma AT$ of any two adjacent lenses of the first lens to the seventh lens on the optical axis satisfy: $1 < \Sigma CT/\Sigma AT < 2.5$.

10. The optical imaging lens assembly according to claim 1, wherein a spacing distance T34 between the third lens and the fourth lens on the optical axis and a spacing distance T67 between the sixth lens and the seventh lens on the optical axis satisfy: $0 < T34/T67 \leq 1.5$.

11. The optical imaging lens assembly according to claim 1, wherein a radius of curvature R5 of an object-side surface of the third lens and a radius of curvature R6 of the image-side surface of the third lens satisfy: $|R5+R6|/|R5-R6| < 3$.

12. The optical imaging lens assembly according to claim 1, wherein a radius of curvature R6 of the image-side surface of the third lens and a radius of curvature R3 of the object-side surface of the second lens satisfy: $1 < R6/R3 < 3$.

13. The optical imaging lens assembly according to claim 1, wherein an abbe number V4 of the fourth lens, an abbe number V5 of the fifth lens, and an abbe number V6 of the sixth lens satisfy: $(V4+V5+V6)/4 \leq 45$.

14. The optical imaging lens assembly according to claim 1, wherein the total effective focal length f of the optical imaging lens assembly and a radius of curvature R9 of an object-side surface of the fifth lens satisfy: $|f/R9| < 1.5$.

* * * * *